United States Patent
Okegawa et al.

(10) Patent No.: US 8,368,512 B2
(45) Date of Patent: Feb. 5, 2013

(54) RFID TAG, METHOD OF MANUFACTURING THE RFID TAG, AND METHOD OF MOUNTING THE RFID TAG

(75) Inventors: Hirokatsu Okegawa, Chiyoda-ku (JP); Takanori Miyamae, Chiyoda-ku (JP); Masataka Ohtsuka, Chiyoda-ku (JP); Yasuhiro Nishioka, Chiyoda-ku (JP); Toru Fukasawa, Chiyoda-ku (JP); Osamu Murakami, Chiyoda-ku (JP); Takashi Nakatani, Chiyoda-ku (JP); Masashi Kawanami, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1319 days.

(21) Appl. No.: 12/089,403

(22) PCT Filed: Feb. 28, 2007

(86) PCT No.: PCT/JP2007/053729
§ 371 (c)(1), (2), (4) Date: Apr. 7, 2008

(87) PCT Pub. No.: WO2007/102360
PCT Pub. Date: Sep. 13, 2007

(65) Prior Publication Data
US 2008/0252425 A1    Oct. 16, 2008

(30) Foreign Application Priority Data

Mar. 6, 2006 (JP) ................. 2006-059356
Jun. 27, 2006 (JP) ................. 2006-176629
Dec. 12, 2006 (JP) ................. 2006-334562

(51) Int. Cl.
*H04Q 5/22* (2006.01)
*G08B 13/14* (2006.01)

(52) U.S. Cl. .............. 340/10.1; 340/10.5; 340/572.7; 235/492

(58) Field of Classification Search ........ 340/10.1–10.5, 340/572.7, 572.4; 343/700, 895, 873, 904; 235/492; 257/673; 455/1, 41.2, 63.1
See application file for complete search history.

(56) References Cited

U.S. PATENT DOCUMENTS 4,613,868 A    9/1986  Weiss
5,528,222 A *  6/1996  Moskowitz et al. ....... 340/572.7
(Continued)

FOREIGN PATENT DOCUMENTS

JP    64 56596    3/1989
JP    3 23481     3/1991
(Continued)

OTHER PUBLICATIONS

U.S. Appl. No. 12/664,851, filed Dec. 15, 2009, Okegawa, et al.
(Continued)

*Primary Examiner* — Nam V Nguyen
(74) *Attorney, Agent, or Firm* — Oblon, Spivak, McClelland, Maier & Neustadt, L.L.P.

(57) ABSTRACT

An RFID tag is characterized in that it includes: a dielectric substrate; a ground conductor portion disposed on one main surface of this dielectric substrate; a patch conductor portion disposed on another main surface of the above-mentioned dielectric substrate and forming a slot; electrical connecting portions internally extending from opposing sides of the above-mentioned slot, respectively; and an IC chip placed in the above-mentioned slot and connected to the above-mentioned electrical connecting portions.

22 Claims, 34 Drawing Sheets

U.S. PATENT DOCUMENTS

| | | | | |
|---|---|---|---|---|
| 5,566,441 | A | * | 10/1996 | Marsh et al. .................... 29/600 |
| 6,147,604 | A | | 11/2000 | Wiklof et al. |
| 6,329,915 | B1 | * | 12/2001 | Brady et al. ............... 340/572.1 |
| 6,719,206 | B1 | * | 4/2004 | Bashan et al. ................ 235/492 |
| 7,336,243 | B2 | * | 2/2008 | Jo et al. ......................... 343/895 |
| 7,365,686 | B2 | * | 4/2008 | Sakama et al. ......... 343/700 MS |
| 7,586,446 | B2 | * | 9/2009 | Sakama et al. ................ 343/702 |
| 2002/0167450 | A1 | | 11/2002 | Korden et al. |
| 2004/0041262 | A1 | | 3/2004 | Okamoto et al. |
| 2005/0024287 | A1 | | 2/2005 | Jo et al. |
| 2006/0109130 | A1 | * | 5/2006 | Hattick et al. ............. 340/572.7 |
| 2010/0035539 | A1 | * | 2/2010 | Yoshida et al. ................... 455/1 |

FOREIGN PATENT DOCUMENTS

| | | |
|---|---|---|
| JP | 7-22831 | 1/1995 |
| JP | 9-330388 | 12/1997 |
| JP | 2000-278009 | 10/2000 |
| JP | 2000 332523 | 11/2000 |
| JP | 2001 511973 | 8/2001 |
| JP | 2001-267836 | 9/2001 |
| JP | 2002 197434 | 7/2002 |
| JP | 2002 288610 | 10/2002 |
| JP | 2002-298106 | 10/2002 |
| JP | 2002 358494 | 12/2002 |
| JP | 2003 187211 | 7/2003 |
| JP | 2003 249820 | 9/2003 |
| JP | 2004-334268 | 11/2004 |
| JP | 2005 51506 | 2/2005 |
| JP | 2005 79832 | 3/2005 |
| JP | 2005-117363 | 4/2005 |
| JP | 2005-301738 | 10/2005 |
| JP | 2006 53833 | 2/2006 |
| JP | 2006 237674 | 9/2006 |
| JP | 2006-311372 | 11/2006 |
| WO | WO 2006/001049 A1 | 1/2006 |
| WO | WO 2006/049068 A1 | 5/2006 |

OTHER PUBLICATIONS

Office Action issued Sep. 6, 2010, in Korea Patent Application No. 10-2008-7021646 (with English-language translation).

Office Action issued Aug. 27, 2010, in Taiwan Patent Application No. 096107362 (with English translation of Category of cited documents).

Office Action issued May 31, 2011, in Korean Patent Application No. 10-2008-7021646 (with Englsh-language translation).

Megumi Konno, et al., "A study of the wide band micro strip antenna" A consideration on Broadband Microstrip Antenna, lecture papers of the Communication Society of the Institute of Electronics, Information and Communication Engineers 1998, Sep. 29, 1998, p. 43, B-1-43.

Extended European Search Report issued Oct. 17, 2011, in European Patent Application No. 07737485.8.

Office Action issued Nov. 15, 2011, in Japanese Patent Application No. 2011-082895 (with English-language Translation).

CPW-fed capacitive H-shaped narrow slot antenna, Y.-F. Lin; P.-C. Liao; P.-S. Cheng; H.-M. Chen; C.T.P. Song; P.S. Hall; Inst. of Photonics & Commun., Nat. Kaohsiung Univ. of Appl. Sd., Taiwan Aug. 18, 2005, vol. 41 Issue: 17, pp. 940-942.

* cited by examiner (a)

Electric Field=0

(b)

(c)

(a)

(b)

(c)

(a)          (b)

(a)

(b)

(c)

(a) Conductor Layer Formation Process (b) Conductor Pattern Formation Process (c) IC Chip Connecting Process (d) IC Chip Connecting Process (Thermocompression Bonding)

(e) Film Supporting Process (Fixing Process)

(a)

(b)

(a)

(b)

Preparation Process for Ground Conductor Pattern Formation Process

Process of Clamping Injection Molding Mold

Dielectric Substrate Formation Process and
Ground Conductor Pattern Formation Process (a)

(b)

Dielectric Substrate Removing Process and Post Treatment Process (a)

(b)

(a)

(b)

(a)

(b)

(c)

(d)

✕ RFID Tag of Fig. 32
— RFID Tag of Fig. 33

(a)

(b)

(a)

(b)

(a)

(b)

(a)

(b)

(a)

(b)

(a)

(b)

(c)

(a) Conductor Layer Formation Process (b) Conductor Pattern Formation Process (c) IC Chip Connecting Process (d) IC Chip Connecting Process (Thermocompression Bonding)

(e) Film Supporting Process (Fixing Process)

(a)

(b)

(a)

(b)

(c)

(d)

Preparation Process for Ground Conductor Pattern Formation Process

Process of Clamping Injection Molding Mold

Dielectric Substrate Formation Process and Ground Conductor Pattern Formation Process Dielectric Substrate Removing Process and Post Treatment Process

US 8,368,512 B2

RFID TAG, METHOD OF MANUFACTURING THE RFID TAG, AND METHOD OF MOUNTING THE RFID TAG

FIELD OF THE INVENTION

The present invention relates to an RFID tag which receives a command signal transmitted from a Radio Frequency Identification (referred to as an RFID from here on) reader writer, which transmits, as a read signal, either information about update or writing of tag information stored in a memory in the RFID tag or the tag information to the RFID reader writer according to information included in the command signal, and which is intended for an RFID system operating in both an UHF band and a microwave band, which is used for entrance/exit control of living bodies and articles, physical distribution management, etc., and a method of manufacturing the RFID tag and a method of mounting the RFID tag.

BACKGROUND OF THE INVENTION

An RFID system enables radio communications to be carried out between RFID tags each equipped with an IC chip and an RFID reader writer.
RFID tags include active-type tags each of which has a battery therein and runs from the electric power of the battery, and passive-type tags each of which receives electric power from a reader writer and runs from this electric power. While active-type tags have merits, such as a long communication range and communicative stability, as compared with passive-type tags, because they include a battery therein, active-type tags also have demerits, such as complication in their structure, enlargement of their size, and high cost. The downsizing and migration to higher performance of IC chips used for passive-type tags advance with recent improvements in semiconductor technologies, and use of passive-type tags in wide fields is expected. In the case of a passive-type tag of electromagnetic induction type which is applied to an RFID tag which operates in a frequency band, such as a long frequency band or a short frequency band, a voltage is induced in the RFID tag due to an electromagnetic induction action between a transmission antenna coil of a reader writer and an antenna coil of the RFID tag and this voltage starts the IC chip of the tag, so that communications can be carried out between them. Therefore, such an RFID tag runs only within the induction field caused by an RFID reader writer, and therefore its communication range is about tens of cm.

In the case of an RFID tag which operates in a high frequency band, such as a UHF band or a microwave band, because a radio frequency communication method is applied, and power is furnished to the IC chip of the RFID tag using an electric wave, its communication range is improved greatly and reaches about 1 to 8 m. Therefore, an RFID system having this type of RFID tags can carry out batch reading of a plurality of RFID tags, reading of a moving RFID tag, and so on, which are difficult for an RFID system having a short communication range and operating in a low frequency band or a short frequency band to carry out, and it can be therefore expected that the use of the RFID system is spread greatly among a wide of fields. Passive-type tags which operate in a high frequency band, such as a UHF band or a microwave band, are disclosed by, for example, patent reference 1 and patent reference 2.

In accordance with conventional technologies for RFID tags, there have been provided an RFID tag in which, as shown in FIG. 12 of patent reference 1 (reference numeral 66 denotes a dipole antenna and reference numeral 67 denotes an IC chip), the IC chip 67 is mounted in the dipole antenna 66, the RFID tag operating as a tag for an RFID system, and an RFID tag in which, as shown in FIG. 2 of patent reference 2 (reference numeral 13 denotes a ½-wave microstrip line resonator, reference numeral 14 denotes a dielectric substrate, and reference numeral 15 denotes a ground conductor plate), an IC chip is connected between the ½-wave microstrip line resonator 13 and the ground conductor plate 15, the RFID tag being able to be mounted or attached to a metallic object (a conductor) because the radiation characteristic of the antenna is hardly influenced even if the metallic object (the conductor) is placed on a side of the ground conductor plate 15.

In FIG. 1 of patent reference 3, an RFID tag equipped with a terminal 3 formed on a surface of a substrate 1, and an IC chip 6 placed in an IC chip placement region 9 formed in a part of the substrate 1 and connected to the terminal 3 is disclosed.

This patent reference also discloses an advantage of being able to manufacture the RFID tag with a simple structure only by machining the surface of the substrate 1 and another advantage of being able to reduce the yields and manufacturing cost of the RFID tag because it is not necessary to embed the IC chip 6 into the substrate 1 and therefore the IC chip can be mounted on the antenna's upper surface.

In addition, in FIG. 19 of patent reference 4, an RFID tag 5 equipped with a dielectric member 10, a dented portion 10b for IC chip, a film base 20, an antenna pattern 30, and an IC chip 40, in which the dented portion 10b for IC chip in which the IC chip 40 can be buried is disposed in the dielectric member 10, the IC chip 40 is buried in this dented portion 10b for IC chip, and a loop antenna constructed of the antenna pattern 30, in which the film base 20 is wound around the dielectric member 10 in such a manner that the antenna pattern 30 formed on an inner surface of the film base 20 is electrically connected to the IC chip 40, so as to suppress the reduction in the communication range also in the vicinity of an electric wave absorber is disclosed.

Furthermore, in FIG. 4 of patent reference 5, an RFID tag in which an aperture 31 via which a part of a dielectric substance 20 is exposed is formed in an antenna face 30 is disclosed.

In the disclosed RFID tag, the aperture has a pair of first slits 31a extending in parallel so as to be opposite to each other, this pair of slits 31a, and a second slit 31b making the pair of slits 31a communicate with each other, and the above-mentioned second slit 31b is placed in an intermediate part of the above-mentioned pair of first slits 31a.

A transmission-and-reception element (an IC chip) is connected to first and second power supply points 41 and 42.
[Patent reference 1] JP,2003-249820,A (FIG. 12)
[Patent reference 2] JP,2000-332523,A (FIG. 3)
[Patent reference 3] JP,2002-197434,A (FIG. 1)
[Patent reference 4] JP,2006-53833,A (FIG. 19)
[Patent reference 5] JP,2006-237674,A (FIG. 4)

Because a conventional RFID tag (an RFID tag disclosed by patent reference 1) is constructed as mentioned above, there is a problem that in a case in which an RFID tug is attached to a conductive object (a conductor), such as a metallic object, or is mounted in the vicinity of an conductive object, the dipole antenna 1 of the tug stops operating under the influence of the conductive object, and its communication range becomes short extremely.

Although it is possible to mount an RFID tag disclosed by patent reference 2 to a metallic object (a conductor), there is a problem that the structure of the tag becomes complicated and therefore manufacturing the tag becomes difficult, and this results in increase in the manufacturing cost because the RFID tag is constructed in such a manner that an IC chip is connected between a ½-wave microstrip line resonator and a ground conductor plate and it is therefore necessary to embed the IC chip into a dielectric substrate.

In the RFID tag disclosed by patent reference 3, because the thickness of the IC chip is large as compared with the conductor thickness of the antenna pattern and that of the terminal even though the downsizing of the IC chip is made to proceed, and the IC chip is mounted on the surface of the substrate, a projection is formed on the surface of the RFID tag. Therefore, it is necessary to coat the whole mounted part or part of the IC chip to protect the IC chip, and to make the surface of the RFID tag flat, as disclosed in [0023] of patent reference 3. More specifically, there is a problem that when the antenna pattern and the IC chip are mounted in the substrate, there is a possibility that the IC chip might be damaged by a shock or the like, and it becomes difficult to print something directly on the surface (the upper surface) of the RFID tag using a label printer.

Furthermore, the problem as mentioned above arises when a film in which the antenna pattern and the IC chip is mounted is bonded to the substrate because a swelling (a projection) appears in the film due to the mounting of the IC chip.

Furthermore, a problem with the RFID tag disclosed by patent reference 4 is that although a swelling (a projection) hardly appears in the film (the film base) due to the mounting of the IC chip, in a case in which the RFID is attached to a conductive object (a conductor), such as a metallic object, or is mounted in the vicinity of an conductive object, the loop antenna stops operating under the influence of the conductive object, and the communication range becomes short extremely.

Because in the RFID tag disclosed by patent reference 5, the aperture has a pair of first slits 31a extending in parallel so as to be opposite to each other, this pair of slits 31a, and a second slit 31b making the pair of slits 31a communicate with each other, and the above-mentioned aperture 31 is constructed in such a manner that regions 36 and 37 of the antenna face 30 which are formed by the substance 20 which is exposed via the aperture 31 form a matching circuit for the transmission-and-reception element, the pair of slits 31a have a shape which is long from side to side in a lateral direction which is a direction of electric power supply, an electric field which is a cross polarization component in a longitudinal direction also occurs in the pair of slits 31a while an electric field of correct polarization in the lateral direction occurs in the second slit 31b, and therefore the gain of the correct polarization component decreases.

Furthermore, because the generated cross polarization is radiated in a direction different from the direction in which the correct polarization is expected to be radiated, there may be cases that the RFID tag communicates with a reader writer even though the tag is staying at a location where it is not desirable that the RFID tag communicates with the reader writer. It is thus difficult to mount and make use of the tag.

In addition, because in the patch antenna disclosed by patent reference 5, the slit is basically placed at a position spaced apart from the center of the antenna face 30 while the power supply points 41 and 42 are arranged in the vicinity of the center of the antenna face 30, the pattern of the correct polarization also becomes asymmetrical and this has an influence upon the symmetric property of the radiation pattern of the antenna. As can be seen from this, it is clear that in the patch antenna disclosed by patent reference 1, much of the attention is focused on the matching between the regions 36 and 37 and the transmission-and-reception element (the IC chip).

In contrast, in accordance with the invention in this application, in a case in which an RFID tag (a patch antenna) is constructed as shown in FIG. 33, because the direction of an electric field which occurs in a slot (a slit) portion matches with the direction of the electric field of the patch antenna, the cross polarization component is reduced to a substantially low value, while the pattern of the correct polarization also becomes symmetrical because the slot is basically placed in the center of the patch antenna, and therefore the symmetric property of the radiation pattern of the antenna can be enhanced. However, a problem with these RFID tags (the patch antennas) is that because the length of the slit for making the matching is determined by the use frequency and the specifications of the IC chip to be used, and the minimum size of the patch antenna is decided by the length of the slit, there is a possibility that the RFID tag cannot be mounted in a case in which the mounting place of the RFID tag is narrow.

Furthermore, in the RFID tag disclosed by patent reference 5, because the thickness of the IC chip is large as compared with the conductor thickness of the antenna pattern and that of the terminal even though the downsizing of the IC chip is made to proceed, and the IC chip is mounted on the surface of the substrate, a projection is formed on the surface of the RFID tag. Therefore, in a case in which the RFID tag is required to have the resistance to environment, it is necessary to coat the whole mounted part or part of the IC chip to protect the IC chip, and to make the surface of the RFID tag flat. More specifically, a problem is that when the antenna pattern and the IC chip are mounted in the substrate, there is a possibility that the IC chip might be damaged by a shock or the like, and it becomes difficult to print something directly on the surface (the upper surface) of the RFID tag using a label printer. In addition, when a film in which the antenna pattern and the IC chip is mounted is bonded to the substrate in order to dispose a printing surface on which a label can be printed on the surface of the RFID tag, the problem as mentioned above arises because a swelling (a projection) appears in the film due to the mounting of the IC chip.

The present invention is made in order to solve the above-mentioned problems, and it is therefore an object of the present invention to provide an RFID tag having a simple structure in which an antenna pattern and an IC chip are disposed on a surface of the RFID tag, and the IC chip does not need to be buried into a dielectric substrate, the RFID tag being able to be mounted regardless of whether an object onto which the RFID tag is to be mounted is a conductive one or a non-conducting one, a method of manufacturing the RFID tag, and a method of mounting the RFID tag.

It is another object of the present invention to provide an RFID tag which can be mounted regardless of whether an object onto which the RFID tag is to be mounted is a conductive one or a non-conducting one without shortening the communication range of the tag.

It is a further object of the present invention to provide an RFID tag which prevents the possibility of breakage of an IC chip due to a shock or the like, and which makes it possible to print something thereon using a label printer.

It is a still further object of the present invention to provide an RFID tag which can improve the flexibility of the size and shape thereof and can improve the flexibility of a mounting place where the RFID tag is to be mounted.

DISCLOSURE OF THE INVENTION

An RFID tag in accordance with the present invention includes: a dielectric substrate; a ground conductor portion disposed on one main surface of this dielectric substrate; a patch conductor portion disposed on another main surface of the above-mentioned dielectric substrate and forming a slot; electrical connecting portions internally extending from opposing sides of the above-mentioned slot, respectively; and an IC chip placed in the above-mentioned slot and connected to the above-mentioned electrical connecting portions.

As a result, because the IC chip placed in the slot is connected to the electrical connecting portions extending internally from the opposing sides of the slot, respectively, the IC chip is placed at a location where the electric field in a direction of the thickness of the dielectric substrate is 0, there is a little bad influence exerted upon the symmetric property of the radiation pattern of the patch conductor portion when the RFID tag performs radio communications with a reader writer. Furthermore, because the IC chip is connected to a power supply point, there is provided an advantage of being able to reduce the electric supply loss greatly, thereby lengthening the communication available distance of the RFID tag. In addition, because the electrical connecting portions are formed, there is provided another advantage of being able to prevent the RFID tag from having a limitation on the size of an IC chip which can be placed in the RFID tag even when the range of change in the size of the slot is restricted.

In the RFID tag in accordance with the present invention, the slot can be formed in a central part of the patch conductor portion, and can be formed in a long narrow shape.

As a result, there is provided an advantage of being able to reduce the bad influence exerted upon the symmetric property of the radiation pattern of the patch conductor portion in the RFID tag.

In the RFID tag in accordance with the present invention, the slot can be formed in such a manner as to become wider along both directions of being spaced apart from a position where the IC chip is placed.

As a result, there is provided an advantage of being able to broaden the communication available frequency range of the RFID tag because of the taper-shaped slot.

In the RFID tag in accordance with the present invention, a bonding layer which can be bonded to a metal can be formed on the ground conductor portion in such a manner as to be opposite to the dielectric substrate.

As a result, there is provided an advantage of being able to place the RFID tag regardless of whether an object onto which the RFID tag is to be mounted is a conductor or a non-conductor, and to enable the RFID tag to carry out radio communications with an RFID reader writer.

A manufacturing method of manufacturing an RFID tag in accordance with the present invention includes a conductor forming step of forming a ground conductor portion and a patch conductor portion on a main surface of and on another main surface of a dielectric substrate, respectively; a slot forming step of forming a slot in the above-mentioned patch conductor portion, an electrical connecting portion forming step of forming electrical connecting portions internally extending from opposing sides of the above-mentioned slot at a same time when the above-mentioned slot is formed; and a connecting step of placing an IC chip in the above-mentioned slot, and connecting the above-mentioned IC chip to the above-mentioned electrical connecting portions.

As a result, because it is not necessary to mount the IC chip in the dielectric substrate, and to fill an area surrounding the IC chip with a resin, and the electrical connecting portions which are connecting parts (contact portions) between the connecting terminals of the IC chip and the dielectric substrate can be formed at the same time when the patch conductor portion is formed and the conductor pattern is formed on the other main surface (the front surface) of the dielectric substrate, there is provided an advantage of being able to provide a manufacturing method of manufacturing an RFID tag by using a step of processing a printed circuit board which is the same as that used for manufacturing an RFID tag with a dipole antenna.

In accordance with the present invention, there is provided a method of mounting an RFID tag including: a ground conductor portion disposed on one main surface of a dielectric substrate; a patch conductor portion disposed on another main surface of the above-mentioned dielectric substrate and forming a slot; electrical connecting portions internally extending from opposing sides of the above-mentioned slot, respectively; and an IC chip placed in the above-mentioned slot and connected to the above-mentioned electrical connecting portions, the method including the steps of: forming a bonding layer which can be bonded to a metal on the above-mentioned ground conductor portion in such a manner as to be opposite to the above-mentioned dielectric substrate; and mounting the above-mentioned RFID tag to the above-mentioned metal.

As a result, there is provided an advantage of being able to provide a method of being able to mount the RFID tag regardless of whether an object to which the RFID tag is to be mounted is a conductor or a non-conductor.

An RFID tag in accordance with the present invention includes: a dielectric substrate having a hole in one main surface thereof; a ground conductor pattern disposed on another main surface of the above-mentioned dielectric substrate; a film base; a conductor pattern disposed on the above-mentioned film base and forming a slot therein; and an IC chip electrically connected to the above-mentioned conductor pattern via the above-mentioned slot and inserted into the above-mentioned hole of the above-mentioned dielectric substrate.

As a result, because the conductor pattern which constructs the slot acts as a radiant portion of a patch antenna, not only in a case in which the RFID tag is mounted to a non-conductive object, but also in a case in which the RFID tag is mounted to a conductive object, the antenna radiation characteristics of the RFID tag are subjected to little influence. Furthermore, because the RFID tag is constructed in such a manner that the IC chip is electrically connected to the electric conduction pattern via the slot, there is provided an advantage of being able to reduce the electric supply loss, thereby preventing the communication available distance from being shortened.

In addition, because any swelling due to the mounting of the IC chip does not occur because the IC chip is inserted into the hole of the dielectric substrate, there is provided another advantage of being able to reduce the frequency of occurrence of breakage of the IC chip due to a shock or the like applied to the IC chip, and to, when printing something on the IC chip using a label printer, reduce the frequency of occurrence of breakage of the IC chip because of a caught of the IC chip in the roller or drum of the printer.

An RFID tag in accordance with the present invention includes: a dielectric substrate having a hole in one main surface thereof; a ground conductor pattern disposed on another main surface of the above-mentioned dielectric substrate; a film base; a conductor pattern disposed on the above-mentioned film base and formed in an area of a surface of the above-mentioned film base in such a manner as to be spaced apart from any side edge of the above-mentioned film base by a predetermined distance; a slot formed in the above-mentioned conductor pattern; and an IC chip electrically connected to the above-mentioned conductor pattern via the above-mentioned slot and inserted into the above-mentioned hole of the above-mentioned dielectric substrate.

As a result, because the conductor pattern which constructs the slot acts as a radiant portion of a patch antenna, not only in a case in which the RFID tag is mounted to a non-conductive object, but also in a case in which the RFID tag is mounted to a conductive object, the antenna radiation characteristics of the RFID tag are subjected to little influence. Furthermore, because the RFID tag is constructed in such a manner that the IC chip is electrically connected to the electric conduction pattern via the slot, there is provided an advantage of being able to reduce the electric supply loss, thereby preventing the communication available distance from being shortened.

In addition, because any swelling due to the mounting of the IC chip does not occur because the IC chip is inserted into the hole of the dielectric substrate, there is provided another advantage of being able to reduce the frequency of occurrence of breakage of the IC chip due to a shock or the like applied to the IC chip, and to, when printing something on the IC chip using a label printer, reduce the frequency of occurrence of breakage of the IC chip because of a caught of the IC chip in the roller or drum of the printer.

An RFID tag in accordance with the present invention includes: a dielectric substrate having a hole in one main surface thereof; a ground conductor pattern disposed on another main surface of the above-mentioned dielectric substrate; a film base; a conductor pattern disposed on the above-mentioned film base and formed in an area of a surface of the above-mentioned film base in such a manner as to be spaced apart from any side edge of the above-mentioned film base; a slot formed in the above-mentioned conductor pattern; electrical connecting portions extending from both inner edges of the above-mentioned conductor pattern which forms the above-mentioned slot toward an inside of the above-mentioned slot, respectively; and an IC chip electrically connected to the electrical connecting portions and inserted into the above-mentioned hole of the above-mentioned dielectric substrate.

As a result, because the conductor pattern which constructs the slot acts as a radiant portion of a patch antenna, not only in a case in which the RFID tag is mounted to a non-conductive object, but also in a case in which the RFID tag is mounted to a conductive object, the antenna radiation characteristics of the RFID tag are subjected to little influence. Furthermore, because the RFID tag is constructed in such a manner that the IC chip is electrically connected to the electric conduction pattern via the slot, there is provided an advantage of being able to reduce the electric supply loss, thereby preventing the communication available distance from being shortened.

In addition, because any swelling due to the mounting of the IC chip does not occur because the IC chip is inserted into the hole of the dielectric substrate, there is provided another advantage of being able to reduce the frequency of occurrence of breakage of the IC chip due to a shock or the like applied to the IC chip, and to, when printing something on the IC chip using a label printer, reduce the frequency of occurrence of breakage of the IC chip because of a caught of the IC chip in the roller or drum of the printer.

An RFID tag in accordance with the present invention includes: a dielectric substrate having a hole in one main surface thereof; a ground conductor pattern disposed on another main surface of the above-mentioned dielectric substrate; a film base; a conductor pattern disposed on the above-mentioned film base and forming a slot in the above-mentioned film base; an IC chip electrically connected to the above-mentioned conductor pattern via the above-mentioned slot and inserted into the above-mentioned hole of the above-mentioned dielectric substrate; and a fixing means for inserting the above-mentioned IC chip into the above-mentioned hole of the above-mentioned dielectric substrate, and for fixing the above-mentioned conductor pattern of the above-mentioned film base and the one main surface of the above-mentioned dielectric substrate to each other.

As a result, because the conductor pattern which constructs the slot acts as a radiant portion of a patch antenna, not only in a case in which the RFID tag is mounted to a non-conductive object, but also in a case in which the RFID tag is mounted to a conductive object, the antenna radiation characteristics of the RFID tag are subjected to little influence. Furthermore, because the RFID tag is constructed in such a manner that the IC chip is electrically connected to the electric conduction pattern via the slot, there is provided an advantage of being able to reduce the electric supply loss, thereby preventing the communication available distance from being shortened.

In addition, because any swelling due to the mounting of the IC chip does not occur because the IC chip is inserted into the hole of the dielectric substrate, there is provided another advantage of being able to reduce the frequency of occurrence of breakage of the IC chip due to a shock or the like applied to the IC chip, and to, when printing something on the IC chip using a label printer, reduce the frequency of occurrence of breakage of the IC chip because of a caught of the IC chip in the roller or drum of the printer.

In the RFID tag, the dielectric substrate can be made from a thermoplastic resin.

As a result, there is provided an advantage of being able to greatly reduce the cost of the substrate (the manufacturing cost).

A method of manufacturing an RFID tag in accordance with the present invention includes: a hole forming step of forming a hole in one main surface of a dielectric substrate; a ground pattern forming step of forming a ground conductor pattern on another main surface of the above-mentioned dielectric substrate; a conductor pattern forming step of forming a conductor pattern having a slot on a film base; an IC chip connecting step of electrically connecting an IC chip to the above-mentioned conductor pattern via the above-mentioned slot; and a fixing step of inserting the above-mentioned IC chip into the above-mentioned hole and fixing the above-mentioned film base to the above-mentioned dielectric substrate after the above-mentioned IC chip connecting step is done.

As a result, because the structure of the RFID tag is relatively simple, there is provided an advantage of being able to manufacture a lot of RFID tags at one time, and also to greatly reduce the time required to manufacture RFID tags and to provide an increase in the yields of the RFID tags and a reduction in the manufacturing cost.

A method of manufacturing an RFID tag in accordance with the present invention includes: a dielectric substrate forming step of combining an upper metallic mold having a dented portion and a projecting portion in the above-mentioned dented portion and a lower metallic mold having a dented portion so as to form a space between the above-mentioned upper metallic mold and the above-mentioned lower metallic mold, pouring a resin made from a dielectric material into the above-mentioned space, and forming a hole in one main surface of a dielectric substrate, the hole corresponding to the projecting portion of the above-mentioned upper metallic mold; a ground conductor pattern forming step for, before the above-mentioned resin is poured into the above-mentioned space, placing a conductive foil in the dented portion of the above-mentioned lower metallic mold so as to form a ground conductor pattern on another main surface of the above-mentioned dielectric substrate at a same time when the above-mentioned dielectric substrate is formed; a conductor pattern forming step of forming a conductor pattern having a slot on a film base; an IC chip connecting step of electrically connecting an IC chip to the above-mentioned conductor pattern via the above-mentioned slot; and a fixing step of inserting the above-mentioned IC chip into the above-mentioned hole and fixing the above-mentioned film base to the above-mentioned dielectric substrate.

As a result, because the structure of the RFID tag is relatively simple, there is provided an advantage of being able to manufacture a lot of RFID tags at one time, and also to greatly reduce the time required to manufacture RFID tags and to provide an increase in the yields of the RFID tags and a reduction in the manufacturing cost.

An RFID tag in accordance with the present invention includes a dielectric substrate, a ground conductor layer disposed on a rear surface of the above-mentioned dielectric substrate, a conductor pattern disposed on a front surface of the above-mentioned dielectric substrate and having a slot, and an IC chip which transmits and receives electric waves through the above-mentioned slot, and the above-mentioned slot includes a long-narrow-shaped slot and a bent-shaped slot communicating with an end portion of the above-mentioned long-narrow-shaped slot in such a manner as to be bent and extending from the end portion in a direction perpendicular to the above-mentioned long-narrow-shaped slot.

As a result, the RFID tag can be mounted regardless of whether the object to which the RFID tag is to be mounted is non-conductive or conductive, and, because the RFID tag has a structure which is hardly influenced by any object at the back thereof when mounted, there is provided an advantage of preventing the communication available distance from being shortened. Furthermore, because the RFID tag can be mounted to even a mounting location where any conventional RFID tag has never been mounted before because the mounting location is narrow, there is provided another advantage of being able to increase the flexibility of the mounting location as compared with conventional RFID tags. There is provided a further advantage of, even if some specifications, such as the size and the characteristic impedance of the IC chip, are changed, being able to avoid any change in the size of the dielectric substrate and in the specifications by enabling change in the shape of the slot.

An RFID tag in accordance with the present invention includes: a dielectric substrate; a ground conductor layer disposed on a rear surface of the above-mentioned dielectric substrate; a conductor pattern in which a slot including a long-narrow-shaped slot and a bent-shaped slot communicating with an end portion of the above-mentioned long-narrow-shaped slot in such a manner as to be bent and extending from the end portion in a direction perpendicular to the above-mentioned long-narrow-shaped slot is formed in a front surface of the above-mentioned dielectric substrate; electrodes extending from both inner edges of the above-mentioned conductor pattern toward an inside of the above-mentioned long-narrow-shaped slot and being spaced apart from each other; and an IC chip electrically connected to the above-mentioned electrodes, for transmitting and receiving electric waves through the above-mentioned slot.

As a result, the RFID tag can be mounted regardless of whether the object to which the RFID tag is to be mounted is non-conductive or conductive, and, because the RFID tag has a structure which is hardly influenced by any object at the back thereof when mounted, there is provided an advantage of preventing the communication available distance from being shortened. Furthermore, because the RFID tag can be mounted to even a mounting location where any conventional RFID tag has never been mounted before because the mounting location is narrow, there is provided another advantage of being able to increase the flexibility of the mounting location as compared with conventional RFID tags. There is provided a further advantage of, even if some specifications, such as the size and the characteristic impedance of the IC chip, are changed, being able to avoid any change in the size of the dielectric substrate and in the specifications by enabling change in the shape of the slot.

An RFID tag in accordance with the present invention includes: a film base; a conductor pattern in which a slot including a long-narrow-shaped slot and a bent-shaped slot communicating with an end portion of the above-mentioned long-narrow-shaped slot in such a manner as to be bent and extending from the end portion in a direction perpendicular to the above-mentioned long-narrow-shaped slot is formed in the above-mentioned film base; electrodes extending from both inner edges of the above-mentioned conductor pattern toward an inside of the above-mentioned long-narrow-shaped slot and being spaced apart from each other; an IC chip electrically connected to the above-mentioned electrodes, for transmitting and receiving electric waves through the above-mentioned slot; a dielectric substrate in which a groove portion is formed in a front surface thereof and the above-mentioned IC chip is fitted into the above-mentioned groove portion; a fixing means for fixing the above-mentioned conductor pattern to the front surface of the above-mentioned dielectric substrate; and a ground conductor layer formed on a rear surface of the above-mentioned dielectric substrate.

As a result, while the flexibility of the mounting location can be increased as compared with conventional RFID tags, any swelling due to the mounting of the IC chip does not occur because the IC chip is fitted into the groove portion of the dielectric substrate. Therefore, there is provided another advantage of being able to reduce the frequency of occurrence of breakage of the IC chip due to a shock or the like applied to the IC chip, and to, when printing something on the IC chip using a label printer, reduce the frequency of occurrence of breakage of the IC chip because of a caught of the IC chip in the roller or drum of the printer.

In the RFID tag, the IC chip can be placed in a central part of the long-narrow-shaped slot.

As a result, while the flexibility of the mounting location can be increased as compared with conventional RFID tags, the slot is formed in the central part of the conductor pattern and has a long narrow shape. Therefore, there is provided an advantage of being able to reduce the bad influence exerted upon the symmetric property of the radiation pattern produced by the conductor pattern which is the radiant portion of the RFID tag.

In the RFID tag, the bent-shaped slot can be extending in either one direction or both directions perpendicular to the long-narrow-shaped slot.

As a result, while the flexibility of the mounting location can be increased as compared with conventional RFID tags, there is provided an advantage of being able to increase the flexibility of the design of the shape of the slot.

In the RFID tag, the bent-shaped slot can be arranged in such a manner as to be symmetric with respect to the IC chip.

As a result, while the flexibility of the mounting location can be increased as compared with conventional RFID tags, there is provided an advantage of being able to increase the flexibility of the design of the shape of the slot.

In the RFID tag, the conductor pattern can be formed in a part of the front surface of the dielectric substrate excluding a peripheral portion of the front surface.

As a result, while the flexibility of the mounting location can be increased as compared with conventional RFID tags, there is provided an advantage of being able to enable the RFID to carry out more-stable long-distance radio communications with an RFID reader writer.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
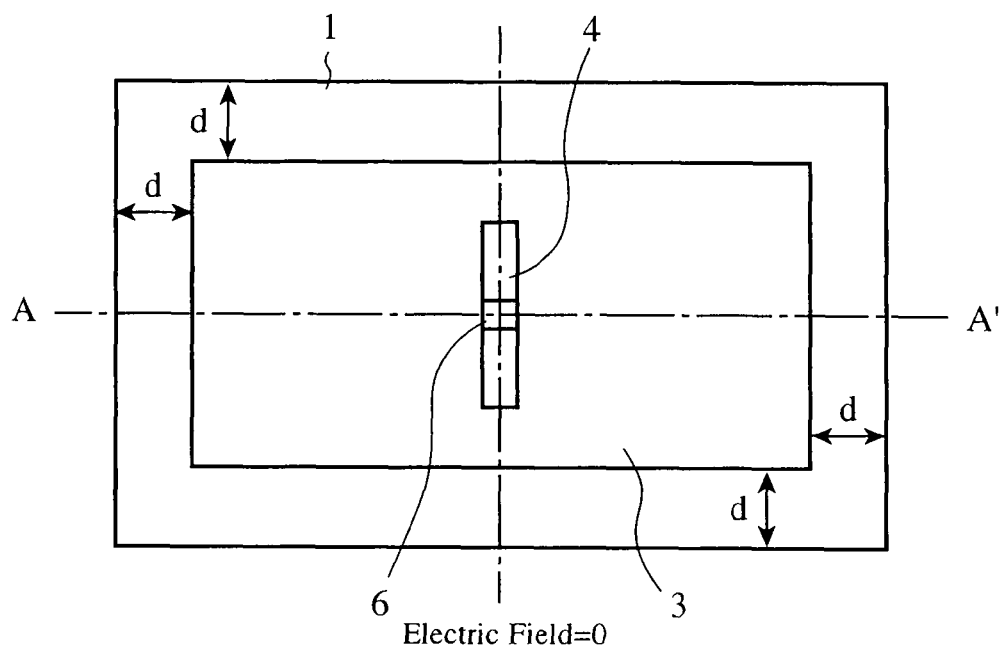
FIG. 1 is a structural diagram of an RFID tag in accordance with Embodiment 1 of the present invention.
Figure 1:
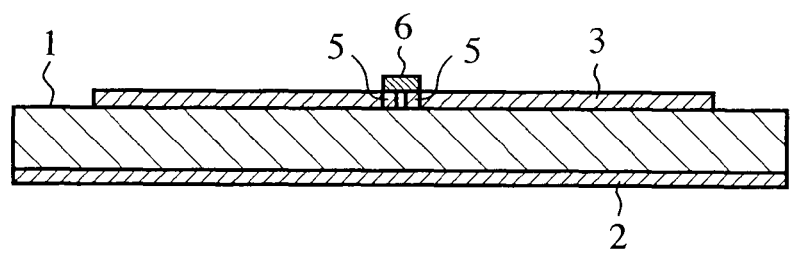
Figure 1:
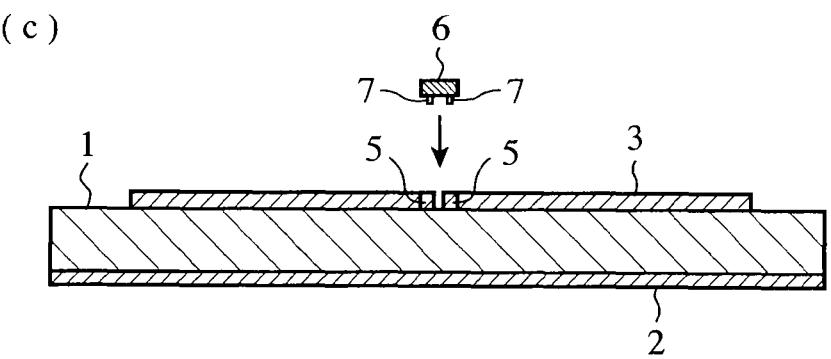
Figure 2:
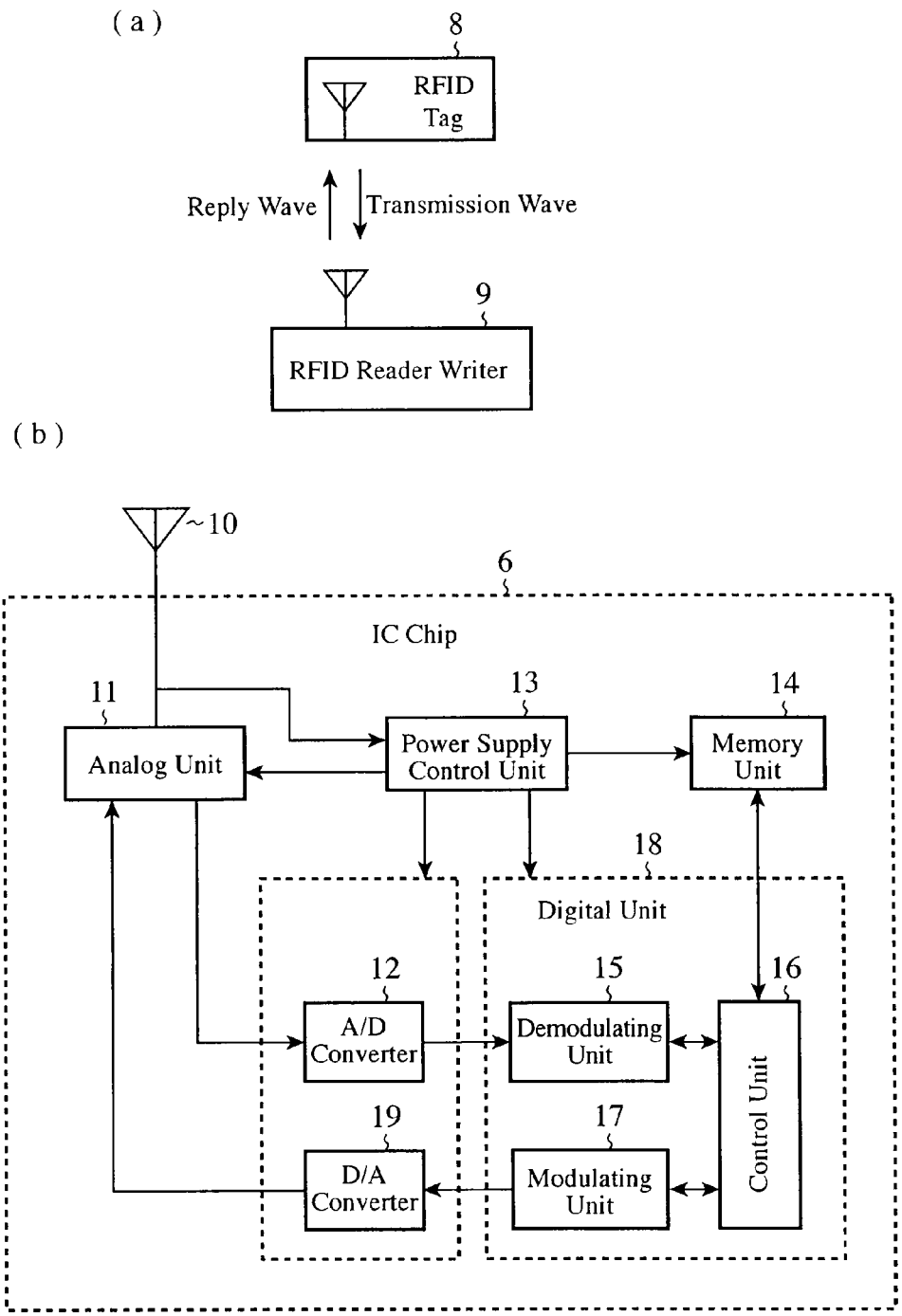
FIG. 2 is a basic block diagram of an RFID system in accordance with the present invention.
Figure 3:
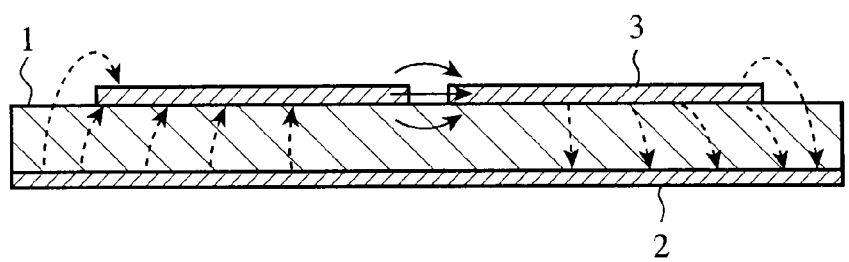
FIG. 3 is a graphical representation of an electric field of an RFID tag in accordance with the present invention.
Figure 4:
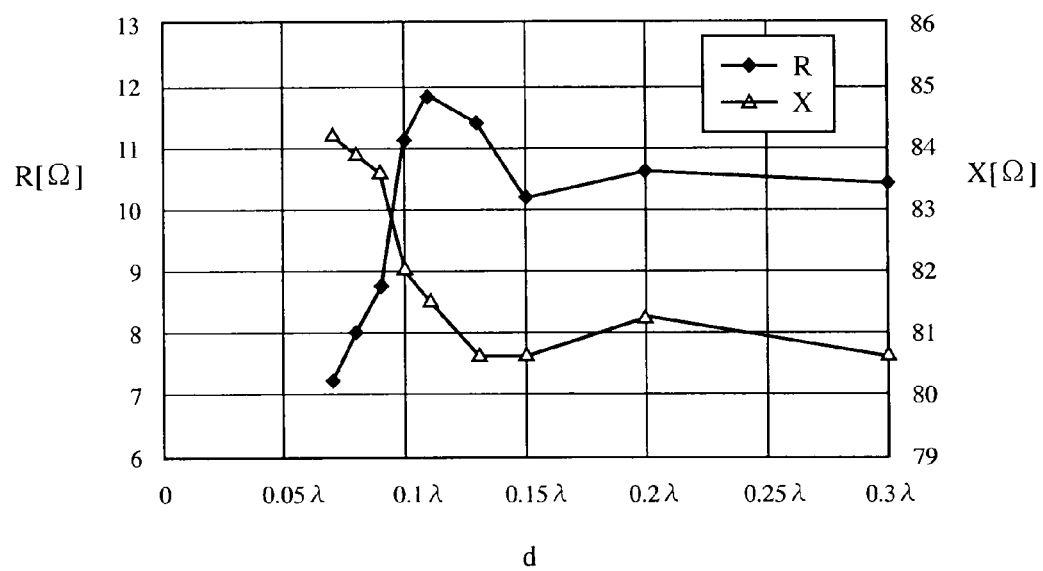
FIG. 4 is a characteristic-impedance drawing of the RFID tag in accordance with Embodiment 1 of the present invention.
Figure 5:
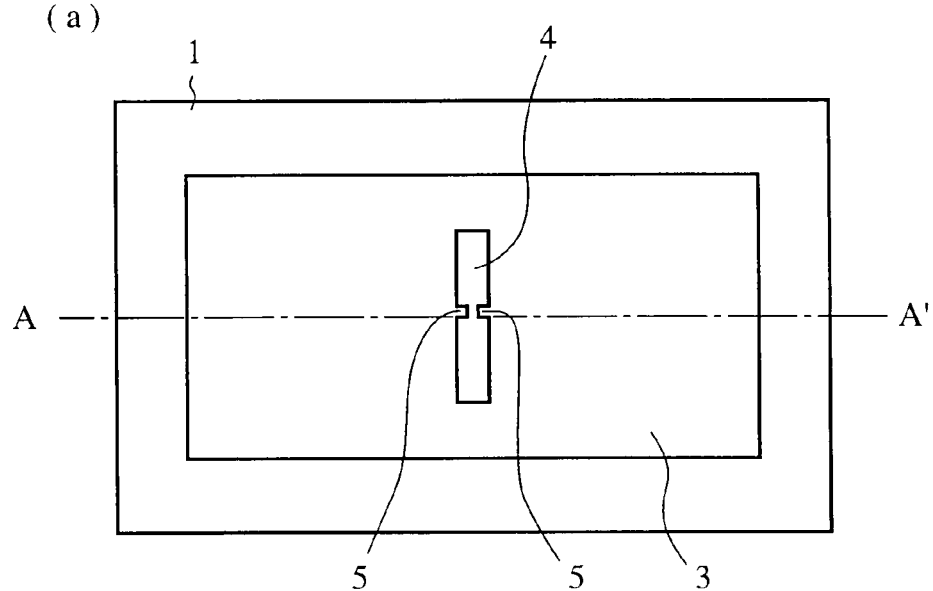
FIG. 5 is a drawing showing that electrical connecting portions of the RFID tag in accordance with Embodiment 1 of the present invention are exposed.
Figure 5:
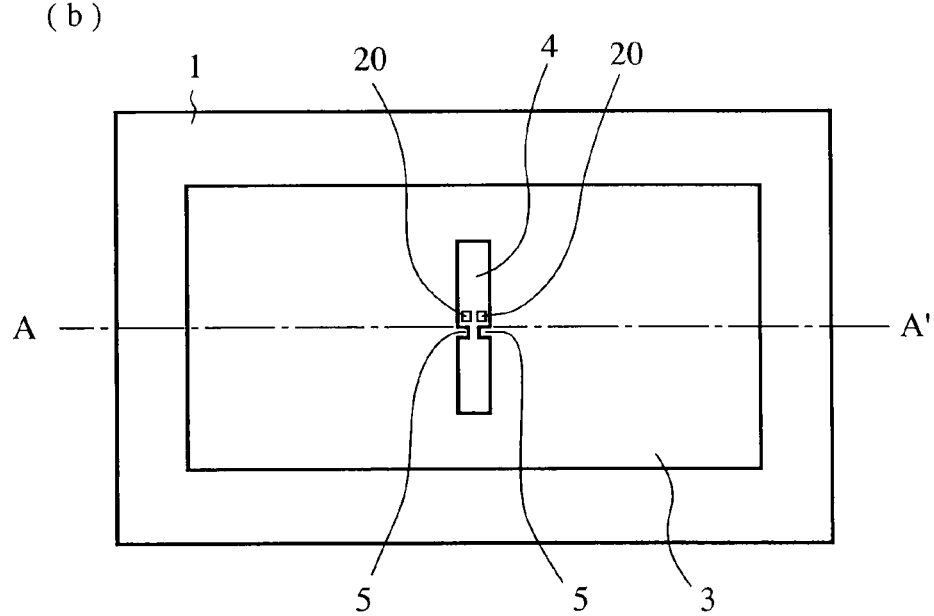
Figure 5:
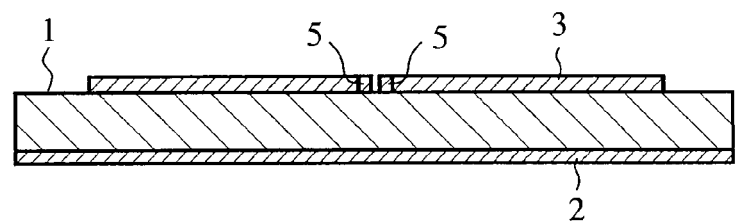
Figure 6:
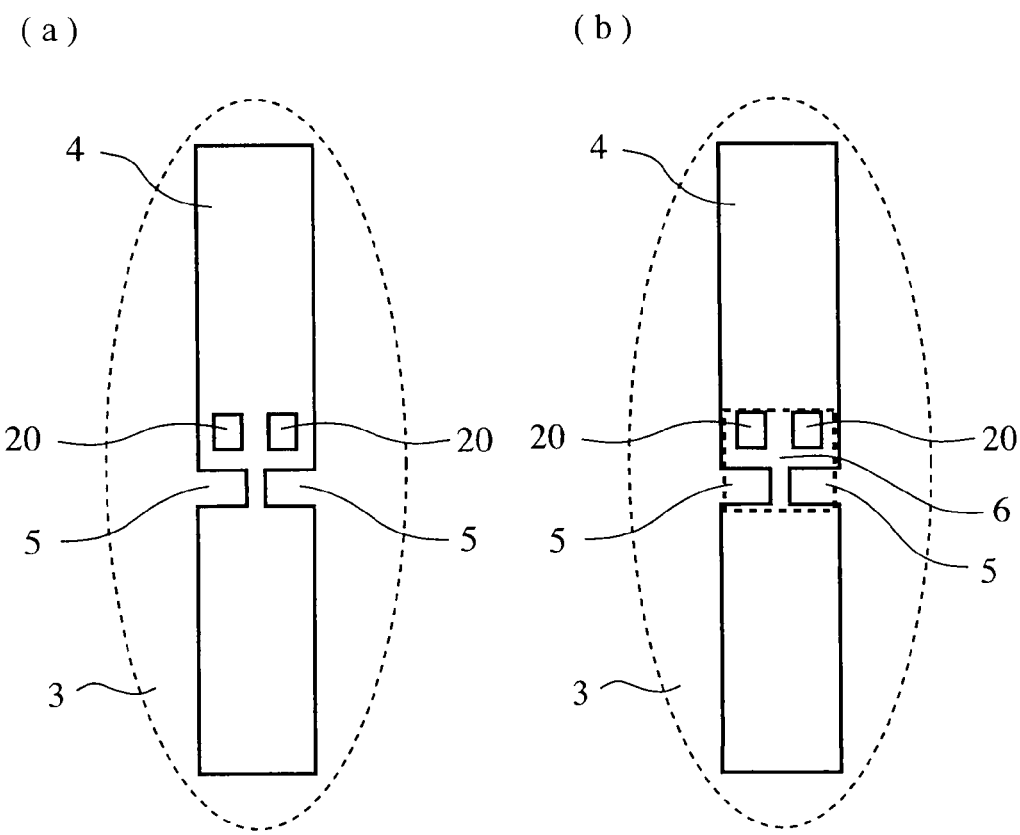
FIG. 6 is an enlarged view of a slot of the RFID tag in accordance with Embodiment 1 of the present invention.

Hereafter, Embodiment 1 of the present invention will be explained with reference to FIGS. 1 to 6. FIG. 1 is a structural diagram of an RFID tag in accordance with Embodiment 1, FIG. 1(a) is a surface view of a dielectric substrate, FIG. 1(b) is a partially sectional view 1 of the dielectric substrate taken along the line A-A', FIG. 1(c) is a partially sectional view 2 of the dielectric substrate taken along the line A-A', FIG. 2 is a basic block diagram of an RFID system, FIG. 2(a) is a diagram of the RFID system, FIG. 2(b) is a functional block diagram of the RFID tag, FIG. 3 is a graphical representation of an electric field of the RFID tag, FIG. 4 is a drawing of the characteristic impedance of the RFID tag in accordance with Embodiment 1, FIG. 5 is a drawing showing that electrical connecting portions of the RFID tag in accordance with Embodiment 1 of the present invention are exposed, FIG. 5(a) is a drawing of a 2-terminal example of the RFID tag, FIG. 5(b) is a drawing of a 4-terminal example of the RFID tag, FIG. 5(c) is a partially sectional view of the dielectric substrate taken along the line A-A' of FIGS. 5(a) and 5(b), FIG. 6 is an enlarged view of a slot of the RFID tag in accordance with Embodiment 1, FIG. 6(a) is a drawing showing the slot before an IC chip is mounted, and FIG. 6(b) is a drawing showing the slot after the IC chip is mounted. In FIGS. 1 to 4, reference numeral 1 denotes the dielectric substrate, reference numeral 2 denotes a ground conductor portion formed on one main surface (a rear face) of the dielectric substrate 1, reference numeral 3 denotes a patch conductor portion formed on another main surfaces (a front face) of the dielectric substrate 1, reference numeral 4 denotes the rectangular slot which is formed in a long narrow shape and which is formed in a part of the patch conductor portion 3, reference numeral 5 denotes electrical connecting portions internally extending from opposing sides of the slot 4, respectively, and electrically connected to the patch conductor portion 3, reference numeral 6 denotes the IC chip placed in the slot 4 and connected to the electrical connecting portions 5, and reference numeral 7 denotes connecting terminals formed on the IC chip 6 and connected to the electrical connecting portions 5. Because there can be a case in which the size of the slot 4 required in order to achieve impedance matching is longer than the size of the patch conductor portion 3 depending on the characteristic impedance of the IC chip 6, the shape of the slot 4 is not limited to the long narrow shape.

Reference numeral 8 denotes the RFID tag, reference numeral 9 denotes an RFID reader writer which carries out radio communications with the RFID tag, reference numeral 10 denotes an antenna unit disposed in the RFID tag 8, reference numeral 11 denotes an analog unit which sends a transmission wave from the RFID reader writer 9 which the antenna unit 10 has received to a next-stage digital circuit, reference numeral 12 denotes an A/D converter which performs A/D conversion on the transmission wave, reference numeral 13 denotes a control power supply unit which smooths the transmission wave received by the antenna portion 10 by using a rectifier circuit, and which supplies electric power to each circuit of the RFID tag which generates electric power, and performs power control of each circuit, reference numeral 14 denotes a memory unit mounted in the RFID tag 8, for storing tag information, such as solid identifying information, reference numeral 15 denotes a demodulating unit which demodulates the transmission wave, reference numeral 16 denotes a control unit which controls the circuits disposed in the IC chip 6 including the memory unit 14 with the transmission wave which is demodulated by the demodulating unit 15, reference numeral 17 denotes a modulating unit which modulates a signal with information which is retrieved from the memory unit 14 by the control unit 16, reference numeral 18 denotes a digital unit comprised of the demodulating unit 15, the control unit 16, and the modulating unit 17, reference numeral 19 denotes a D/A converter which performs D/A conversion on the signal sent thereto from the modulating unit, and which sends it to the analog unit 11, and reference numeral 20 denotes a dummy pad portion. The patch conductor portion 3 does not need to be rectangle-shaped, and can be alternatively shaped like a circle or an ellipse. In the RFID tag 8, all the circuits located at backward stages of the antenna unit 11 are constructed within the IC chip 6. In the figures, the same reference numerals denote the same components or like components, and therefore the detailed explanation about them will be omitted hereafter.

First, the basic operation of the RFID system will be explained with reference to FIG. 2. According to the use of the RFID system (i.e., entrance/exit control of living bodies or articles, or physical distribution management), tag information about the use is stored in the memory unit 14 of the RFID tag 8, and the RFID reader writer 9 can perform updating or writing of the tag information in the RFID tag or can read the tag information from the RFID tag when the RFID tag 8 is existing in a transmission-and-reception area thereof or moving through the transmission-and-reception area (with the RFID tag being attached to a living body or an article which is a target of entrance/exit control or physical distribution management). The RFID reader writer 9 transmits, as a transmission wave, a command signal for instructing the RFID tag 8 to perform updating or writing, reading, or the like to the RFID tag 8 from the antenna unit of the RFID reader writer 9. The antenna unit 10 of the RFID tag 8 receives the transmission wave, and the control circuit 13 detects the transmission wave and stores electricity (performs smoothing) so as to generate operation power for the RFID tag 8, and furnishes the operation power to each circuit of the RFID tag 8. The demodulating unit 15 demodulates the transmission wave so as to generate the command signal. The control unit 16 carries out data processing of the description of the instruction shown by the generated command signal, and issues either or both of an updating or writing instruction for updating or writing the tag information in the memory unit and a reading instruction for reading the tag information from the memory unit 14. A reply wave is modulated by the modulating unit 17 with a read signal which the memory unit 14 outputs according to this instruction from the control unit 16, and is then sent to the antenna unit 10 via the analog unit 11 and is transmitted to the antenna unit of the RFID reader writer 9, so that the RFID reader writer 9 can receive the read signal and acquires desired information.

Next, the structure and operation of the RFID tag in accordance with Embodiment 1 and a method of manufacturing the RFID tag in accordance with Embodiment 1 will be explained with reference to FIGS. 1 to 6. In order to form the antenna unit 10 of the RFID tag for carrying out radio communications with the RFID reader writer 9, conductor layers are formed on the main surfaces of the dielectric substrate 1 respectively (a conductor portion forming process). A conductor layer formed on one of the main surfaces (the rear face) is the ground conductor portion 2 of the RFID tag, and a conductor layer formed on the other main surface (the front face) is the patch conductor portion 3 having the slot 4. A part of the dielectric substrate 1 can be exposed from the patch conductor portion 3 via the slot 4, and the exposed part of the dielectric substrate 1 can be coated. The slot 4 is formed in a central part of the patch conductor portion 3 in such a manner that the radiation pattern of the patch conductor portion 3 becomes good (a slot forming process), and the size of the slot 4 and the size of the patch conductor portion 3 are adjusted in such a manner that the impedance matching between the use frequency of the RFID system and the IC chip 6, which will be mentioned later, is achieved in order to excite the patch conductor portion 3. Because the thickness and specific inductive capacity of the dielectric substrate 1 are also greatly related to the adjustment, a desired radiation pattern and a desired gain are acquired by carrying out the adjustment and designing the RFID system by also taking these conditions into consideration. The electrical connecting portions 5 are formed in parts of the patch conductor portion 3, respectively, are extending from two sides of the slot 4 (i.e., the longer sides of the slot 4 shown in FIG. 1) which are the opposing sides of the slot 4 toward the center of the patch conductor portion 3, respectively, and are formed so as to be electrically continuous with the patch conductor portion 3 (an electrical connecting portion forming process). The electrical connecting portions 5 can be formed at the same time when the slot is formed. The IC chip 6 shown in FIG. 1(c) is placed at a position which is the center of the electrical connecting portions 5 within the slot 4, and where the electric field in the direction of the thickness of the substrate is 0, and is electrically connected to the electrical connecting portions 5 via the connecting terminals 7 thereof (a connecting process). The conductor layers (the ground conductor portion 2, the patch conductor portion 3, and the electrical connecting portions 5) are formed using a general processing method used for forming printed circuit boards, such as a forming process using etching, vapor deposition, milling, or the like, or a process of bonding a film on which the conductor layers are printed to the dielectric substrate 1. On the other hand, because the IC chip 6 can be mounted using thermo compression bonding or the like, only some processes on the main surfaces (the front and rear faces) of the dielectric substrate 1 make it possible to manufacture the RFID tag with a simple structure, and therefore reduction in the yields and reduction in the manufacturing cost can be made. The positioning of the connecting terminals 7 of the IC chip 6 to the electrical connecting portions 5 at the time of mounting the IC chip has only to be carried out by, for example, disposing a minute slot (not shown) in the vicinity of the center of the slot 4. In this case, the minute slot does not generally have any influence upon the electrical property of the RFID tag 8.

FIG. 3 shows an electric field which appears between the ground conductor portion 2 and the patch conductor portion 3. Because such an electric field is formed between the conductors, an electric field runs between the opposing sides of the slot 4 and therefore a potential difference occurs between the opposing sides. Therefore, the position where the electric field in the direction of the thickness of the dielectric substrate 1 is 0 is set as the electric power supply point (the electrical connecting portions 5) of the IC chip, and the electric supply loss can be reduced greatly while the bad influence which is exerted upon the symmetric property of the radiation pattern of the patch conductor portion 3 can be reduced. As a result, the communication available distance of the RFID tag can be improved. FIG. 4 shows change in the characteristic impedance of the RFID tag 8 due to change in the difference d in dimension between each of the four corners of the ground conductor portion 2 and a corresponding one of those of the patch conductor portion 3, and d in the horizontal axis shows the difference d in dimension which is expressed as a ratio to the wavelength corresponding to the use frequency of the RIFD tag and R [Ω] and X [Ω] in the vertical axis show the real part and imaginary part of the characteristic impedance, respectively. In this case, the difference in dimension between the ground conductor portion 2 and the patch conductor portion 3 refers to the length d from each side edge of the patch conductor portion 3 shown in FIG. 1 to a corresponding side edge of the dielectric substrate 1 (in FIG. 4, the dielectric substrate 1 has an area equal to that of the ground conductor portion 2). Because it is therefore clear from FIG. 4 that the impedance of the RFID tag 8 becomes nearly fixed in a case in which d is equal to or greater than 0.1λ, radio communications with the RFID reader writer 9 can be carried out by making d be equal to or greater than 0.1 regardless of whether an object onto which the RFID tag 8 is to be mounted is a conductor or a non-conductor. Furthermore, even in a case in which the RFID tag is placed with floating in the air, the RFID tag can carry out radio communications with the RFID reader writer 9 without its performance degrading.

Explaining the RFID tag 8 having the IC chip 6 which is excited by the patch conductor portion 3 in accordance with Embodiment 1 with reference to the basic operation of the above-mentioned RFID system, "the RFID reader writer 9 transmits, as a transmission wave, a command signal for instructing the RFID tag 8 to carry out updating or writing, reading, or the like to the RFID tag 8 from the antenna unit of the RFID reader writer 9, the patch conductor portion 3 which is a unit for radiating an electric wave of the dielectric substrate 1 which constructs the RFID tag 8 receives the transmission wave, a potential difference occurs between the opposing sides of the slot 4, the transmission wave is then furnished to the IC chip 6, the control circuit 13 detects the transmission wave furnished to the IC chip 6 and stores electricity (performs smoothing) so as to generate operation power for the RFID tag 8 and then furnishes the operation power to each circuit (the IC chip 6) of the RFID tag 8, the command signal is generated from the transmission wave, either or both of the updating or writing process of updating or writing the tag information in the memory unit 14 and the reading process of reading the tag information from the memory unit 14 are carried out according to the description of the instruction shown by the generated command signal, a read signal outputted by the memory unit 14 is made to, as a reply wave, pass along the same route as that along which the transmission wave is furnished to the IC chip 6, the reply wave is transmitted from the patch conductor portion 3 which is a unit for radiating the wave to the RFID reader writer 9, and the antenna unit of the RFID reader writer 9 receives the reply wave and acquires desired information." Thus, it is clear from the above description that the same operation as the basic operation of the RFID system is performed perfectly. The description of data which are transmitted through radio communications which the RFID system carries out can be based on a conventional technology or newly defined. Because the ground conductor portion 2 is formed on the rear face of the dielectric substrate 1, by orienting the rear face of the dielectric substrate 1 toward a surface of an object onto which the RFID tag is to be mounted, the RFID tag with a simple structure which can be mounted regardless of whether the object onto which the RFID tag is to be mounted is a conductor or a non-conductor can be manufactured at a low cost, can be used in a wide of fields, such as physical distribution management, warehouse management, equipment management, entrance/exit control of cars, etc. which need a lot of RFID tags, and can be mounted even if the object onto which the RFID tag is to be mounted or the surface of the object onto which the RFID tag is to be mounted is a conductor such as a metallic object.

The details of the mounting of the IC chip 6 which is an element for implementing the RFID tag with a simple structure which can be manufactured at a low cost will be explained with reference to FIGS. 5 and 6. FIGS. 5 and 6, except FIG. 6(b), show the RFID tag 8 before the IC chip 6 is mounted to the electrical connecting portions 5. Although it is efficient that at the same time when the patch conductor portion 3 and the slot 4 are formed, the electrical connecting portions 5 are formed, it is necessary to adjust the shape and size of the electrical connecting portions according to the number and characteristic impedance of the connecting terminals 7 of the IC chip 6 to be mounted. For example, in order to achieve the impedance matching, in addition to fine adjustment of the shape of the slot 4, in a case in which the number of the legs of the connecting terminals 7 is two, the two electrical connecting portions 5 extending from the opposing sides of the slot 4, respectively, and each having a width which makes it possible for the impedance matching with the connecting terminals to be achieved are formed, as shown in FIG. 5(a), whereas in a case in which the number of the legs of the connecting terminals 7 is four, the two electrical connecting portions 5 extending from the opposing sides of the slot 4, respectively, and each having a width which makes it possible for the impedance matching with the connecting terminals to be achieved are formed, two of the legs of the connecting terminals 7 are connected to the electrical connecting portions, and the two remaining legs are connected to the dummy pad portions 20, as shown in FIG. 5(b). The dummy pad portions 20 are not electrically connected to the patch conductor portion 3 and the electrical connecting portions 5, as shown in FIGS. 5(b) and 6(a). FIG. 6(b) is a drawing showing the IC chip 6 when mounted to the slot, which is drawn in perspective. As can be seen from FIG. 6(b), the dummy pad portions 20 are only dummy pads which are independent not only electrically but also in terms of electric waves, and are used for placing the remaining two legs of the connecting terminals 7. It is efficient that a method of forming the dummy pad portions at the same time when the electrical connecting portions 5 are formed is used. As mentioned above, because a general method of processing printed circuit boards can be used and can flexibly respond to change in the specifications of the IC chip 6, the RFID tag with a simple structure can be manufactured at a low cost. The number of the dummy pad portions 20 is not limited to two, and there can be a case in which no dummy pad portions are disposed depending upon the number of the connecting terminals 7 of the IC chip 6.

Embodiment 2

Figure 7:
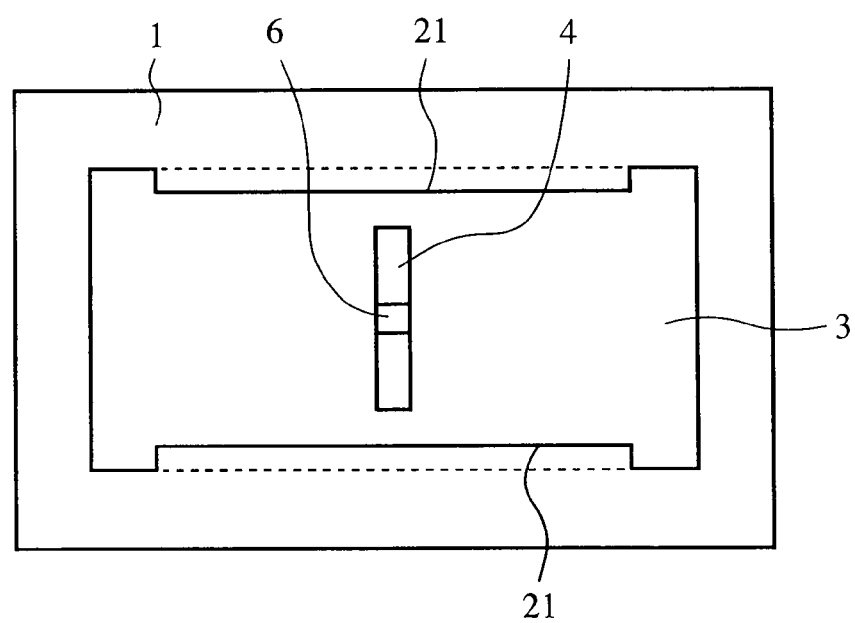
FIG. 7 is a structural diagram of an RFID tag in accordance with Embodiment 2 of the present invention.
Figure 8:
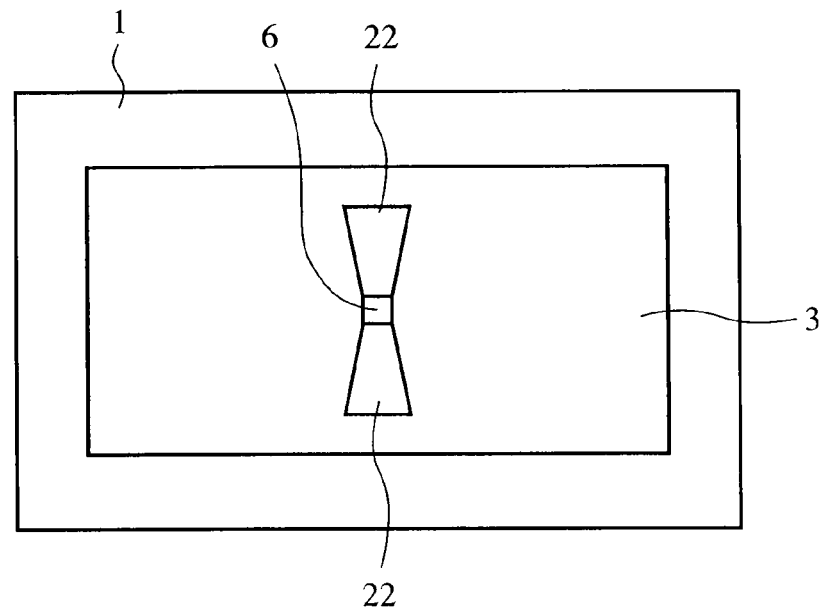
FIG. 8 is a structural diagram of the RFID tag in accordance with Embodiment 2 of the present invention.
Figure 9:
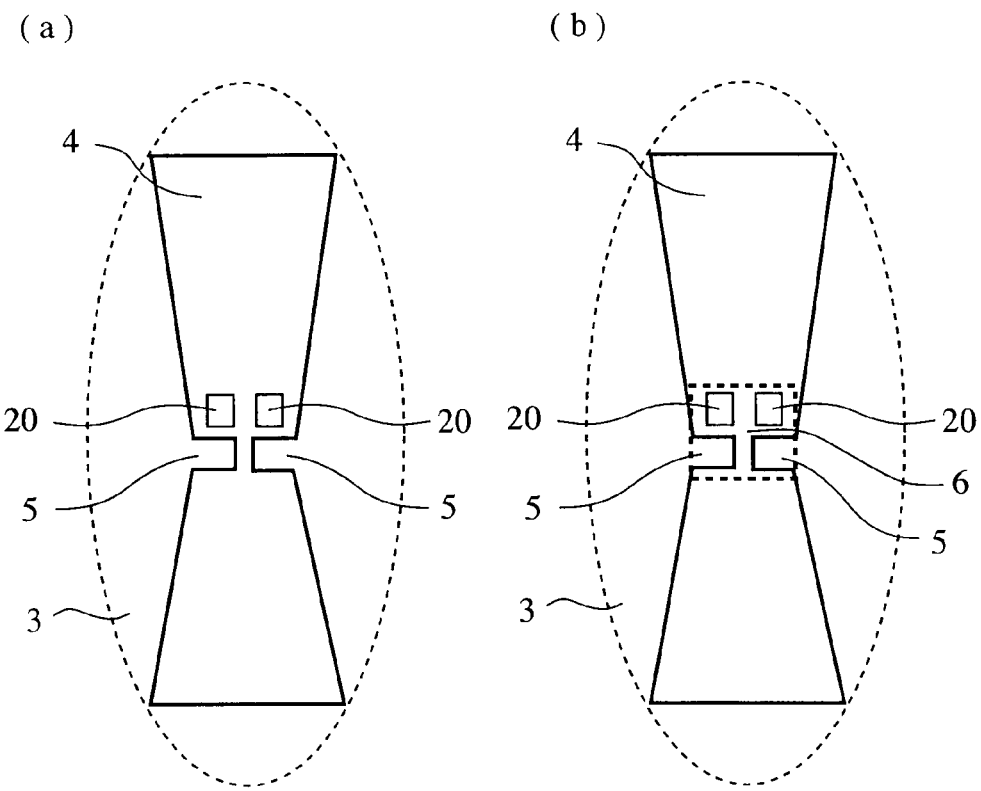
FIG. 9 is an enlarged view of a slot of the RFID tag in accordance with Embodiment 2 of the present invention.
Figure 10:
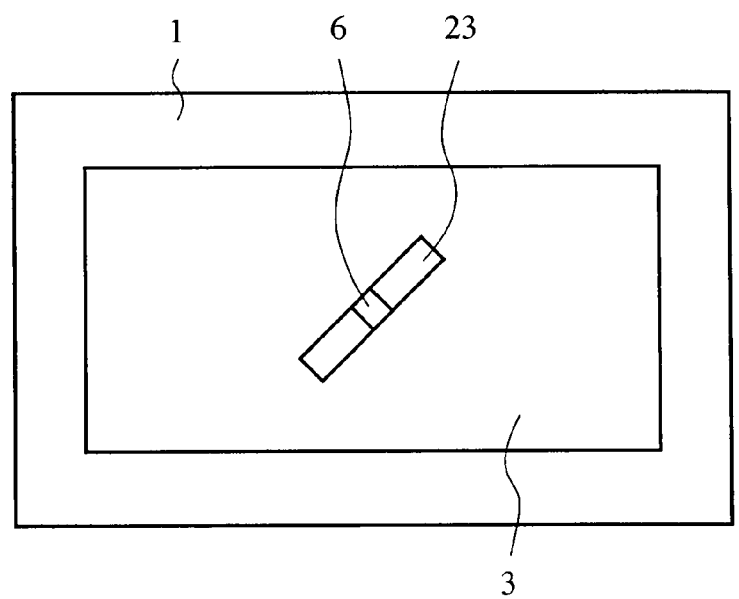
FIG. 10 is a structural diagram of the RFID tag in accordance with Embodiment 2 of the present invention.

Embodiment 2 of the present invention will be explained with reference to FIGS. 7 to 10. FIG. 7 is a structural diagram of an RFID tag in accordance with Embodiment 2, FIG. 8 is a structural diagram of an RFID tag in accordance with Embodiment 2, FIG. 9 is an enlarged view of a slot of the RFID tag in accordance with Embodiment 2, FIG. 9(a) is an enlarged view of the slot before an IC chip is mounted, FIG. 9(b) is an enlarged view of the slot after the IC chip is mounted, and FIG. 10 is a structural diagram of an RFID tag in accordance with Embodiment 2. In FIGS. 7 to 10, reference numeral 21 denotes an electric length adjusting portion disposed in a side edge of a patch conductor portion 3 and cut in certain shape, reference numeral 22 denotes a taper-shaped slot formed in such a manner as to become wider along both directions of being spaced apart from a position where an IC chip 6 is placed, and reference numeral 23 denotes a slot which is formed at a certain angle with respect to a side of a patch conductor portion 3, and which causes the patch conductor portion 3 to radiate a circularly-polarized wave using a degeneration separation method. In the figures, the same reference numerals denote the same components or like components, and therefore the detailed explanation about them will be omitted hereafter.

The structure and operation of the RFID tag in accordance with Embodiment 2 will be explained hereafter with reference to FIGS. 7 to 10. In Embodiment 2, an explanation about a method of adjusting the electric length of the RFID tag, broadening of the band of the RFID tag, and transmission and reception of circularly-polarized waves using a degeneration separation method will be made, and the basic structure of the RFID tag and advantages offered by this invention are the same as those of Embodiment 1. FIG. 7 is related with the adjustment method of adjusting the electric length of the RFID tag, and this RFID differs greatly from the RFID tag of FIG. 1 in that in sides of the patch conductor portion 3, electric length adjusting portions 21 made in a certain cut are formed, respectively, as shown in the figure. Because the electric length adjusting portions 21 are formed in such a manner as to be perpendicular to the slot 4, the effective electric length of the patch conductor portion 3 becomes longer than its apparent length, and therefore the size of the patch conductor portion 3 can be reduced even though the use frequency of the RFID system is fixed. Therefore, the size of the whole of the RFID tag 8 can be reduced. Because the length of each electric length adjusting portion 21 can be changed if it is less than the length of the patch conductor portion 3, by adjusting and designing the length of each electric length adjusting portion and the depth of each cut, the size of the whole of the RFID tag 8 can be reduced to a business-card size or a size which matches with a mounting object onto which the RFID tag is to be mounted as long as the size of the whole of the RFID tag falls within certain limits. Because the thickness and specific inductive capacity of the dielectric substrate 1, the size of the patch conductor portion 3 and the size of the slot 4, and so on, as well as the adjustment of the electric length adjusting portions 21, are greatly related with the performance of the RFID tag, as in the case of Embodiment 1, by adjusting and designing the length of each electric length adjusting portion by also taking these conditions into consideration, the RFID tag 8 can be formed so as to have a desired size and provide a desired radiation pattern and a desired gain. As an alternative, an electric length adjusting portion can be disposed only in one side of the patch conductor portion 3.

FIGS. 8 and 9 are related with broadening the band of the RFID tag. The slot 22 is taper-shaped in such a manner as to become wider along both directions of being spaced apart from the position where the IC chip 6 is placed. As can be seen from the comparison with the slot 4 of FIG. 1, the opposing sides of the slot 4, except for the electrical machinery connecting portions 5, having a constant width along a direction of being spaced apart from the connecting portions are formed. Because the slot 22 is thus taper-shaped, broadening of the range of use frequencies of the RFID tag can be implemented, and the band of the RFID can be selected by adjusting how the taper-shaped slot becomes wide. Therefore, because the communication available frequency range of the RFID system can be broadened, the impedance matching can be easily achieved, decrease in the yields of RFID tags due to manufacturing errors can be reduced, and RFID tags having high environment-resistance to impedance change due to waterdrops or adhesion of dirt from an environment in which they are to be mounted can be provided. As shown in FIGS. 9(a) and 9(b), because the mounting of the IC chip 6 is the same as that explained with reference to FIGS. 6(a) and 6(b) of Embodiment 1, the explanation of the mounting will be omitted hereafter. There can be a case in which the necessity for forming the dummy pad portions 20 is avoided depending upon the number of the legs of the connecting terminals 7 disposed in the IC chip 6.

FIG. 10 relates to transmission and reception of circularly-polarized waves by of the RFID tag using a degeneration separation method. The RFID tag differs greatly from the RFID tag of FIG. 1 in that, as shown in FIG. 10, the slot 23 is formed in such a manner as to incline against the patch conductor portion 3. In comparison with the slot 4 of FIG. 1, the slot 23 is formed in such a manner as to incline at about 45 degrees relative to the patch conductor portion with its center being at the position of the IC chip 6 (in which direction the slot is inclined is determined according to whether electric waves transmitted and received have dextrorotatory or levorotatory). Because the slow 23 is disposed at such the position, the slot 23 runs as a degeneration separation element (a perturbation element) of the patch conductor portion 3. That is, because the RFID tag can substantially transmit and receive a circularly-polarized wave having a radiation pattern which is close to a radiation pattern which is superimposition of the radiation pattern of the RFID tag of FIG. 1 and the same radiation pattern whose phase is shifted by π/2, the RFID tag is adaptable to even a case in which circularly-polarized electric waves are used for radio communications in the RFID system. In general, although the degeneration separation element is formed in such a manner as to incline at about 45 degrees relative to the patch conductor portion 3, in order to acquire a good radiation pattern event under the influence of the power supply point, the degeneration separation element is not necessarily inclined at about 45 degrees and a fine adjustment needs to be carried out. However, in accordance with the present invention, because the power supply point (the IC chip 6) is disposed at a position where the electric field becomes 0, the range of the fine adjustment is relatively narrow and the adjustment is easily carried out. The electric length adjustment method, the broadening, and the transmission and reception of circularly-polarized waves using the degeneration separation of the RFID tag in accordance with Embodiment 2 can be carried out with being combined.

Embodiment 3

Figure 11:
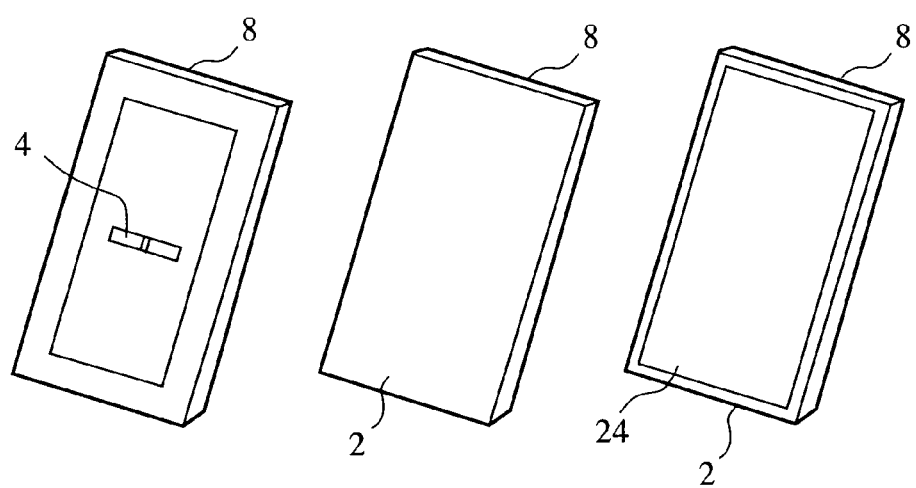
FIG. 11 is a structural diagram of an RFID tag in accordance with Embodiment 3 of the present invention.
Figure 12:
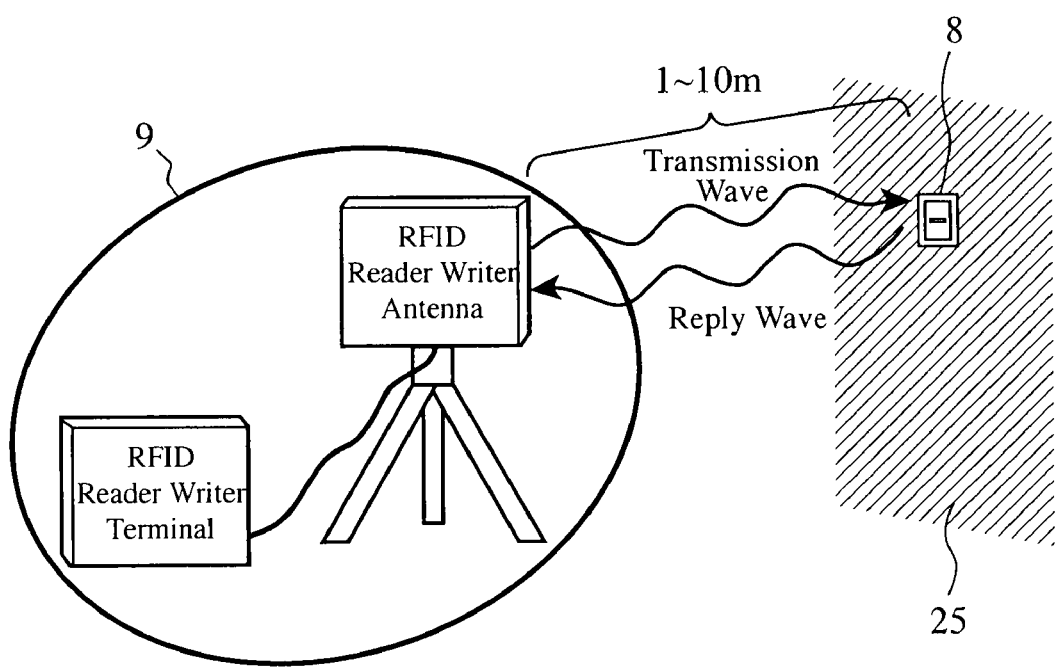
FIG. 12 is a configuration diagram of an RFID system in accordance with Embodiment 3 of the present invention.

Embodiment 3 of the present invention will be explained with reference to FIGS. 11 and 12. FIG. 11 shows the structural diagram of an RFID tag in accordance with Embodiment 3, FIG. 11(a) shows a patch conductor surface of the RFID tag, FIG. 11(b) shows a ground conductor surface (with no bonding layer) of the RFID tag, FIG. 11(c) shows a ground conductor surface (with a bonding layer) of the RFID tag, and FIG. 12 is a configuration diagram of an RFID system in accordance with Embodiment 3. In FIGS. 11 and 12, reference numeral 24 denotes a bonding layer, and reference numeral 25 denotes a mounting surface. In the figures, the same reference numerals denote the same components or like components, and the detailed explanation of them will be omitted hereafter. In the RFID tag 8 of FIG. 11, the bonding layer 24 is disposed on a surface of the ground conductor portion 2, and an adhesive bond, a double-faced tape, or the like can be used as the bonding layer 24. A method of applying the bonding layer to the surface is freely selected as long as the bonding layer can be bonded to the surface. The mounting surface 25 shown in FIG. 12 is a surface, which can be metallic or nonmetallic, of an article for use in physical distribution management, warehouse control, equipment management, or management of entrance and exit of cars. The reason why the RFID tag 8 whose bonding layer 24 is bonded to the mounting surface 25 can carry out radio communications with an RFID reader writer 9 is because the patch conductor portion 3 has an area smaller than that of the dielectric substrate 1, and therefore the change in the characteristic impedance of the RFID tag 8 due to the influence of the mounting positions of the ground conductor and the RFID tag 8 in a case in which each of them is placed on a conductor is small because of the above-mentioned structure of the RFID tag 8. Therefore, a mounting method of being able to mount the RFID tag to the mounting surface 25 regardless of whether the mounting surface 25 is metallic or nonmetallic can be used. The communication range varies according to the size of the RFID tag 8, and so on.

Embodiment 4

Figure 13:
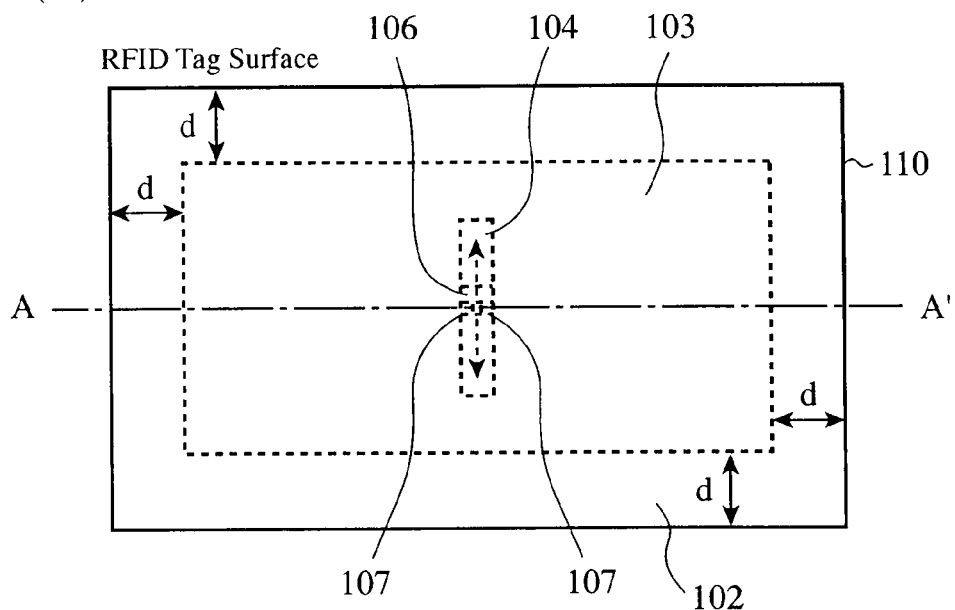
FIG. 13 is a structural diagram of an RFID tag in accordance with Embodiment 4 of the present invention.
Figure 13:
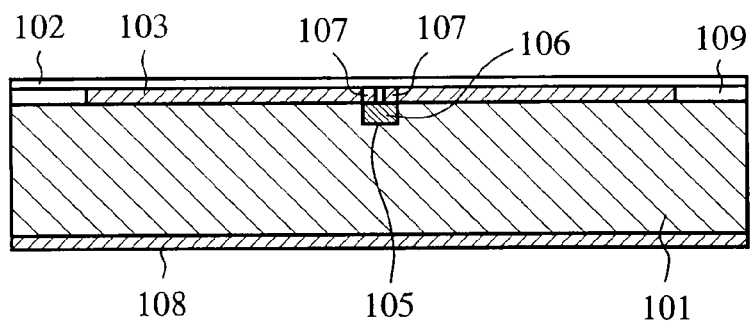
Figure 13:
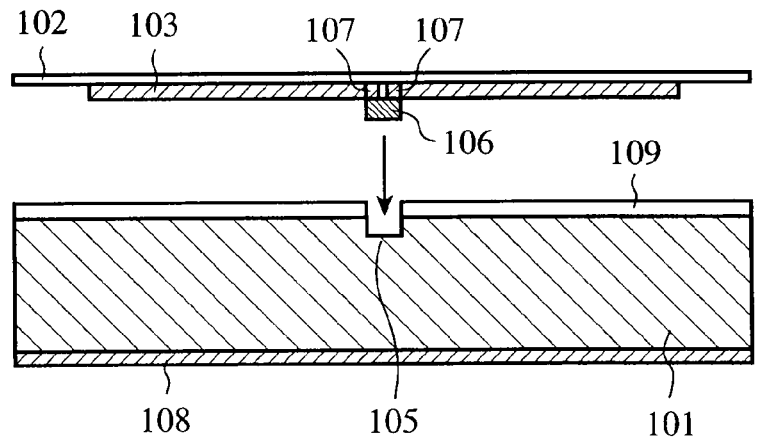

Embodiment 4 of the present invention will be explained below. FIG. 13 is a structural diagram of an RFID tag in accordance with this Embodiment 4. FIG. 13(a) is a plan view of the RFID tag, FIG. 13(b) is across-sectional view taken along the A-A' line of FIG. 13(a), and FIG. 13(c) is an exploded cross-sectional view of FIG. 13(b). In these FIG. 13, reference numeral 101 denotes a dielectric substrate which is constructed of, for example, thermoplastic elastomer olefin. Reference numeral 102 denotes a film base disposed on one main surface (a front surface) of the dielectric substrate 101. As this film base 102, film polyethylene t'er'ephthalate, polyimide, polyethylenenaphthalate, polyvinyl chloride, or the like can be used. As an alternative, the film base 102 can be something with flexibility or can be a substrate which does not have such flexibility. Furthermore, the film base can be transparent or can be colored and translucent. In FIG. 13(a), an example in which the film base 102 is transparent and therefore the RFID tag's surface is visible through the film base 102 is shown. In this case, the film base 102 and the dielectric substrate 101 have the same size in a plane. Reference numeral 103 denotes a conductor pattern formed on the film base 102. As shown in FIG. 13(a), the conductor pattern 103 is formed in an inside area of a surface of the film base 102 in such a manner as to be spaced apart from any of the shorter and longer side edges of the film base 102 by a distance d. In this case, it can also be said that the conductor pattern 103 is formed in the inside area of the surface of the film base 102 in such a manner as to be spaced apart from any of the shorter and longer side edges of the dielectric substrate 101 by the distance d. In contrast, the film base 102 can be placed on the main surface of the dielectric substrate 101 in such a manner as to be spaced apart from any of the shorter and longer side edges of the dielectric substrate 101 by the distance d. In this case, the conductor pattern 103 can also be disposed on the whole surface of the film base 102. As shown in FIG. 13(a), a long-narrow-shaped slot 104 is formed in a central part of the conductor pattern 103. This slot 104 can be formed by performing an etching process on the conductor pattern 103. Then, the length and width of this slot 104 can be determined according to the use frequency of the RFID tag. Reference numeral 105 denotes a hole formed in the one main surface of the dielectric substrate 101. Reference numeral 106 denotes an IC chip which is constructed of a memory and so on which will be mentioned later. This IC chip 106 is electrically connected to the conductor pattern 103 via the slot 104.

Hereafter, the constitution of the connection between the IC chip 106 and the conductor pattern 103 will be explained. As shown in FIGS. 13(a) and 13(b), reference numeral 107 denotes electrical connecting portions extending from parts of the conductor pattern 103 on both sides of the slot 104 toward an inside of the slot 104, respectively, and formed in a projecting shape, and the electrical connecting portions are continuously and electrically connected to the parts of the conductor pattern 103 on the both sides of the slot 104, respectively. These electrical connecting portions 107 can be formed by using etching at the same time when the conductor pattern 103 is formed. Terminals (not shown) of the IC chip 106 are connected to those electrical connecting portions 107. In a case in which the IC chip 106 has the same size as or a smaller size than the width of the slot 104, the IC chip is accommodated within the slot 104 and the terminals (not shown) of the IC chip 106 are then connected to the electrical connecting portions 107. In contrast, in a case in which the IC chip 106 has a larger size than the width of the slot 104, what is necessary is just to electrically connect the terminals (not shown) of the IC chip to parts which are passing through the slot and which are close to the slot 104 of the conductor pattern 103. Therefore, in this case, there is no necessity to provide the electrical connecting portions 107 as mentioned above.

Furthermore, in FIG. 13(a), although the IC chip 106 is placed in the central part of the slot 104 with respect to the direction of the length of the slot, the IC chip can be alternatively placed not at the central part but at an end portion of the slot 104 with respect to the direction of the length of the slot. Because the hole 105 of the above-mentioned dielectric substrate 101 is formed so that the IC chip 106 can be inserted into the hole, the hole has a depth and a width which correspond to the size of the IC chip. Then, as a matter of course, the position where the hole 105 is formed is decided according to at which part of the slot 104 the IC chip 106 is placed. Anyway, it is necessary to make the shape and the size of the slot 104 match with the number and characteristic impedance of the electrical connecting portions 107 of the IC chip 106 to be mounted in the tag. For example, in order to achieve impedance matching between the IC chip and the electrical connecting portions, in addition to a fine adjustment of the shape of the slot 104, the two electrical connecting portions 107 can be formed so as to have a width which can achieve the impedance matching in a case in which the number of the legs of the connecting terminals of the IC chip 106 is two. Next, reference numeral 108 denotes a ground conductor pattern formed on another main surface (a rear face) of the dielectric substrate 101. Reference numeral 109 denotes an adhesion sheet for bonding the dielectric substrate 101 and the film base 102 to each other. As shown in FIG. 13(c), the adhesion sheet 109 is disposed on the dielectric substrate 101 so as to cover a portion which corresponds to a portion of the dielectric substrate other than the hole 105, and can bond and fix the dielectric substrate 101 and the film base 102 to each other. In order to fix the dielectric substrate 101 and the film base 102 to each other, an adhesive bond can be used instead of the adhesion sheet 109.

Figure 14:
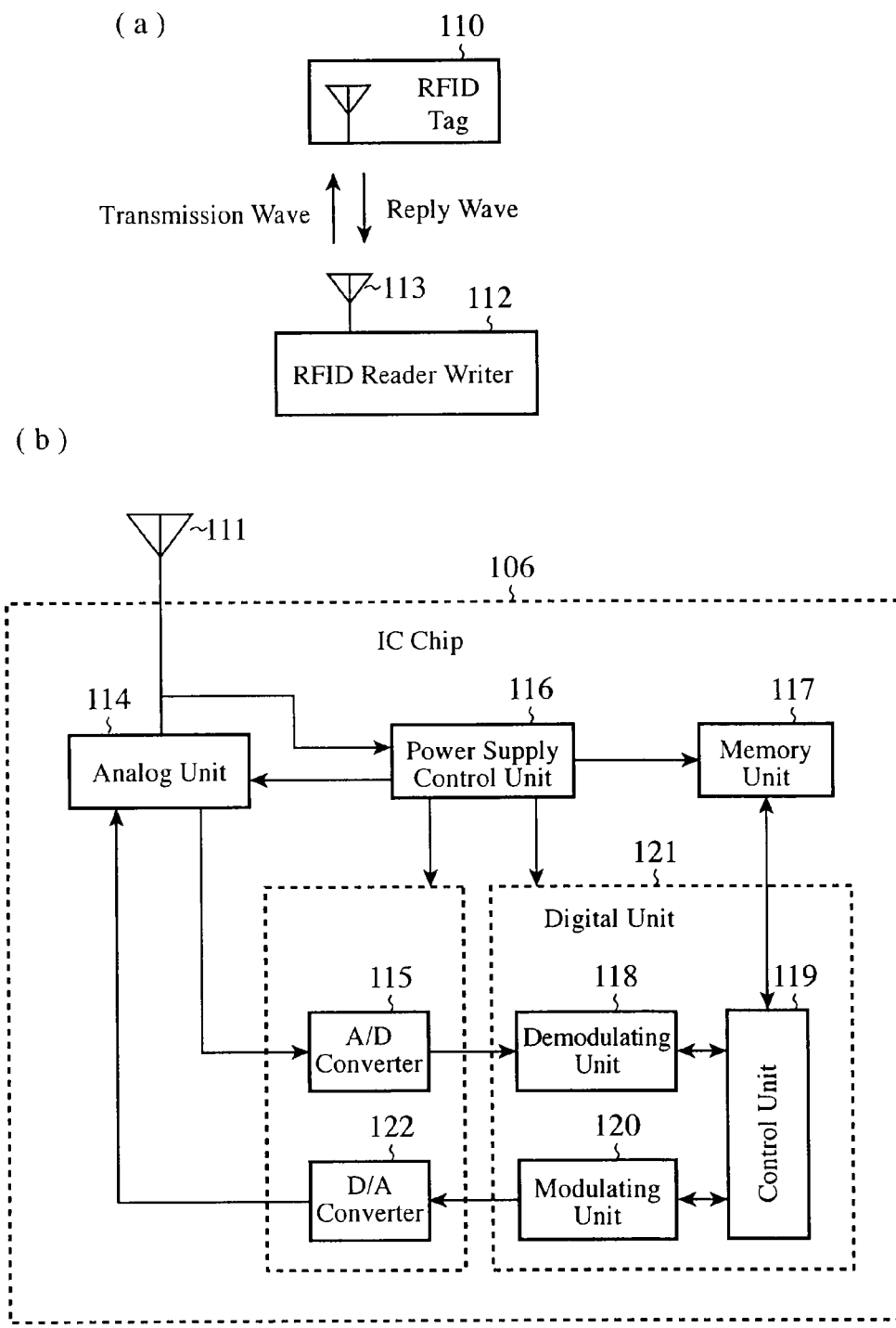
FIG. 14 is a basic block diagram of an RFID system.

FIG. 14(a) is a conceptual diagram schematically showing transmission and reception between the RFID tag and an RFID reader writer. FIG. 14(b) is a structural diagram of the RFID tag. Particularly, this figure is a block diagram functionally showing the internal structure of the IC chip 106. In FIGS. 14(a) and 14(b), reference numeral 110 denotes the RFID tag having a structure as shown in FIG. 13. Reference numeral 111 denotes an antenna unit disposed in the RFID tag 110, and, in FIG. 13, corresponds to the conductor pattern 103 in which the slot 104 is formed. As shown in FIGS. 13(a) and 13(b) mentioned above, because the conductor pattern 103 having the slot 104 is formed on the one main surface (the front surface) of the dielectric substrate 101 as the antenna unit 111 of the RFID tag 110, and the ground conductor pattern 108 is formed on the other main surface (the rear face) of the dielectric substrate 101, the RFID tag 110 functions as a patch antenna. More specifically, the conductor pattern 103 having the slot 104 functions as an antenna pattern (a radiant portion). The conductor pattern 103 and the slot 104 are adjusted in such a manner that the impedance matching between the use frequency of the RFID system and the IC chip 106 is achieved, so that the conductor pattern and the slot can be excited. Because this adjustment is greatly related to the thickness and specific inductive capacity of the dielectric substrate 101, by adjusting and designing the conductor pattern and the slot by also taking these conditions into consideration, a desired radiation pattern and a desired gain can be provided. Furthermore, the slot 104 is formed in the central part of the conductor pattern 103 so that the radiation pattern of the conductor pattern 103 becomes good, as mentioned above. By adjusting and designing the slot in consideration of this condition, the RFID tag 110 can provide a desired radiation pattern and a desired gain, and, for example, about 1 m to 8 m of communication range can be provided without enlarging the RFID tag 110, i.e., the dielectric substrate 101.

Reference numeral 112 denotes an RFID reader writer, and reference numeral 113 denotes an antenna units disposed in the RFID reader writer 112, for carrying out radio communications with the antenna unit 111 of the RFID tag 110. Reference numeral 106 denotes an IC chip as explained with reference to FIG. 13, and has a concrete structure as shown in FIG. 14(b). Reference numeral 114 denotes an analog unit which receives a transmission wave from the RFID reader writer 112 by using the antenna unit 111 of the RFID tag 110, and which outputs the transmission wave to a next-stage digital circuit 121. Reference numeral 115 denotes an A/D converter which performs A/D conversion on the transmission wave, and reference numeral 116 denotes a power supply control unit which smooths the transmission wave which the antenna unit 111 has received by using a rectifier circuit so as to generate electric power, and which supplies the electric power to and performs power control on each circuit of the RFID tag 110. Reference numeral 117 denotes a memory unit mounted in the RFID tag 110, for storing tag information, such as solid identifying information, therein. Reference numeral 118 denotes a demodulating unit which demodulates the transmission wave, and reference numeral 119 denotes a control unit which controls the circuits in the IC chip 106 including the memory unit 117 with the transmission wave demodulated by the demodulating unit 118. Reference numeral 120 denotes a modulating unit which modulates a signal with information which is retrieved from the memory unit 117 by the control unit 119, reference numeral 121 denotes a digital unit constructed of the demodulating unit 115, the control unit 116, and the modulating unit 117, and reference numeral 122 denotes a D/A converter which performs D/A conversion on the signal sent thereto from the modulating unit 120, and which outputs the signal to analog unit 114.

Hereafter, the basic operation of the RFID system having such the structure will be explained. According to the use of the RFID system (i.e., entrance/exit control of living bodies or articles, or physical distribution management), tag information about the use is stored in the memory unit 117 of the RFID tag 110, and the RFID reader writer 112 can perform updating or writing of the tag information in the RFID tag or can read the tag information from the RFID tag when the RFID tag 110 is existing in a transmission-and-reception area thereof or moving through the transmission-and-reception area (with the RFID tag being attached to a living body or an article which is a target of entrance/exit control or physical distribution management). The RFID reader writer 112 transmits, as a transmission wave, a command signal for instructing the RFID tag 110 to perform updating or writing, reading, or the like to the antenna unit 111 of the RFID tag 110 from the antenna unit 113 of the RFID reader writer 112. The antenna unit 111 of the RFID tag 110 receives the transmission wave, and the power supply control unit 116 detects the transmission wave and stores electricity (performs smoothing) so as to generate operation power for the RFID tag 110, and furnishes the operation power to each circuit of the RFID tag 110. The demodulating unit 118 demodulates the transmission wave so as to generate the command signal. The control unit 119 carries out data processing of the description of the instruction shown by the generated command signal, and issues either or both of an updating or writing instruction for updating or writing the tag information in the memory unit 117, and a reading instruction for reading the tag information from the memory unit 117. A reply wave is modulated by the modulating unit 120 with a read signal which the memory unit 117 outputs according to this instruction from the control unit 119, and is then sent to the antenna unit 113 via the analog unit 114 and is transmitted to the antenna unit 113 of the RFID reader writer 112, so that the RFID reader writer 112 can receive the read signal and acquires desired information.

Explaining in detail the operation of the RFID system using the RFID tag in accordance with Embodiment 4, the RFID reader writer 112 transmits, as a command signal for instructing the RFID tag 110 to update or write tag information therein or read tag information therefrom, a transmission wave from the antenna unit 113 of the RFID reader writer 112 to the antenna unit 111 of the RFID tag 110. When the conductor pattern 103 which is the radiant portion for radiating electric waves of the dielectric substrate 101 which constructs the RFID tag 110 receives the transmission wave, a potential difference occurs between the opposing sides of the slot 104, the transmission wave is furnished to the IC chip 106, the power supply control unit 116 detects the transmission wave furnished to the IC chip 106 and stores electricity (performs smoothing), as mentioned above, so as to generate operation power for the RFID tag 110, and furnishes the operation power to each circuit of the RFID tag 110 (i.e., each circuit of the IC chip 106), the command signal is regenerated from the transmission wave, either or both of updating or writing and reading of the tag information are performed on the memory unit 117 according to the description of the instruction indicated by the command signal regenerated, a read signal which the memory unit 117 outputs travels, as a reply wave, along the same route as that along which the transmission wave has been furnished to the IC chip 106, the reply wave is then transmitted from the conductor pattern 103 which is the radiant portion to the RFID reader writer 112, and the antenna unit 113 of the RFID reader writer 112 receives the reply wave and then acquires desired information. The description of data which are transmitted through radio communications which the RFID system carries out can be based on a conventional technology or newly defined. Because the ground conductor portion 108 is formed on the rear surface of the dielectric substrate 101, by orienting the rear surface of the dielectric substrate 101 toward a surface of an object onto which the RFID tag is to be mounted, the RFID tag with a simple structure which can be mounted regardless of whether the object onto which the RFID tag is to be mounted is a conductor or a non-conductor can be manufactured at a low cost. Therefore, the RFID tag can be used in a wide of fields, such as physical distribution management, warehouse management, equipment management, entrance/exit control of cars, etc. which need a lot of RFID tags, and can be mounted even if an object onto which the RFID tag is to be mounted or the surface of an object onto which the RFID tag is to be mounted is a conductor such as a conductive object.

Figure 15:
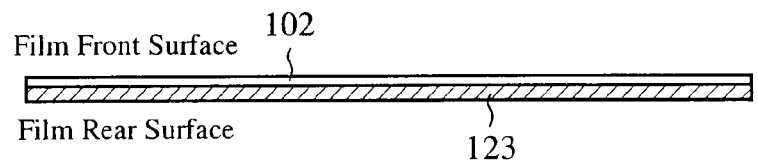
FIG. 15 is a drawing showing a process of manufacturing the RFID tag in accordance with Embodiment 4 of the present invention.
Figure 15:
Figure 15:
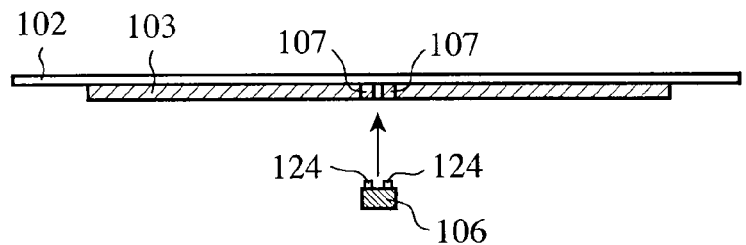
Figure 15:
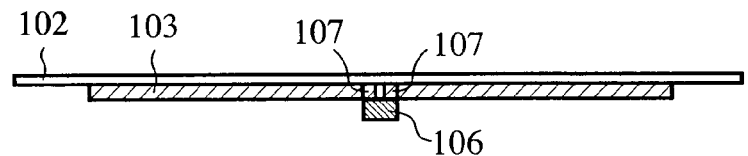
Figure 15:
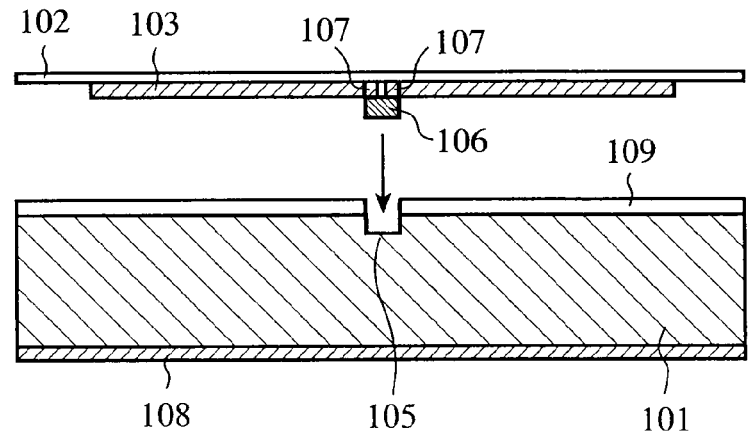

Next, manufacturing processes of a method of manufacturing the RFID tag in accordance with Embodiment 4 will be explained with reference to cross-sectional views of FIGS. 15(*a*) to 15(*e*). In FIG. 15(*a*), a conductor layer formation process of forming the conductor layer 123 on the film base 102 (i.e., the rear surface of the film base 102) is shown. In FIG. 15(*b*), a conductor pattern formation process of masking both an area in which the conductor pattern 103 is to be formed and an area in where the electrical connecting portions 107 are to be formed in the slot 104, and simultaneously forming the conductor pattern 103 and the electrical connecting portions 107 by using etching or the like is shown. A conductor pattern can be printed onto the film base 102 instead of performing the conductor layer formation process on the film base 102. Next, as shown in FIGS. 15(*c*) and 15(*d*), in an IC chip connecting process, the connecting terminals 124 of the IC chip 106 are electrically connected to the electrical connecting portions 107 by using soldering. Although thermo compression bonding using reflow is generally used as a method of electrically connecting them to each other, they can be connected to each other by alternatively using another method. On the other hand, as shown in FIG. 15(*e*), while the ground conductor pattern 108 is formed on the other main surface (the rear surface) of the dielectric substrate 101, a hole 105 into which the IC chip is inserted is formed in the one main surface (the front surface). This hole 105 is formed by using, for example, an injection molding method. After that, as shown in FIG. 15(*e*), in a film supporting process (a fixing process), an adhesion sheet 109 excluding a part corresponding to the hole 105 is bonded onto the one main surface of the dielectric substrate 101. Onto the dielectric substrate 101 to which the adhesion sheet 109 is thus bonded, the film base 102 onto which the conductor pattern 103 and the IC chip 106 are mounted are placed in such a manner that the IC chip 106 is inserted into the hole 105, so that the film base 102 is supported against the dielectric substrate 101 by the adhesion sheet 109. In this way, the RFID tag 110 is constructed.

Figure 16:
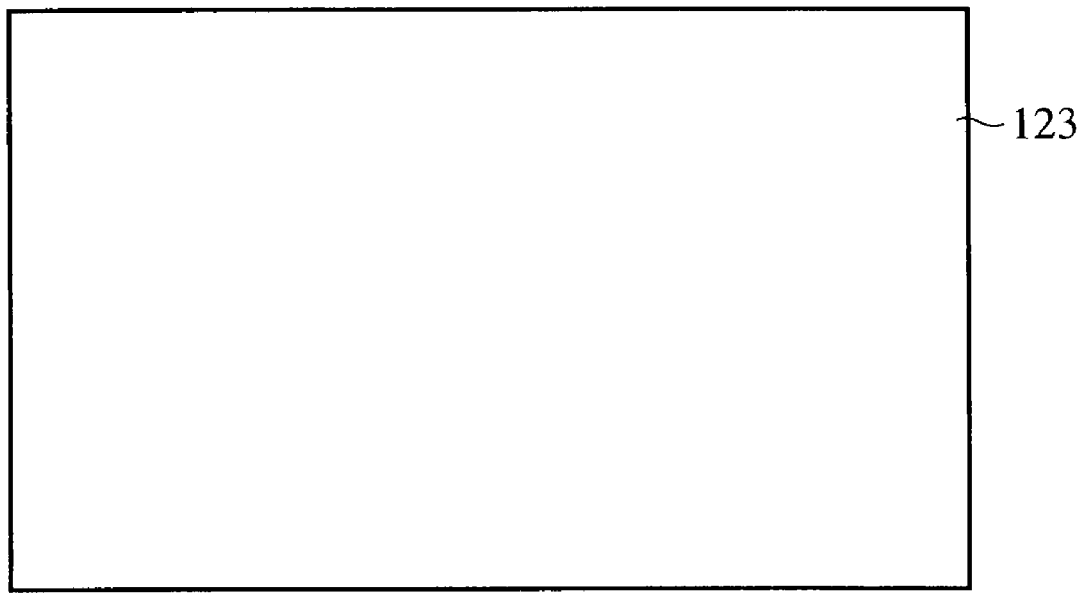
FIG. 16 is a structural diagram of a film base in accordance with Embodiment 4 of the present invention.
Figure 17:
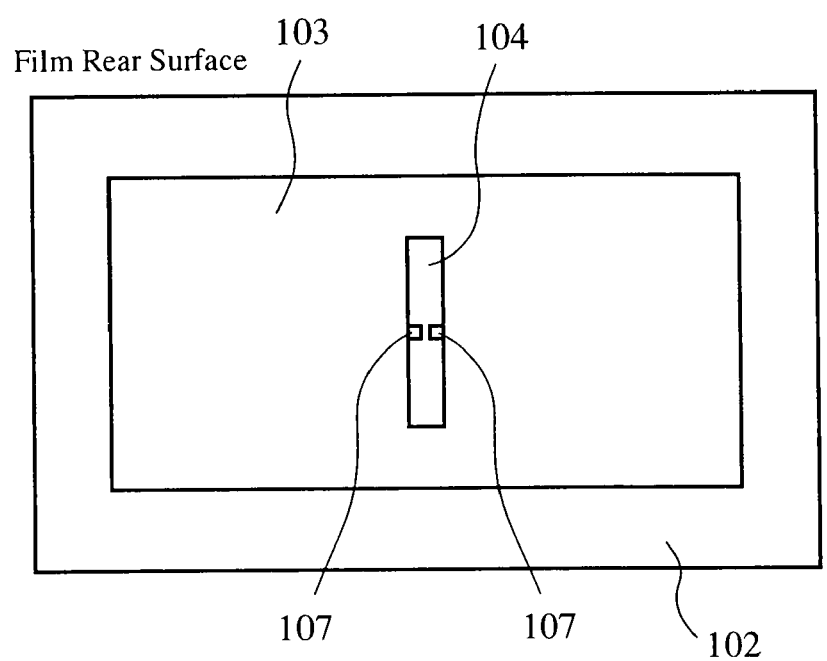
FIG. 17 is a drawing showing a conductor pattern formed on the film base in accordance with Embodiment 4 of the present invention.
Figure 17:
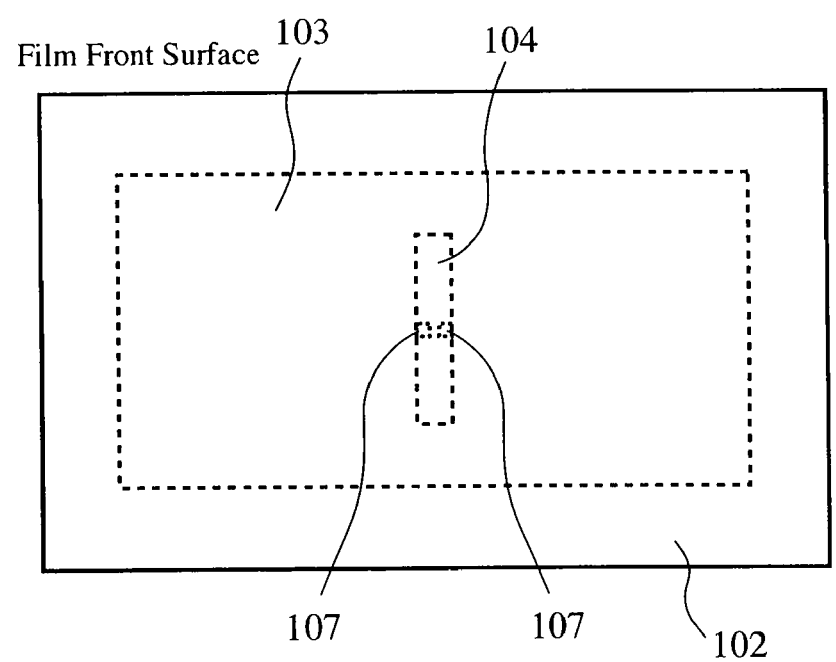
Figure 18:
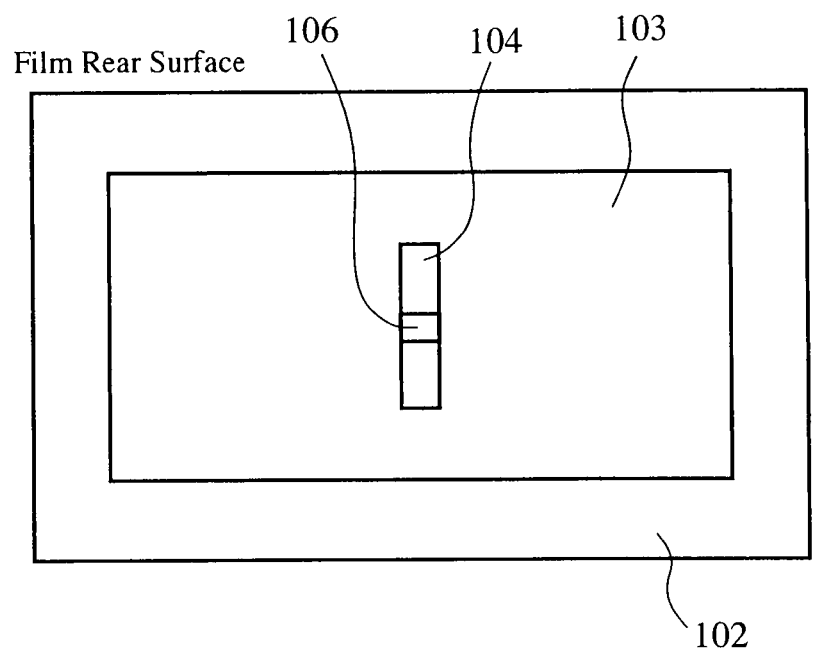
FIG. 18 is a drawing showing the conductor pattern formed on the film base in accordance with Embodiment 4 of the present invention (after an IC chip is connected)
Figure 18:
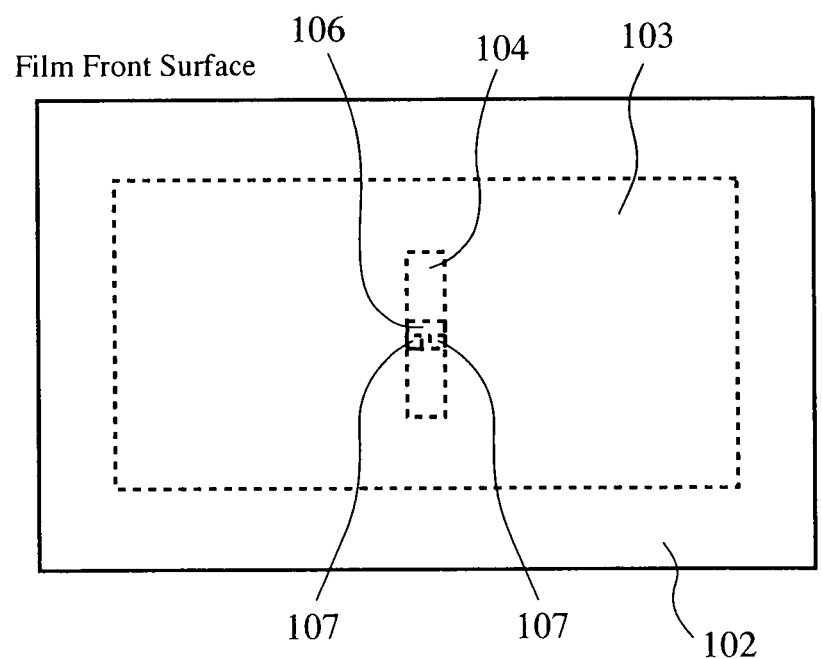
Figure 19:
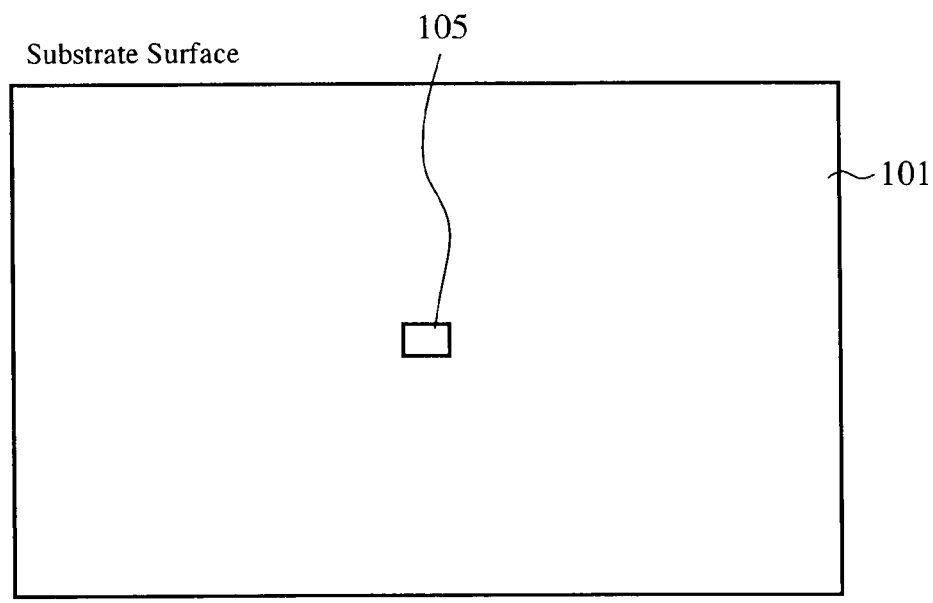
FIG. 19 is a structural diagram showing a dielectric substrate in accordance with Embodiment 4 of the present invention in which a groove portion is formed.

The manufacturing processes of the manufacturing method of manufacturing the RFID tag in accordance with Embodiment 4 will also be explained with reference to plan views of FIGS. 16 to 19. FIG. 16 is a plan view showing a state in which the conductor layer is formed on the whole surface of the film base. FIG. 17(a) is a back view showing the film base 102 in which the conductor pattern 103 and the slot 104 are formed. FIG. 16 shows the structure of the conductor pattern 103 in which a peripheral portion having the predetermined width d and extending from any side edge portion of the film base 102 and a portion corresponding to the slot 104 excluding the electrical connecting portions 107 are removed from the conductor layer 123 which is formed on the whole of the rear surface of the film base 102 by using, for example, an etching process. The structure of the film base 102 when viewed from the front surface of the film base 102 is shown in FIG. 17(b). This figure shows an example in which the film base 102 is transparent or translucent. FIG. 18(a) is a back view showing a state in which the IC chip 106 is attached into the slot 104 formed in the film base 102. FIG. 18(b) is a state diagram showing a state in which the IC chip is mounted to the film base 102 when viewed from the side of the front surface of the film base 102, and in which the electrical connecting portions 107 and the IC chip 106 can be seen through the transparent or translucent film base 102. FIG. 19 is a plan view of the dielectric substrate 101 in which the hole 105 into which the IC chip 106 is inserted is formed in the one main surface of the dielectric substrate 101. This hole 105 can be formed by using etching, milling, or the like instead of the above-mentioned injection molding method. After that, as described above, the RFID tag is completed by mounting the film base onto the dielectric substrate 101 in such a manner that the IC chip 106 attached to the film base 102 is inserted into the hole 105 of the dielectric substrate 101.

As mentioned above, since the RFID tag in accordance with Embodiment 4 is constructed in such a manner that the IC chip 106 is inserted into the hole 105 formed in one main surface of the dielectric substrate 101, bending and swelling are difficult to appear in the film base 102, and therefore, even when a shock or the like is applied to the RFID tag, the frequency of occurrence of a breakage of the IC chip 106, an electric contact failure in connection between the IC chip 106 and the electrical connecting portions 107 or disconnection between them, and so on can be reduced greatly. Furthermore, the size of the hole of the dielectric substrate 101 can be set in consideration of the yields at the time of inserting the IC chip 106 into the hole 105 with respect to the volume of the IC chip 106. In a case of forming the hole 105 in the dielectric substrate 101 without using the injection molding method, the hole can be formed by using a method of cutting the one main surface of the dielectric substrate 101.

Figure 20:
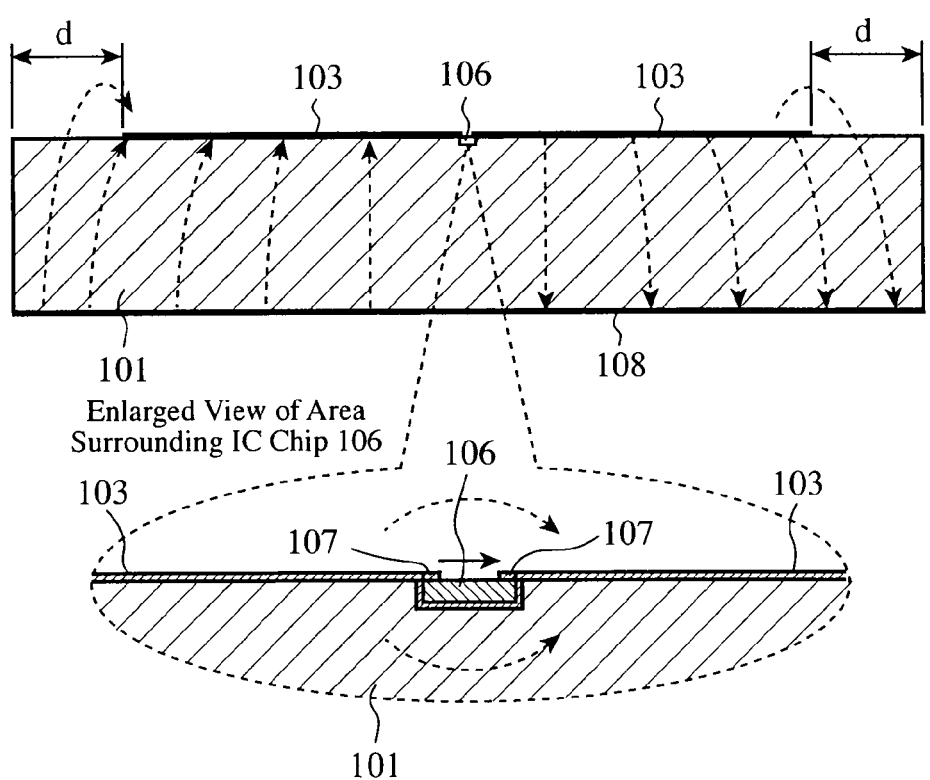
FIG. 20 is a graphical representation of an electric field of the RFID tag in accordance with Embodiment 4 of the present invention.

FIG. 20 is an electric field graphical representation showing the electric field (shown by arrows) of the RFID tag in accordance with Embodiment 4. FIG. 20 also shows a partly enlarged view of a part surrounding the IC chip 106, and, in the partly enlarged view, an appearance of the electric field is shown by arrows. The arrows shown in FIG. 20 show the electric field which occurs between the ground conductor pattern 108 and the conductor pattern 103, and because such an electric field is formed between the conductors, an electric field runs between the opposing sides of the slot 104 and this results in occurrence of a potential difference between them. The position where the intensity of the electric field in the direction of the thickness of the dielectric substrate 101 is made to be zero is at the power supply point of the IC chip. Because the electric fields on both of the left and right sides of the dielectric substrate 101 cancel each other out within the dielectric substrate 101, as shown in FIG. 20, the intensity of electric field is zero along the direction of the longitudinal axis of the slot 104 (in FIG. 20, in the depth direction). Therefore, in a case in which the electrical connecting portions 107 of the IC chip 106 are placed at this position, the electric supply loss can be reduced greatly. Therefore, in the case in which the RFID tag is constructed in this way, there is provided an advantage of being able to reduce the bad influence on the symmetric property of the radiation pattern of the conductor pattern 103, thereby greatly lengthening the communication available distance, and to greatly improve the performance of the RFID tag even when the RFID tag has the simple structure.

Figure 21:
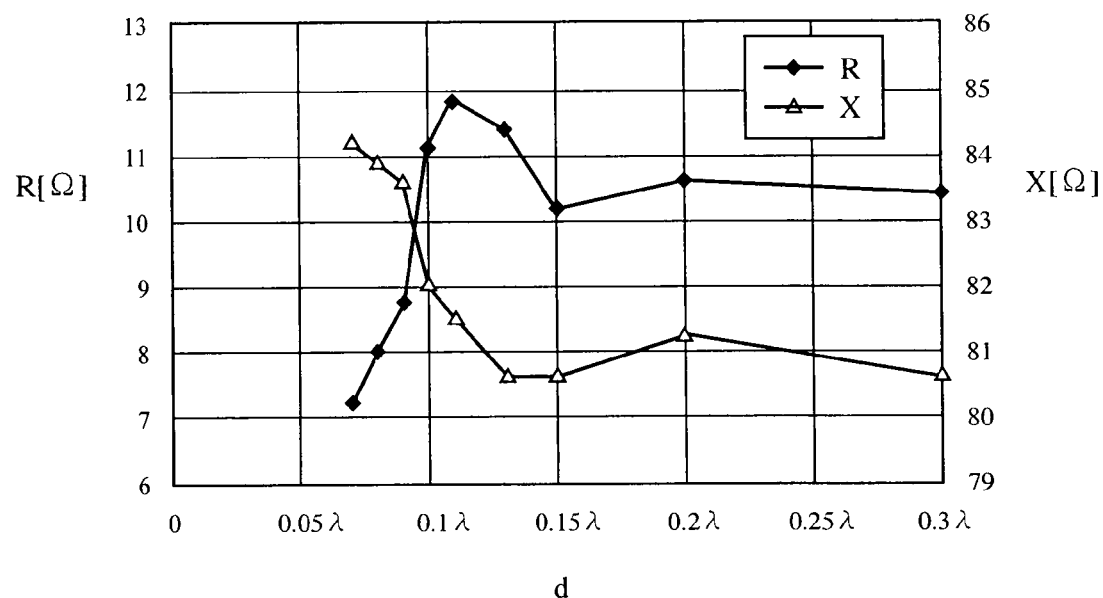
FIG. 21 is a drawing showing the characteristic impedance of the RFID tag in accordance with Embodiment 4 of the present invention.

FIG. 21 is a characteristic diagram showing change in the characteristic impedance of the RFID tag 110 in accordance with Embodiment 4. The conductor pattern 103 is formed in such a manner as to be spaced apart from any side edge portion of the film base 102 by the predetermined distance d, as mentioned above. This means that the predetermined distance d is the difference in dimension between each of the four corners of conductor pattern 103 and a corresponding one of those of the ground conductor pattern 108 because the ground conductor pattern 108 is formed over the whole of the other main surface of the dielectric substrate 101, as shown in FIG. 20. Assuming the predetermined distance as the difference in dimension between each of the four corners of conductor pattern and a corresponding one of those of the ground conductor pattern in this way, even in a case in which the ground conductor pattern 108 is not formed over the whole of the other main surface of the dielectric substrate 101, the predetermined distance d can be similarly considered as the difference in dimension between each of the four corners of conductor pattern 103 and a corresponding one of those of the ground conductor pattern 108. In FIG. 21, the horizontal axis shows the predetermined distance d or the above-mentioned difference d in dimension which is expressed as a ratio to the wavelength corresponding to the use frequency of the RIFD tag, and R [Ω] and X [Ω] in the vertical axis show the real part and imaginary part of the characteristic impedance, respectively. λ in the horizontal axis shows the wavelength at the use frequency. It is clear from the characteristic diagram of FIG. 21 that the characteristic impedance of the RFID tag 110 becomes almost fixed in a case in which the predetermined distance d is equal to or greater than 0.13λ. Therefore, by making the predetermined distance d be equal to or greater than 0.13λ, radio communications with the RFID reader writer 112 can be carried out regardless of whether an object onto which the RFID tag is to be mounted is a conductor or a non-conductor. Furthermore, even in a case in which the RFID tag is placed with floating in the air, the RFID tag can carry out radio communications with the RFID reader writer 112 without its performance degrading because the characteristic impedance of the RFID tag becomes nearly fixed. Because the intensity of electric field at the position of the hole 105 of the dielectric substrate 101 is zero, the change in the characteristic impedance of the RFID tag is much the same as that in a case in which no hole 105 is formed.

Embodiment 5

Figure 22:
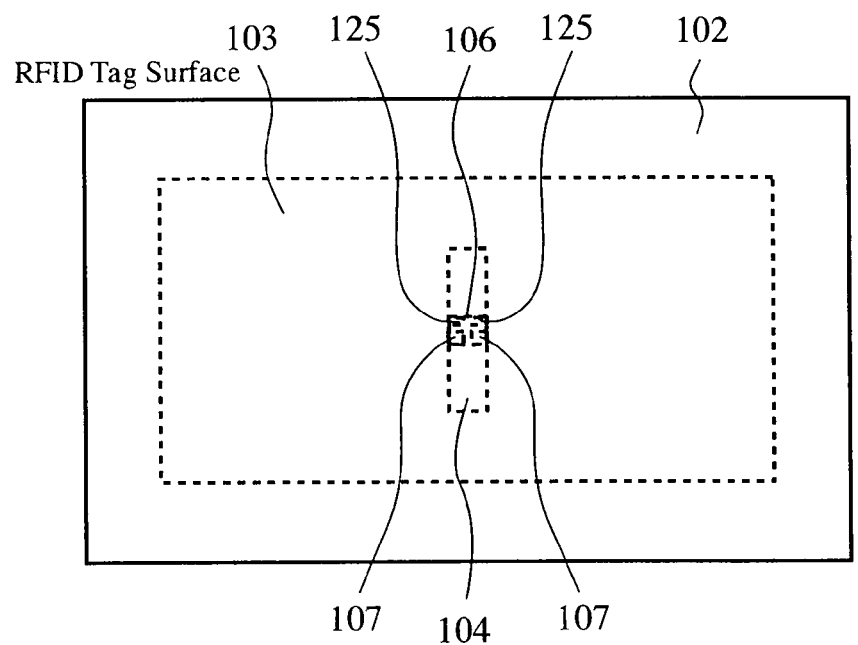
FIG. 22 is a structural diagram of an RFID tag in accordance with Embodiment 5 of the present invention (with dummy pads)
Figure 23:
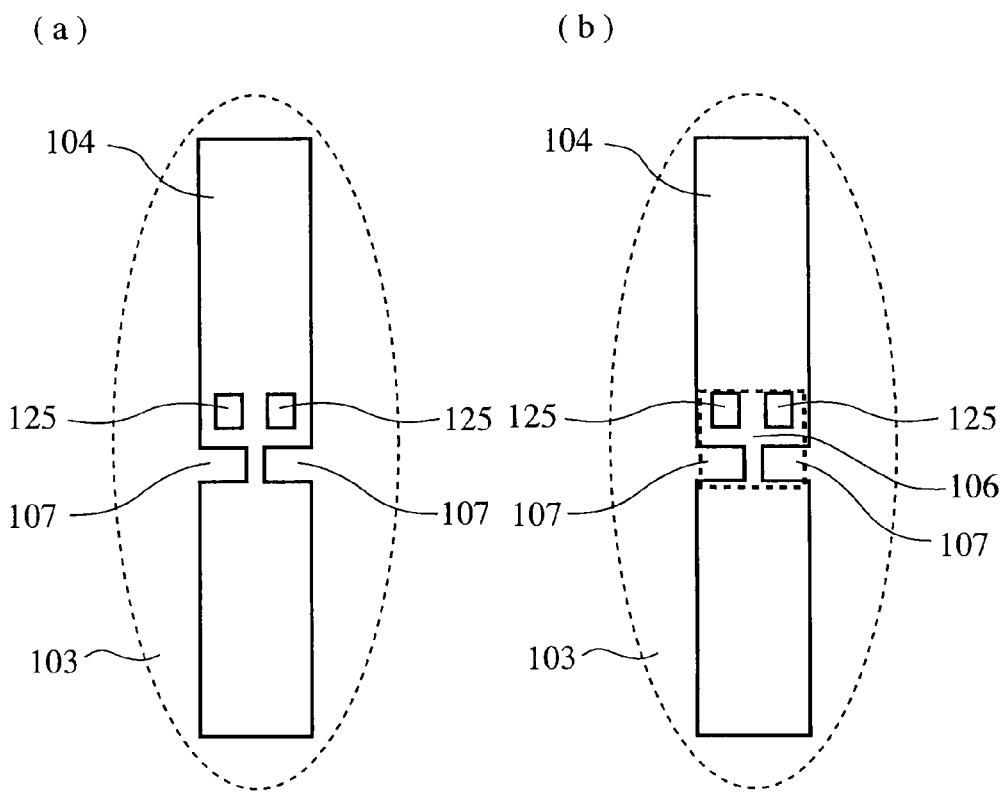
FIG. 23 is an enlarged view showing a vicinity of a slot of the RFID tag in accordance with Embodiment 5 of the present invention (with dummy pads)

Next, Embodiment 5 of the present invention will be explained with reference to FIGS. 22 and 23. FIG. 22 is a plan view showing the structure of an RFID tag in accordance with Embodiment 5, and FIG. 23 is an enlarged plan view showing a part in the vicinity of the slot shown in FIG. 22. FIG. 23(a) is a plan view in a case in which no IC chip is mounted in the slot, and FIG. 23(b) is a plan view in a case in which an IC chip is mounted in the slot. In Embodiment 4, the case in which an IC chip having two connecting terminals 124 i.e. two legs is used is explained. In contrast, in a case in which an IC chip having four connecting terminal 124 is mounted in the slot, in addition to the two electrical connecting portions 107 explained in Embodiment 4, two dummy pads 125 are disposed within the slot 104 and in the vicinity of the connecting terminals. According to a formation method of forming these dummy pads 125, the dummy pads are formed at the same time when the electrical connecting portions 107 are formed. In FIGS. 22 and 23, the dummy pads 125 which can be seen through the film base 102 are pads which simply serve as dummies which are not electrically connected to the conductor pattern 103 and the electrical connecting portions 107. Thus, because change in the specifications of the IC chip 106 which is to be mounted in the RFID can be flexibly coped with, the RFID tag with a simple structure can be manufactured at a low cost. The number of the dummy pads 125 is not limited to two.

Embodiment 6

Figure 24:
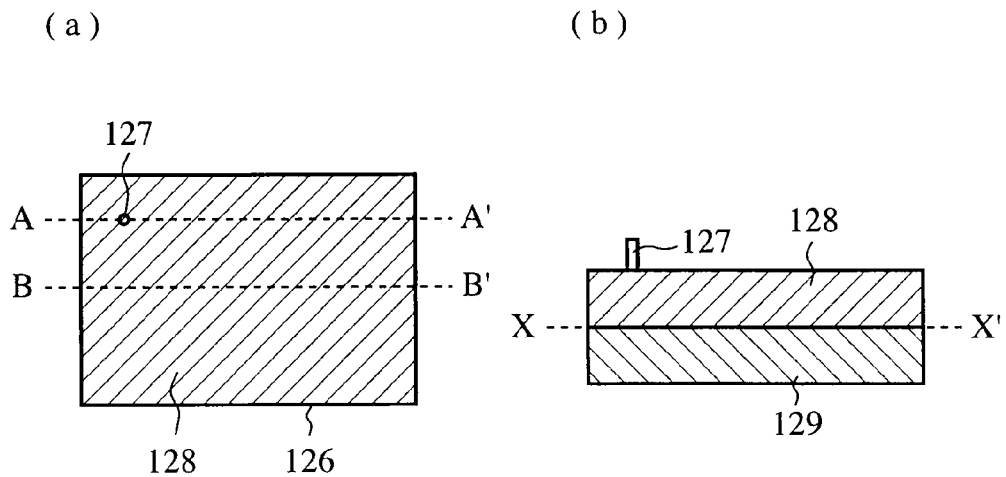
FIG. 24 is a structural diagram of an injection molding mold in accordance with Embodiment 6 of the present invention.
Figure 25:
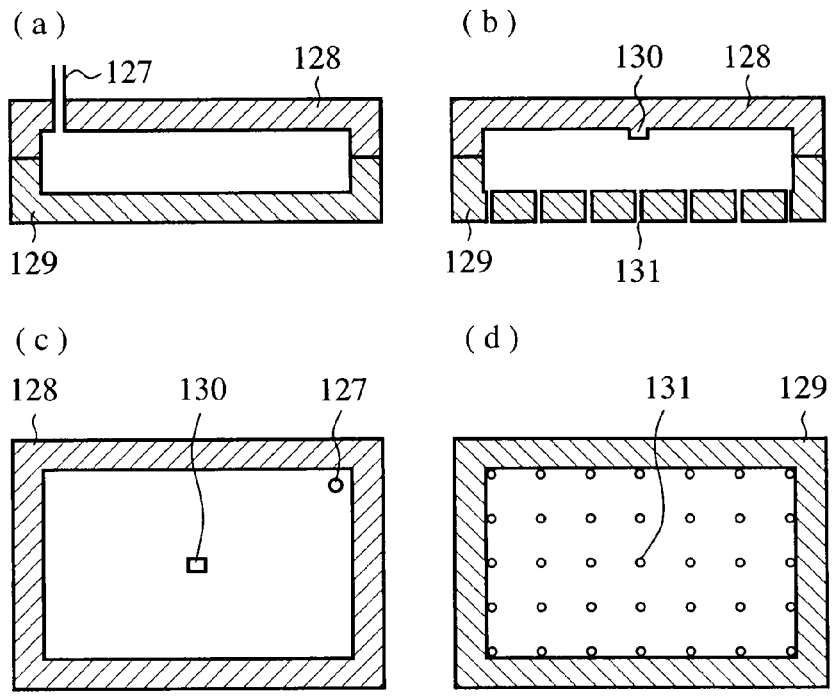
FIG. 25 is a cross-sectional view of the injection molding mold in accordance with Embodiment 6 of the present invention.

The structure of a dielectric substrate 101 in accordance with Embodiment 6 of the present invention in which a ground conductor pattern 108 is formed on another main surface (a rear face) thereof using injection molding, and a manufacturing method of manufacturing the dielectric substrate in accordance with this embodiment will be explained with reference to FIGS. 24 to 31. In these figures, the same reference numerals denote the same components or like components. FIG. 24 is a structural diagram for explaining the structure of an injection molding mold, FIG. 24(*a*) is a plan view of the injection molding mold, and FIG. 24(*b*) is a side view of the injection molding mold. In FIGS. 24(*a*) and 24(*b*), reference numeral 126 denotes the injection molding mold used for manufacturing the dielectric substrate of the RFID tag. Reference numeral 128 denotes an upper metallic mold of the injection molding mold 126, and reference numeral 129 denotes a lower metallic mold of the injection molding mold 126. Reference numeral 127 denotes an inlet formed in the upper metallic mold 128, for pouring a resin. FIG. 25 is a cross-sectional view of the injection molding mold, FIG. 25(*a*) is a cross-sectional view of the injection molding mold taken along the A-A' line shown in FIG. 24(*a*), FIG. 25(*b*) is a cross-sectional view of the injection molding mold taken along the B-B' line shown in FIG. 24(*a*), FIG. 25(*c*) is a flat portion showing the upper metallic mold when viewed from a cross section taken along the X-X' line shown in FIG. 24(*b*), and FIG. 25(*d*) is a plan view showing the lower metallic mold when viewed from the cross section taken along the X-X' line shown in FIG. 24(*b*). In FIGS. 25(*a*) to 25(*d*), reference numeral 130 denotes a protruding portion formed in a dented portion of the upper metallic mold 128, and having a shape corresponding to the shape of a hole 105. As a matter of course, when the upper metallic mold 128 and the lower metallic mold 129 are combined, a space which is formed by their dented portions and the protruding portion 130 has a shape matching with the shape of the combination of the dielectric substrate 101 and the groove portion 105 formed in the one main surface of the dielectric substrate, which is required for the RFID tag shown in FIG. 15. Reference numeral 131 denotes a plurality of vacuum suction ports formed in the lower metallic mold 129, which are used for performing vacuum suction of gas in the injection molding mold 126. As shown in FIG. 25(*d*), the plurality of vacuum suction ports 131 are disposed.

Figure 26:
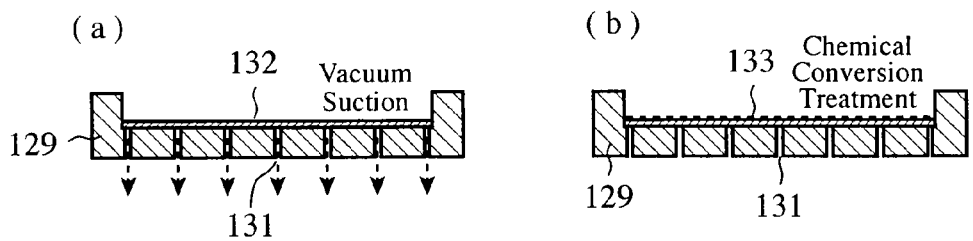
FIG. 26 is a drawing showing that a conductive foil is placed in a lower metallic mold in accordance with Embodiment 6 of the present invention.
Figure 27:
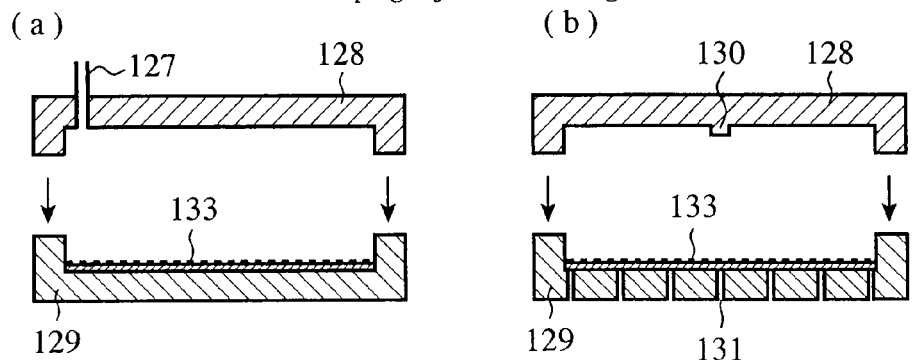
FIG. 27 is a drawing showing that the metallic mold of the injection molding mold in accordance with Embodiment 6 of the present invention are combined.

FIG. 26 is a cross-sectional view showing a state in which a conductive foil is placed in the lower metallic mold, FIG. 26(*a*) is a cross-sectional view showing a state in which the conductive foil is fixed to the lower metallic mold, and FIG. 26(*b*) is a cross-sectional view showing a state in which a chemical conversion treatment is performed on the conductive foil. The conductive foil 132 for ground conductor pattern is placed on the bottom of the dented portion of the lower metallic mold 129. Then, in order to improve the adhesive property with the resin of the dielectric substrate 101, a chemical conversion treatment is performed on a surface (a front surface) of this conductive foil 132 which is opposite to another surface being in contact with the vacuum suction ports 131, so that a chemical conversion-treated layer 133 having fine projections and depressions on a surface thereof is formed. FIG. 27 is a cross-sectional view showing a state at a time before the upper metallic mold is placed onto the lower metallic mold, FIG. 27(*a*) is a cross-sectional view, taken along the A-A' line shown in FIG. 24(*a*), showing a state in which the conductive foil 132 is placed in the lower metallic mold, and FIG. 27(*b*) is a cross-sectional view, taken along the B-B' line shown in FIG. 24(*a*), showing a state in which the conductive foil 132 is placed in the lower metallic mold. After the conductive foil 132 having a size matching that of the dented portion (the bottom) of the lower metallic mold 129 is placed in the lower metallic mold, in order to prevent slack and waviness from occurring in the ground conductor pattern 108 formed on the other main surface (the rear surface) of the dielectric substrate 101 after the dielectric substrate 101 is manufactured by using injection molding, as shown in FIG. 26(*a*), a vacuum pump or a suction unit is connected to the plurality of vacuum suction ports 131 disposed in the lower metallic mold 129, vacuum suction (suction) from the plurality of vacuum suction ports 131 is carried out with an nearly-uniform force, and the conductive foil 132 is fixed to the dented portion (the bottom) of the lower metallic mold 129 in such a manner as to be in close contact with the dented portion. In order to pour a resin into the injection molding mold 126 to fill the interior of the injection molding mold 126 with the resin, a vacuum suction port different from the vacuum suction ports used for making the conductive foil 132 be in close contact with the lower metallic mold 129 and an air vent port are formed in the injection molding mold 126.

As the chemical conversion treatment, a chemical conversion treatment which is generally used for injection-molded boards, such as a method of forming fine lines in the surface of the conductive foil 123 in order to improve its adhesive property with the resin or a method forming a layer on the surface of the conductive foil 123. Furthermore, in a case in which the use of only the chemical conversion treatment results in a low adhesion degree, an adhesive sheet which is the same as the adhesive sheet 109 for bonding the dielectric substrate 101 and the film base 102 to each other is placed on the chemical conversion-treated surface of the chemical conversion-treated layer. If the placement of an adhesive sheet which is the same as the adhesive sheet 109 on the other surface of the conductive foil 132 which is opposite to the surface facing the vacuum suction ports without performing the chemical conversion treatment provides a sufficient degree of adhesion for contact between the conductive foil 132 and the resin, it is not necessary to perform the chemical conversion treatment. The procedure associated with FIG. 26(*a*) and the procedure associated with FIG. 26(*b*) can be interchanged in sequence (a preparation process for a ground conductor pattern formation process).

Next, after the chemical conversion treatment is performed on the surface of the conductive foil 132, as shown in FIG. 27, the upper metallic mold 128 and the lower metallic mold 129 are combined to be in close contact with each other in such a manner that the inner space of the injection molding mold 126 (except for the openings including the inlet 127 and the vacuum suction ports 131) can form the desired shape of the dielectric substrate 101, and the upper metallic mold 128 and the lower metallic mold 129 are fixed to each other. In this case, although not shown in the figures, in general, a guide pin and a guide hole are formed in the upper metallic mold 128 and in the lower metallic mold 129, respectively, and, after the guide pin is fitted into the guide hole so that the upper metallic mold 128 and the lower metallic mold 129 are positioned, they are fixed to each other with clamping (a clamping process of clamping the injection molding mold).

Figure 28:
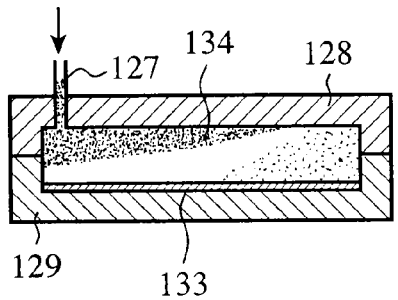
FIG. 28 is a drawing showing that a thermoplastic resin is poured into the injection molding mold for dielectric substrate in accordance with Embodiment 6 of the present invention.
Figure 28:
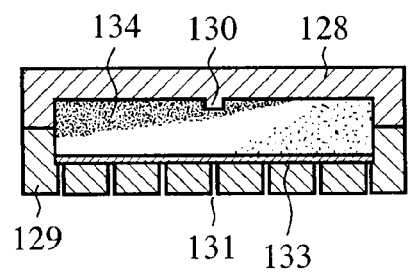

FIG. 28 is a cross-sectional view showing a state in which the upper metallic mold is placed onto the lower metallic mold, and a thermoplastic resin is poured into the modes so that the dielectric substrate is formed, FIG. 28(a) is a cross-sectional view taken along the A-A' line shown in FIG. 24(a), and FIG. 28(b) is a cross-sectional view taken along the B-B' line shown in FIG. 24(a). Reference numeral 134 denotes the resin (the thermoplastic resin). After the clamping of the injection molding mold 126 is completed, in a state in which the chemical conversion-treated layer 133 which becomes the ground conductor pattern 108 is placed on the surface of the dented portion of the lower metallic mold 129, and the upper metallic mold 128 is then placed onto the lower metallic mold 129, the thermoplastic resin 134 which is melted is poured from the inlet 127 into the space between the upper metallic mold 128 and the lower metallic mold 129, i.e., the interior of the injection molding mold 126, and the groove portion 105 corresponding to the protruding portion 130 of the upper metallic mold 128 is formed in the one main surface of the dielectric substrate 101, as shown in FIG. 28 (a dielectric substrate formation process). Because the conductive foil 132 with the chemical conversion-treated layer 133 is placed in the dented portion of the lower metallic mold 129 before the resin 134 is poured into the injection molding mold, the ground conductor pattern 108 is formed on the other main surface of the dielectric substrate 101 at the same time when the dielectric substrate 101 is formed (a ground conductor pattern formation process).

Figure 29:
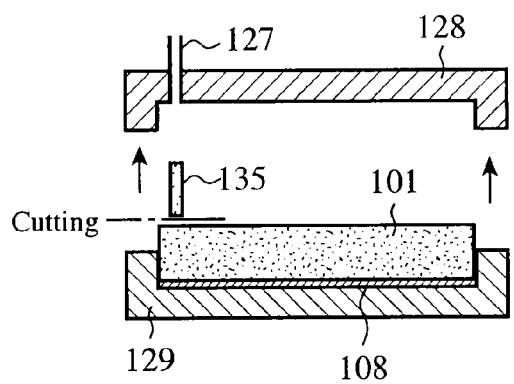
FIG. 29 is the drawing showing that a dielectric substrate in accordance with Embodiment 6 of the present invention which is injection-molded is extracted.
Figure 29:
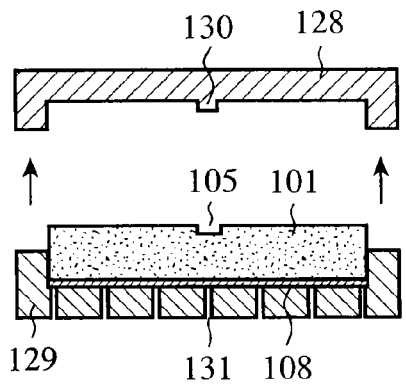

FIG. 29 is a cross-sectional view for explaining removing of the dielectric substrate which has been injection-molded, FIG. 29(a) is a cross-sectional view, taken along the A-A' line of FIG. 24(a), at the time when the upper metallic mold is separated from the lower metallic mold, and FIG. 29(b) is a cross-sectional view taken along the B-B' line of FIG. 24(b) at that time. Reference numeral 135 denotes an excess resin which remains in the inlet 127. After the resin 134 is solidified, the clamping of the injection molding mold 126 is released, and, as shown in FIG. 29, the upper metallic mold 128 and the lower metallic mold 129 are separated from each other and the dielectric substrate 101 is removed from the injection shaping mold 126 (a dielectric substrate removing process). In a case in which the resin 134 poured as shown in FIG. 29(a) has a larger volume than the interior of the injection molding mold 126, because a part of the resin 134 which remains in the inlet 127 is solidified and therefore an excess resin 135 having the same shape as the inner wall of the inlet 127 is formed on the one main surface of the dielectric substrate 101, the excess resin 135 is cut away from the dielectric substrate 101 and the cut surface is ground so that it has such a degree of surface roughness that does not prevent the adhesion between the dielectric substrate 101 and the film base 102 (a post treatment process). Because in the preparation process for the ground conductor pattern formation process, the conductive foil 132 (the chemical conversion-treated layer 133) is suctioned (in suction) and is then brought in close contact with the lower metallic mold 129, there is provided an advantage of being able to prevent the conductive foil 132 (the chemical conversion-treated layer 133) from elongating during the injection molding of the resin 134, and hence to prevent the ground conductor pattern 108 of the dielectric substrate 101 which is formed after the resin 134 is solidified from becoming thin and being cut.

Figure 30:
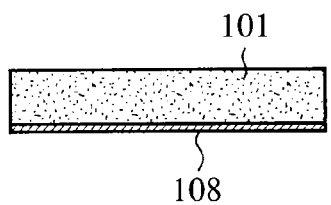
FIG. 30 is a drawing showing the dielectric substrate of the RFID tag in accordance with Embodiment 6 of the present invention.
Figure 30:
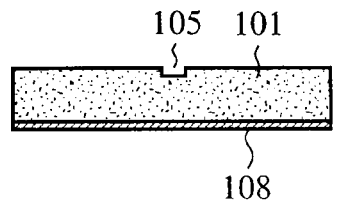
Figure 31:
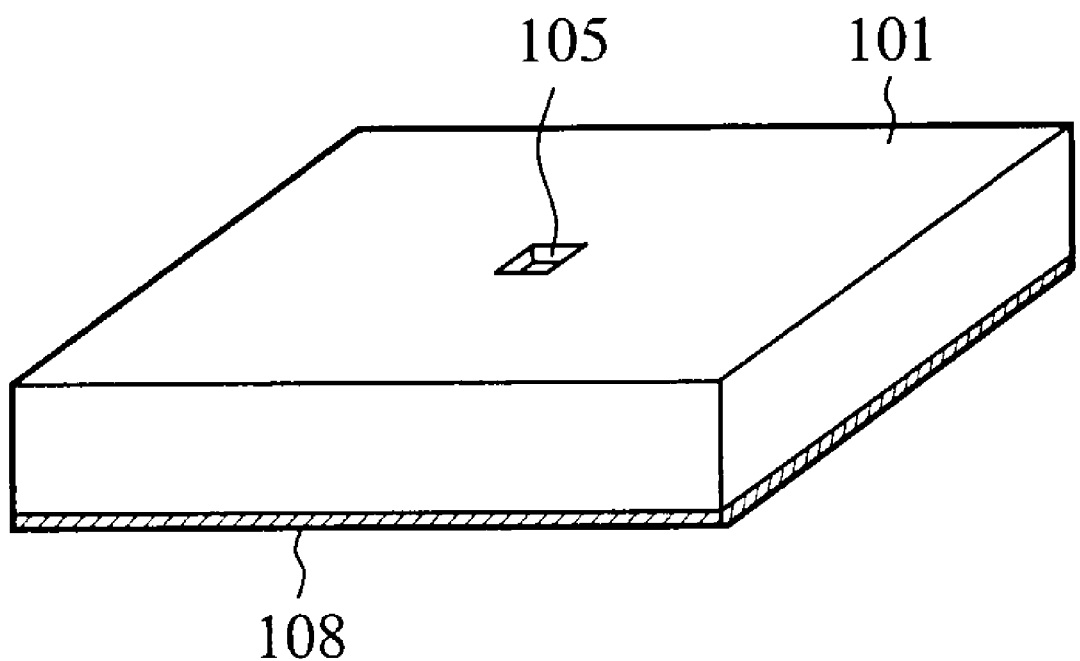
FIG. 31 is a drawing showing the dielectric substrate of the RFID tag in accordance with Embodiment 6 of the present invention.

FIG. 30(a) is a cross-sectional view, taken along the A-A' line shown in FIG. 24(a), of the dielectric substrate which is formed by using the manufacturing method of manufacturing the RFID tag in accordance with Embodiment 6, and FIG. 30(b) is a cross-sectional view, taken along the B-B' line shown in FIG. 24(a), similarly showing the dielectric substrate. FIG. 31 is a perspective view of the dielectric substrate which is formed by using the manufacturing method of manufacturing the RFID tag in accordance with Embodiment 6. Through the preparation process for the above-mentioned ground conductor pattern formation process to the post treatment process, the dielectric substrate 101 shown in FIGS. 30 and 31 is manufactured, and the film base 102 which is manufactured by using the manufacturing method (the conductor-layer formation process (which can be omitted), the conductor pattern formation process, and the IC chip connecting process) which is explained in Embodiment 4 is bonded to the dielectric substrate 101. The process of boding the film base to the dielectric substrate is the same as the film supporting process and the fixing process of Embodiment 4. Furthermore, by manufacturing the dielectric substrate 101 using thermoplastic elastomer olefin having low hardness (for example, JIS-A55) as the resin 134, the RFID tag with the dielectric substrate having flexibility can be manufactured to have flexibility. Therefore, the RFID tag 110 can be mounted along a curved surface of an object such as a drum. The curved surface on which this RFID tag 110 can be mounted has such a curvature that does not break the electric connection between the IC chip 106 and the conductor pattern 103. Because even if the conductor pattern 103 is bent, the electric length of the conductor pattern does not change, the conductor pattern 103 works without any trouble as the electric wave radiating part of the RFID tag 110 while the radiation pattern becomes deformed a little.

By designing and manufacturing the dielectric substrate 101 by using injection molding in this way, as compared with a dielectric substrate in which several printed circuit boards are bonded together and are laminated, the dielectric substrate which is injection-molded using the resin (the thermoplastic resin) 134 can be greatly reduced in cost (manufacturing cost). Furthermore, while if a dielectric substance (a material) from which the dielectric substrate used for the RFID tag is made is the one used for manufacturing a general printed circuit board, such as polytetrafluoroethylene (fluororesin system), ceramic, or glass epoxy, it is difficult to manufacture the substrate in such a manner that it has an arbitrary thickness and therefore any change in the requested size of the dielectric substance due to the mounting position of the RFID tag cannot be coped with flexibly, the injection molding of the dielectric substrate makes it possible to easily manufacture a wide variety of RFID tags because the thickness and shape of the dielectric substrate can be easily changed only by changing the metallic mold. Furthermore, by selectively using an olefin polymer resin having a low dielectric dissipation factor from among resins (thermoplastic resins) as the dielectric substrate of the RFID tag, the radiation efficiency can be improved and the RFID tag can be manufactured to have a high gain. In addition, because the specific gravity of the olefin polymer resin is about one-half of that of a general printed circuit board, a weight reduction of the RFID tag can be achieved. Furthermore, in case in which the IC chip 106 is mounted to a dielectric substrate made from a material which is hard and is thick, like a dielectric substrate made from polytetrafluoroethylene (fluororesin system), ceramic, glass epoxy, or the like which is used for manufacturing a general printed circuit board, it must be mounted one by one and therefore it takes much time to mount IC chips to dielectric substrates one by one because there are no facilities intended for mounting them, and the formation of the groove portion 105 required for the mounting becomes complicated. In contrast, in the case in which the injection-molded board is used, because many facilities intended for mounting the IC chip 106 to the film base 102 have come on the market, it is possible to produce a lot of RFID tags at one time, the production time and the cost including those required for forming the groove portion 105 can be greatly reduced.

Embodiment 7

Figure 32:
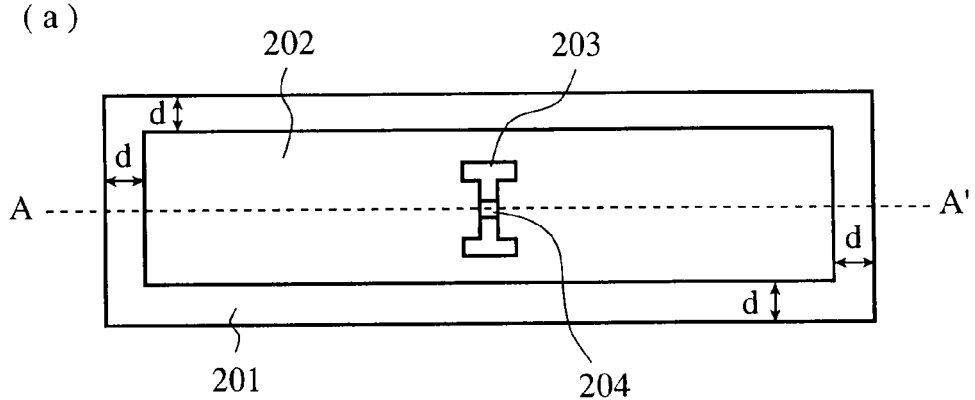
FIG. 32 is a structural diagram of an RFID tag in accordance with Embodiment 7 of the present invention.
Figure 32:
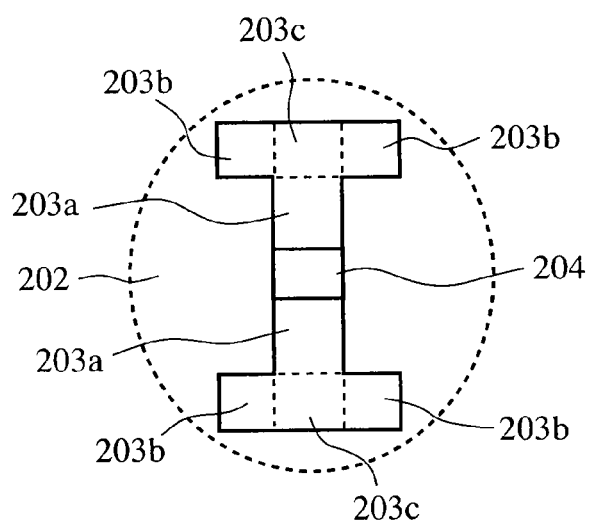
Figure 32:
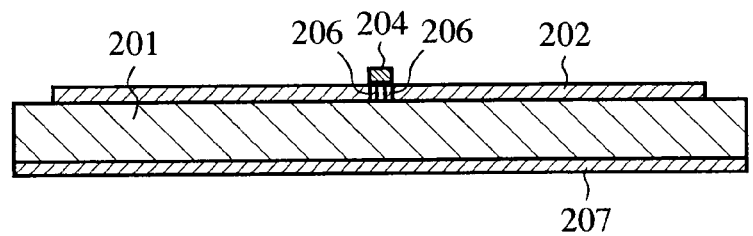
Figure 32:
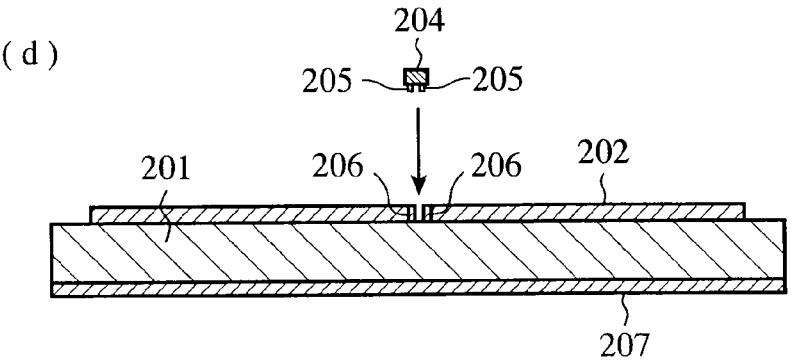

Embodiment 7 of the present invention will be explained below. FIG. 32 is a structural diagram of an RFID tag in accordance with this Embodiment 7. FIG. 32(a) is a plan view of the RFID tag, FIG. 32(b) is an enlarged view of an area surrounding a slot of the RFID tag shown in FIG. 32(a), FIG. 32(c) is a cross-sectional view taken along the A-A' line of FIG. 32(a), and FIG. 32(d) is an exploded cross-sectional view of FIG. 32(c). In these FIG. 32, reference numeral 201 denotes a dielectric substrate, which is formed of, for example, a thermoplastic resin, such as a dielectric substance used for printed circuit boards, or thermoplastic elastomer olefin. Reference numeral 202 denotes a conductor pattern which functions as a radiant portion of an antenna (a patch antenna) of the RFID tag, and which is disposed on the dielectric substrate 201. as shown in FIG. 32(a), the conductor pattern is formed in an area of a surface of the dielectric substrate 201 in such a manner as to be spaced apart from each of the shorter and longer side edges of the dielectric substrate 201 by a distance d. This conductor pattern 202 can be the one printed on a film base (not shown) which is bonded onto one main surface (a front surface) of the dielectric substrate 201 by using an adhesive sheet, an adhesive bond (not shown), or the like. In this case, film polyethylene t'er'ephthalate, polyimide, polyethylenenaphthalate, polyvinyl chloride, or the like can be used as the film base. The film base can be placed on the one main surface of the dielectric substrate 201 in such a manner as to be spaced apart from each of the shorter and longer side edges of the dielectric substrate 201 by the distance d. In this case, the conductor pattern 202 can be placed over the whole surface of the film base 226.

A slot 203 is formed in a central part of the conductor pattern 202, as shown in FIGS. 32(a) and 32(b). A part of the dielectric substrate 201 can be exposed from the conductor pattern 202 via the slot 203, and the exposed part of the dielectric substrate 201 can be coated. The slot 203 is formed in the central part of conductor pattern 202 so that the RFID tag can generate a good radiation pattern, and is comprised of a long-narrow-shaped slot 203a and bent-shaped slots 203b (even if the slot 203 is not placed at the central part of the conductor pattern 202, the slot works, but its performances, such as its communication range, may degrade as compared with the case in which the slot 203 is placed at the central part of the conductor pattern 202). Two bent-shaped slots 203b communicate with the long-narrow-shaped slot at one end portion 203c of the long-narrow-shaped slot 203a in such a manner as to bend and extend from the end portion toward both of directions perpendicular to the long-narrow-shaped slot 203a, respectively. In the structure shown in FIG. 32(b), the long-narrow-shaped slot 203a includes the inside of each of the two portions of the slot 203 extending in the longitudinal direction of the slot and enclosed by a dotted line. Thus, the end portions 203c of the long-narrow-shaped slot 203a are the portions each enclosed by a dotted line, respectively. As shown in FIG. 32(b), each portion continuously extending in the lateral direction of the slot from one end portion 203c enclosed by a dotted line is one bent-shaped slot 203b. The length and width of the long-narrow-shaped slot 203a and the length and width of each bent-shaped slot 203b can be determined according to the use frequency and the characteristic impedance of an IC chip to be mounted. Reference numeral 204 denotes the IC chip which transmits and receives electric waves through the slot 203, which is comprised of a memory etc. which will be mentioned later, and which has two terminals 205. The IC chip 204 is electrically connected to the conductor pattern 202 via the long-narrow-shaped slot 203a. More specifically, the IC chip 204 is placed in a central part of the long-narrow-shaped slot 203a. Electrodes 206 which are extending from both inner edges of the conductor pattern 202 in such a manner as to be spaced apart from each other are formed within the long-narrow-shaped slot 203a.

Hereafter, the constitution of connection between the IC chip 204 and the conductor pattern 202 will be explained. As shown in FIGS. 32(c) and 32(d), above-mentioned 206 denotes each electrode having a projecting shape and extending from the conductor pattern 202 on one of the both sides of the slot 203 (the long-narrow-shaped slot 203a) toward the inside of the slot 203, the electrodes being connected continuously with the conductor pattern 202 and being electrically connected with the conductor pattern 202 on the both sides of the slot 203, respectively. The terminals 205 of the IC chip 204 are connected to the electrodes 206 with soldering or the like, respectively. In a case in which the IC chip 204 has the same size as or a smaller size than the width of the slot 203, the IC chip 204 can be inserted into the width of the slot 203, whereas in a case in which the IC chip 204 has a larger size than the width of the slot 203, the terminals 205 of the IC chip 204 has only to be electrically connected to portions close to the slot 203 in such a manner that each terminal extends over a corresponding portion. Therefore, in this case, there is no necessity to dispose the electrodes 206. In FIG. 32, the IC chip 204 is placed in the central part of the long-narrow-shaped slot 203a. As an alternative, the IC chip can be placed in a part, other than the central part, of the long-narrow-shaped slot 203a which is nearer to one end portion 203c of the slot.

The slot 203 and the electrodes 206 can be formed at the same time when the conductor pattern 202 is formed by using etching, vapor deposition, milling, or the like. In a case in which a film base on which the conductor pattern 202 is printed is bonded onto the dielectric substrate 201, the conductor pattern 202 (including the slot 203 and the electrodes 206) can be formed by performing etching on the film base in which a conductor layer is formed over the whole surface of the film base. As an alternative, a film base on which the conductor pattern 202 (including the slot 203 and the electrodes 206) is printed from the beginning can be used. Next, reference numeral 207 denotes a ground conductor layer disposed in the other main surface (the rear face) of the dielectric substrate 201. Like the conductor pattern 202, the ground conductor layer printed onto a film base can be bonded onto the dielectric substrate 201 with an adhesive sheet, an adhesive bond, or the like, so that the ground conductor layer can be formed. As an alternative, by using a processing method used for general printed circuit boards, such as a method of evaporating a conductive foil on the dielectric substrate 201, the ground conductor layer can be formed.

Figure 33:
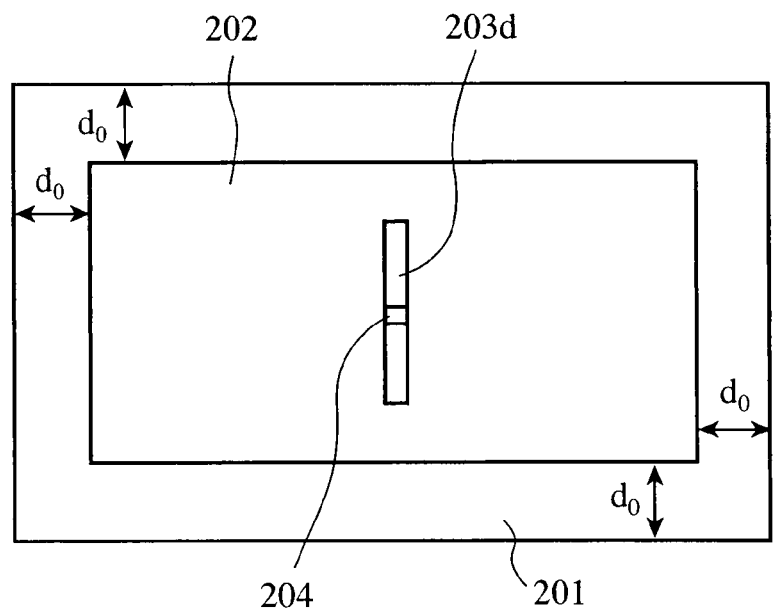
FIG. 33 is a structural diagram of an RFID tag having a linear slot.
Figure 34:
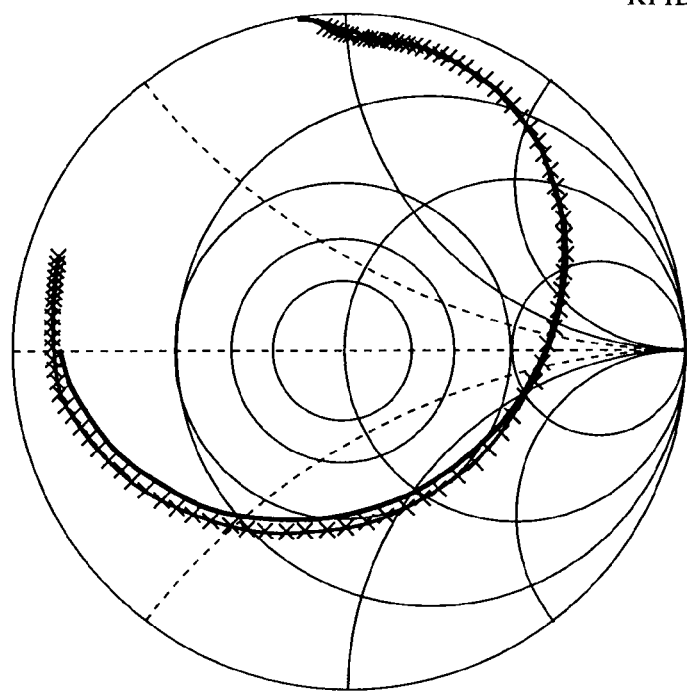
FIG. 34 is a Smith chart (an impedance chart) in accordance with Embodiment 7 of the present invention.

Next, with reference to FIGS. 33 and 34, why the RFID tag in accordance with Embodiment 7 has a performance equivalent to that of an RFID tag having a linear slot, and why the length of the RFID tag in accordance with Embodiment 7 in "the direction in which the slot 203 (the long-narrow-shaped slot 203*a*) of the dielectric substrate 201 is extending" can be shortened as compared with the length of an RFID tag having a linear slot will be explained. FIG. 33 is a structural figure of an RFID tag having a linear slot. In FIG. 33, reference numeral 203*d* denotes the linear slot formed in the central part of the conductor pattern 202, and the same reference numerals as those shown in FIG. 32 denote the same components or like components. The RFID tag in accordance with Embodiment 7 (referred to as the RFID tag (Embodiment 7) from here on) differs from the linear-slot RFID tag in that in terms of the length in the longitudinal direction of the dielectric substrate 201, i.e., in the direction in which the long-narrow-shaped slot 203*a* (the slot 203) and the linear slot 203*b* are extending, the length of the linear slot RFID tag is longer than that of the RFID tag in accordance with Embodiment 7, and, in contrast with that the slot 203 of the RFID tag (Embodiment 7) is comprised of the long-narrow-shaped slot 203*a* and the bent-shaped slots 203*b*, the slot of the linear slot RFID tag is comprised of only the linear slot 203*d* and the linear slot 203*d* has such a shape that is an extension of the long-narrow-shaped slot 203*a*. FIG. 34 is a Smith chart (an impedance chart) in which a characteristic impedance value which varies according to change in the size of the slot of the RFID tag (Embodiment 7) and a characteristic impedance value which varies according to change in the size of the slot of the linear-slot RFID tag are plotted.

As can be seen from the Smith chart of FIG. 34, by changing the size of the linear slot 203*d* of the linear-slot RFID tag, the characteristic impedance can be adjusted and matching between the IC chip 204 and the linear-slot RFID tag can be established, and, by changing the slot 203 of the RFID tag according to this invention (the long-narrow-shaped slot 203*a* and the bent-shaped slots 203*b*), plotted points showing the change in the characteristic impedance can be matched with those of the linear-slot RFID tag. The Smith chart thus shows that the characteristic impedances of the RFID tag (Embodiment 7) and the linear slot RFID tag which have slots which are shaped differently can be matched with each other. This is because the slot 203 of the RFID tag (Embodiment 7) is comprised of the long-narrow-shaped slot 203*a* and the bent-shaped slots 203*b*, and is constructed in such a manner that two bent-shaped slots 203*b* are continuously connected to end portions 203*c* of the long-narrow-shaped slot 203*a* and are bent and extending from the end portions in both directions perpendicular to the long-narrow-shaped slot 203*a*, respectively, and therefore the apparent length of the slot is the same as the linear slot 203*d* of the linear-slot RFID tag from the viewpoint of electricity. Therefore, in the RFID tag (Embodiment 7), because the length of the dielectric substrate 201 in the direction in which the long-narrow-shaped slot 203*a* is extending can be shortened, the size of the dielectric substrate 201 can be reduced.

In order to shorten the length of the dielectric substrate 201 in a direction perpendicular to the direction in which the long-narrow-shaped slot 203*a* is extending, although not illustrated, what is necessary is just to form electric length adjusting parts shaped in a certain cut in sides of the conductor pattern 202 extending in the direction perpendicular to the direction in which the long-narrow-shaped slot 203*a* is extending. Because the electric length adjusting parts are disposed in such a manner as to be perpendicular to the direction in which the long-narrow-shaped slot 203*a* is extending, the effective electric length of the conductor pattern 202 becomes longer than its apparent length, and the size of the conductor pattern 202 can be reduced even if the use frequency of the RFID system is fixed. Therefore, the size of the RFID tag can be reduced. Furthermore, the length of each of the electric length adjusting parts can be changed as long as it falls within the length of the conductor pattern 202. There is also provided an advantage of shortening the length of the dielectric substrate 201 even if an electric length adjusting part is formed on one side of the conductor pattern 202. The change in the slot shape and the adjustment of the characteristic impedance using the electric length adjusting parts show that not only a downsizing of the dielectric substrate 201 (the RFID tag) can be achieved, but the RFID tag can be formed without changing any specifications, such as the dielectric constant or substrate thickness of the dielectric substrate 201, even in a case in which the IC chip 204 is changed to have a different characteristic impedance.

Figure 35:
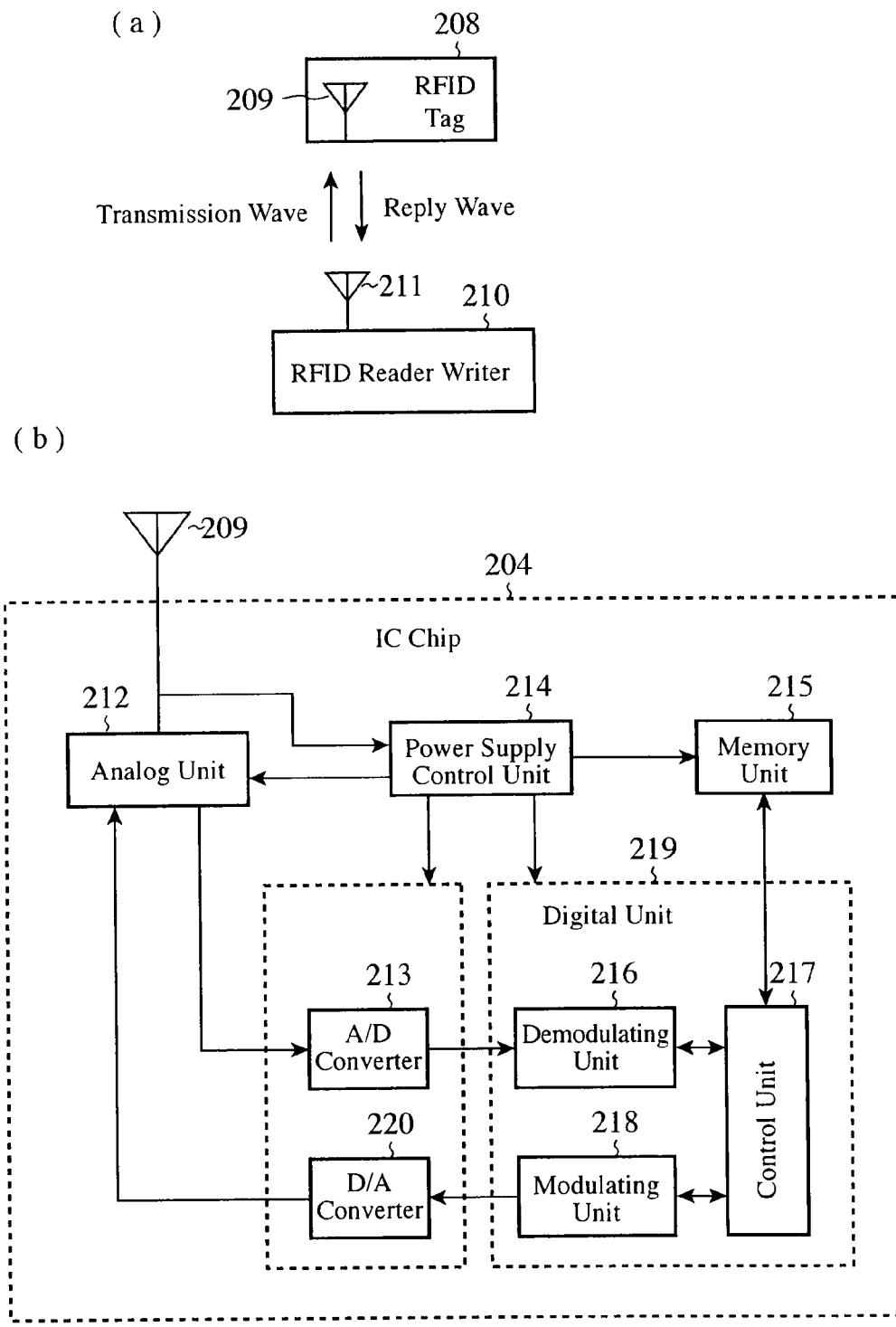
FIG. 35 is a basic block diagram of an RFID system in accordance with Embodiment 7 of the present invention.

FIG. 35(*a*) is a diagram of the basic configuration of an RFID system, schematically showing that transmission and reception are carried out between the RFID tag and an RFID reader writer. FIG. 35(*b*) is a block diagram of the RFID tag. Particularly, this figure is a block structural diagram functionally showing the internal structure of the IC chip 204. In FIGS. 35(*a*) and 45(*b*), reference numeral 207 denotes the RFID tag having a structure as shown in FIG. 32. Reference numeral 209 denotes an antenna unit disposed in the RFID tag 208, and, in FIG. 32, corresponds to the conductor pattern 202 in which the long-narrow-shaped slot 203*a* is formed. As shown in FIGS. 32 and 33, because in the antenna unit 209 of the RFID tag 208, the conductor pattern 202 having the slot 203 is formed on the one main surface (the front surface) of the dielectric substrate 201 and the ground conductor pattern 207 is formed on the other main surface (the rear face) of the dielectric substrate 201, the RFID tag 208 functions as a patch antenna. More specifically, the conductor pattern 202 having the slot 203 functions as an antenna pattern (a radiant portion). The conductor pattern 202 and the slot 203 are adjusted in such a manner that the impedance matching between the use frequency of the RFID system and the IC chip 106 is achieved, so that the conductor pattern and the slot can be excited. Because this adjustment is greatly related to the thickness and specific inductive capacity of the dielectric substrate 201, by adjusting and designing the conductor pattern and the slot by also taking these conditions into consideration, a desired radiation pattern and a desired gain can be provided. The slot 203 is formed in the central part of the conductor pattern 202 so that the radiation pattern of the conductor pattern 202 becomes good, as mentioned above. By adjusting and designing the slot in consideration of this condition, the RFID tag 208 can provide a desired radiation pattern and a desired gain, and, for example, about 1 m to 8 m of communication range can be provided without enlarging the RFID tag 208, i.e., the dielectric substrate 201.

Reference numeral 210 denotes the RFID reader writer, and reference numeral 211 denotes an antenna unit disposed in the RFID reader writer 210, for carrying out radio communications with the antenna unit 209 of the RFID tag 208. Reference numeral 204 denotes an IC chip as explained with reference to FIG. 32, and has a concrete structure as shown in FIG. 35(*b*). Reference numeral 212 denotes an analog unit which receives a transmission wave from the RFID reader writer 210 by using the antenna unit 209 of the RFID tag 208, and which outputs the transmission wave to a next-stage digital circuit 221. Reference numeral 213 denotes an A/D converter which performs A/D conversion on the transmission wave, and reference numeral 216 denotes a power supply control unit which smooths the transmission wave which the antenna unit 209 has received by using a rectifier circuit so as to generate electric power, and which supplies the electric power to and performs power control on each circuit of the RFID tag 208. Reference numeral 215 denotes a memory unit mounted in the RFID tag 208, for storing tag information, such as solid identifying information, therein. Reference numeral 216 denotes a demodulating unit which demodulates the transmission wave, and reference numeral 217 denotes a control unit which controls the circuits in the IC chip 204 including the memory unit 215 with the transmission wave demodulated by the demodulating unit 216. Reference numeral 218 denotes a modulating unit which modulates a signal with information which is retrieved from the memory unit 215 by the control unit 217. Reference numeral 219 denotes a digital unit constructed of the demodulating unit 215, the control unit 216, and the modulating unit 217, and reference numeral 220 denotes a D/A converter which performs D/A conversion on the signal transmitted from the modulating unit 218, and which outputs the signal to analog unit 212.

Hereafter, the basic operation of the RFID system having this structure will be explained. According to the use of the RFID system (i.e., entrance/exit control of living bodies or articles, or physical distribution management), tag information about the use is stored in the memory unit 215 of the RFID tag 208, and the RFID reader writer 210 can perform updating or writing of the tag information in the RFID tag 208 or can read the tag information from the RFID tag 208 when the RFID tag 208 is existing in a transmission-and-reception area thereof or moving through the transmission-and-reception area (with the RFID tag being attached to a living body or an article which is a target of entrance/exit control or physical distribution management). The RFID reader writer 210 transmits, as a transmission wave, a command signal for instructing the RFID tag 208 to perform updating or writing, reading, or the like to the antenna unit 209 of the RFID tag 208 from the antenna unit 211 of the RFID reader writer 210. The antenna unit 209 of the RFID tag 208 receives the transmission wave, and the power supply control unit 214 detects the transmission wave and stores electricity (performs smoothing) so as to generate operation power for the RFID tag 208, and furnishes the operation power to each circuit of the RFID tag 208. The demodulating unit 216 demodulates the transmission wave so as to generate the command signal. The control unit 217 carries out data processing of the description of the instruction shown by the generated command signal, and issues either or both of an updating or writing instruction for updating or writing the tag information in the memory unit 215, and a reading instruction for reading the tag information from the memory unit 215. A reply wave is modulated by the modulating unit 218 with a read signal which the memory unit 215 outputs according to this instruction from the control unit 217 and is then sent to the antenna unit 209 via the analog unit 212 and is transmitted to the antenna unit 211 of the RFID reader writer 210, so that the RFID reader writer 210 can receive the read signal and acquires desired information.

Figure 36:
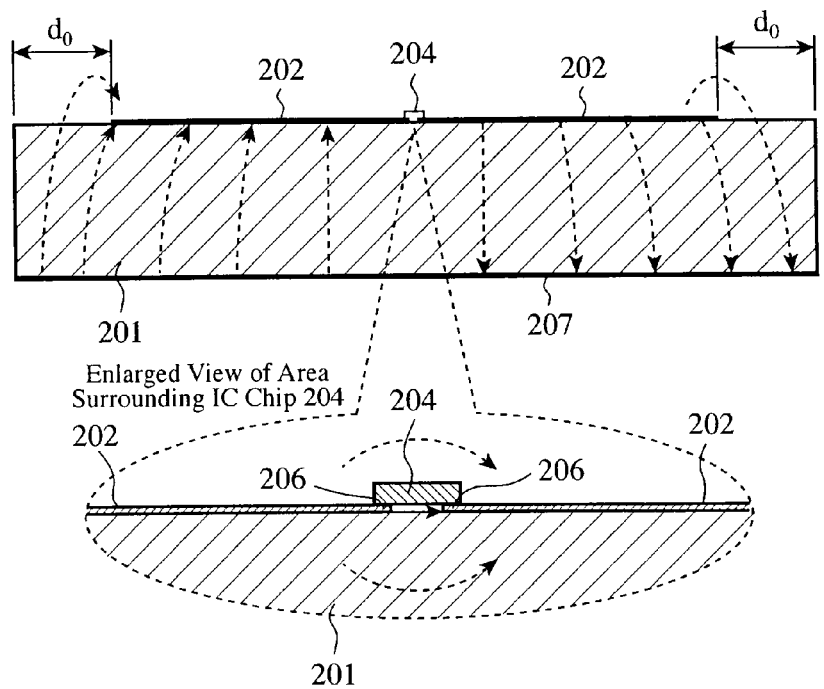
FIG. 36 is a graphical representation of an electric field between a conductor pattern and a ground conductor layer.
Figure 37:
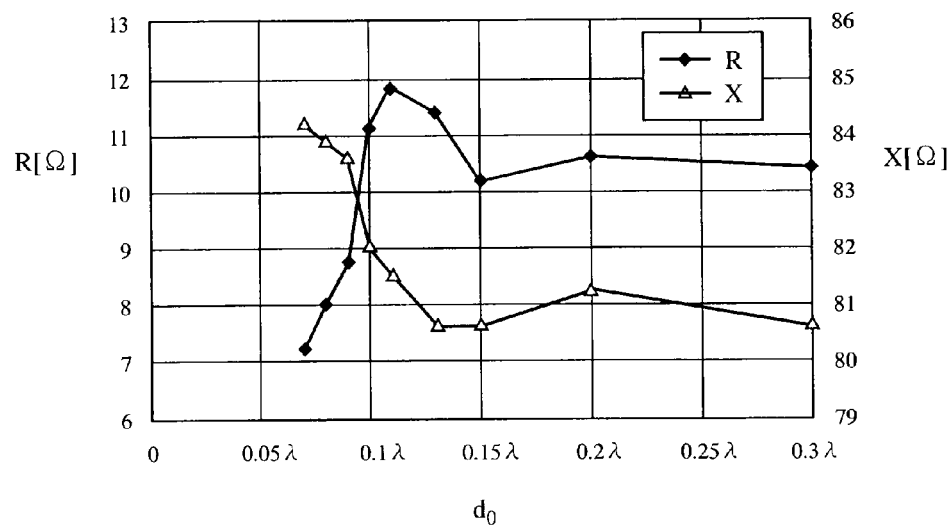
FIG. 37 is a drawing showing change in the characteristic impedance of the RFID tag.

Next, the principle of operation and characteristics of the RFID tag (Embodiment 7) and those of a linear-slot RFID tag will be explained with reference to FIGS. 36 and 37. For the sake of simplicity, the structure and data of the linear-slot RFID tag equivalent to the RFID tag (Embodiment 7), instead of the RFID tag (Embodiment 7), are reflected in FIGS. 36 and 37, though the RFID tag (Embodiment 7) provides the same characteristics. FIG. 36 shows an electric field which appears between the conductor pattern 202 and the ground conductor layer 207, and because such an electric field is formed between the conductors, an electric field runs between the opposing sides of the slot 203 and this results in occurrence of a potential difference between them. Therefore, the position at which the intensity of the electric field in the direction of the thickness of the dielectric substrate 201 can be made to be zero is placed at the power supply point (the terminals 205) of the IC chip 204. As a result, the electric supply loss can be reduced greatly, and the bad influence on the symmetric property of the radiation pattern of the conductor pattern 202 can be reduced, thereby lengthening the communication available distance of the RFID tag. FIG. 37 shows change in the characteristic impedance of the RFID tag due to change in the difference $d_o$ in dimension between each of the four corners of the conductor pattern 202 and a corresponding one of those of the ground conductor layer 207, and $d_o$ in the horizontal axis shows the difference d in dimension which is expressed as a ratio to the wavelength corresponding to the use frequency of the RIFD tag, and R [Ω] and X [Ω] in the vertical axis show the real part and imaginary part of the characteristic impedance, respectively. In this case, the difference in dimension between the conductor pattern 202 and the ground conductor layer 207 indicates the length $d_o$ from each side edge of the conductor pattern 202 shown in FIGS. 33 and 36 to a corresponding side edge of the dielectric substrate 201 (FIGS. 33 and 36 show an example in which the dielectric substrate 201 has the same area as that of the ground conductor layer 207). It is therefore clear from FIG. 37 that the impedance of the RFID tag becomes almost fixed in a case in which $d_o$ is equal to or greater than 0.1λ. Therefore, by making $d_o$ be equal to or greater than 0.1λ, more-stable long-distance radio communications with the RFID reader writer can be carried out regardless of whether an object onto which the RFID tag is to be mounted is a conductor or a nonconductor. Furthermore, even in a case in which the RFID tag is placed with floating in the air, the RFID tag can carry out more-stable long-distance radio communications with the RFID reader writer without its performance degrading. As a matter of course, also in the case of the RFID tag (Embodiment 7) having the difference d in dimension (FIG. 32) between each of the four corners of the conductor pattern 202 and a corresponding one of those of the ground conductor layer 207, the RFID tag has characteristics with the same tendency as those of the linear-slot RFID tag.

Embodiment 7

Variant

Figure 38:
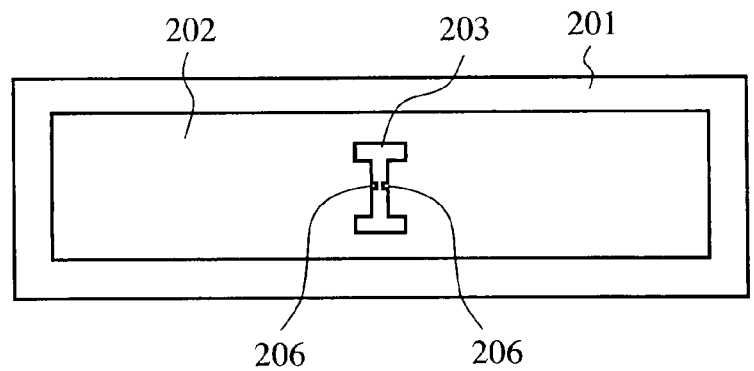
FIG. 38 is a structural diagram of an RFID tag in accordance with Embodiment 7 (variant) of the present invention (before an IC chip is mounted)
Figure 39:
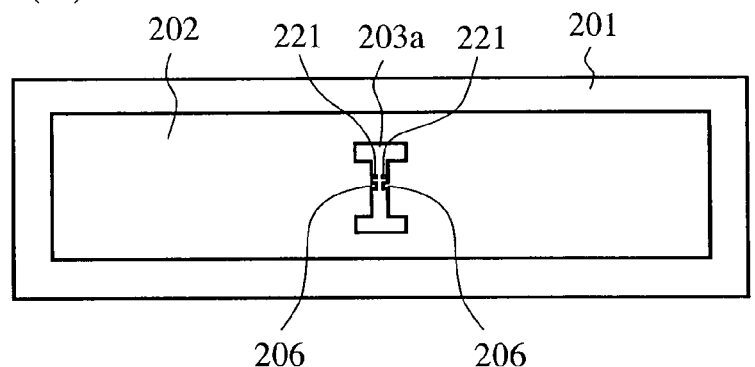
FIG. 39 is a structural diagram of an RFID tag in accordance with Embodiment 7 (variant) of the present invention (before an IC chip is mounted)
Figure 39:
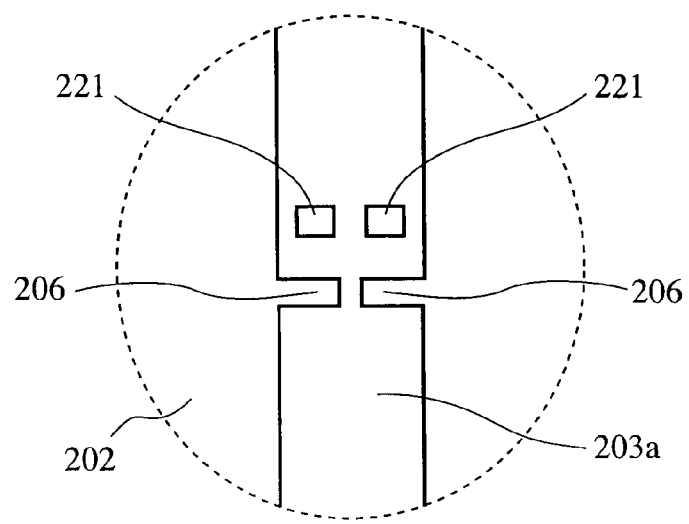

Embodiment 7 (variant) of the present invention will be explained below with reference to FIGS. 38 to 43. FIG. 38 is a structural diagram of an RFID tag in accordance with Embodiment 7 (before an IC chip is mounted), FIG. 39 (FIG. 39(a)) is a structural diagram of the RFID tag in accordance with Embodiment 7 (variant) (before an IC chip is mounted), and FIG. 39(b) is an enlarged plan view of an area in the vicinity of a slot shown in FIG. 39(a). The same reference numerals as those shown in the other diagrams denote the same components or like components.

In Embodiment 7, the RFID tag using an IC chip 204 having two terminals 205 is explained. In contrast, in a case in which an IC chip having four terminals 205 is mounted, what is necessary is just to dispose, in addition to the electrodes 206 explained in Embodiment 7, two dummy pads 221 within the slot 203 in the vicinity of the electrodes 206 and to connect two remaining terminals 205 which are not connected to the electrodes 206 to the dummy pads 221. In this case, instead of electrically connecting the terminals 205 to the dummy pads 221, the dummy pads 221 can be used as bases for the terminals 205. Furthermore, by using a formation method of forming the dummy pads 221 at the same time when the electrodes 206 are formed, the dummy pads can be formed with a high degree of efficiency. The dummy pads 221 are pads which simply serve as dummies which are not electrically connected to the conductor pattern 203 and the electrodes 206. By thus disposing the dummy pads 221, because any change in the specifications of the IC chip 204 which is to be mounted in the RFID can be flexibly coped with, the RFID tag with a simple structure can be manufactured at a low cost. The number of dummy pads 221 is not limited to two, and what is necessary is just to determine the number of dummy pads according to the number of terminals 205 of the IC chip 204. It is necessary to determine the shape and size of the slot 203 according to the number of the terminals 205 and the characteristic impedance of the IC chip 204 to be mounted. In order to achieve impedance matching between the slot and the IC chip, what is necessary is just to, in a case in which the number of the legs of the connecting terminals of the IC chip 204 is two, form two terminals 205 each having a width which can achieve the impedance matching, in addition to a fine adjustment of the shape of the slot 203.

Figure 40:
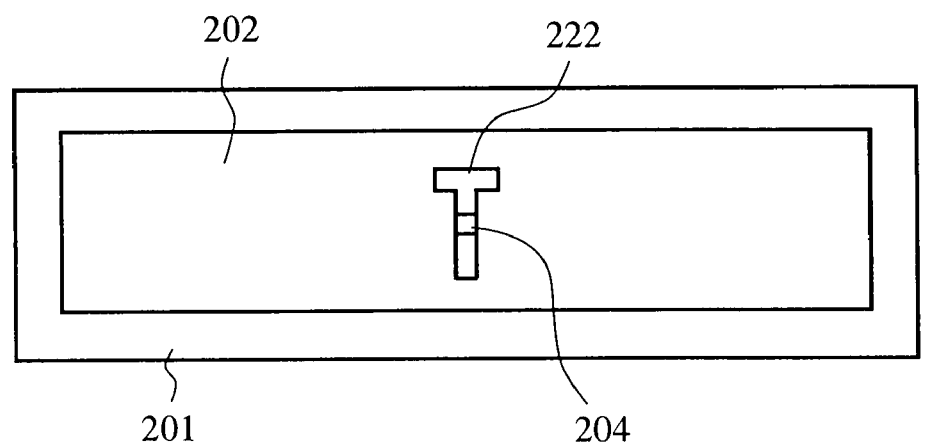
FIG. 40 is a structural diagram of an RFID tag in accordance with Embodiment 7 (variant) of the present invention (the shape of a slot is changed)
Figure 40:
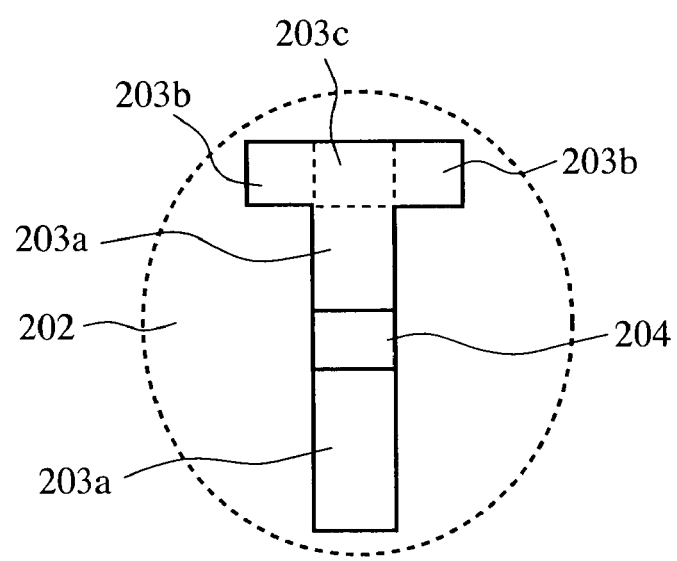

FIGS. 40 to 12 are structural diagrams (changes in the shape of the slot) each showing an RFID tag in accordance with Embodiment 7 (variant), and (a) and (b) of each figure are a general view of the RFID tag and an enlarged view of an area surrounding the slot of the RFID tag, respectively. In FIGS. 40 to 43, reference numerals 222 to 225 denote slots each of which is formed in a central part of the conductor pattern 202, and the same reference numerals as those shown in the other diagrams denote the same components or like components. In Embodiment 7, an explanation about the H-shaped slot 203 in which two bent-shaped slots 203b communicate with one end portion 203c of the long-narrow-shaped slot 203a in such a manner as to be bent and extending from the end portion in both directions perpendicular to the long-narrow-shaped slot 203a respectively is made. In contrast, as will be explained below, any variant of the RFID tag of Embodiment 7 (variant) has a shape different from that of this slot 203, and, although the RFID tag is equivalent to a linear-slot RFID as shown in FIG. 33, has a shorter length in "the direction in which the slot 203 (the long-narrow-shaped slot 203a) of the dielectric substrate 201 is extending" than that of the RFID tag having a linear slot. The connection between the terminals 205 of the IC chip 204 and the conductor pattern 202 (the electrodes 206) and so on are the same as those of any one of the above-mentioned variants and Embodiment 7.

In the RFID tag shown in FIG. 40, the slot 222 is formed in a central part of the conductor pattern 202. This slot 222 is comprised of a long-narrow-shaped slot 203a and bent-shaped slots 203b. The bent-shaped slots 203b communicate with one end portion 203c of the long-narrow-shaped slot 203a in such a manner as to be bent and extending from the end portion in both directions perpendicular to the long-narrow-shaped slot 203a respectively, so that the bent-shaped slots make the slot have a shape like a letter T. In the structure shown in FIG. 40(b), the long-narrow-shaped slot 203a contains an inside portion of the slot 203 which is extending in the longitudinal direction of the slot 203 and which is enclosed by a dotted line. Thus, the end portion 203c of the long-narrow-shaped slot 203a is the portion enclosed by the dotted line. Therefore, as shown in FIG. 40(b), the portions continuously extending in the lateral direction from the end portion 203c which is the portion enclosed by the dotted line are the bent-shaped slots 203b. The length and width of the long-narrow-shaped slot 203a and those of the bent-shaped slots 203b can be determined according to the use frequency and the characteristic impedance of the IC chip to be mounted. The same goes for the variants of FIG. 41(b) to FIG. 43(b).

Figure 41:
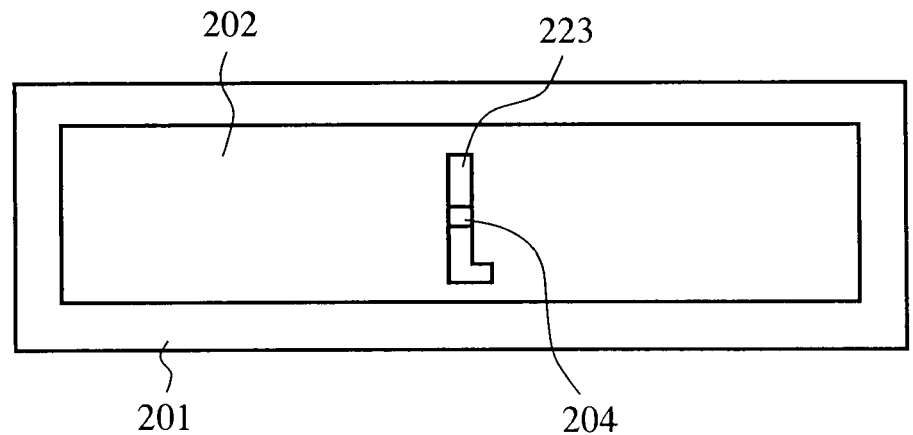
FIG. 41 is a structural diagram of an RFID tag in accordance with Embodiment 7 (variant) of the present invention (the shape of a slot is changed)
Figure 41:
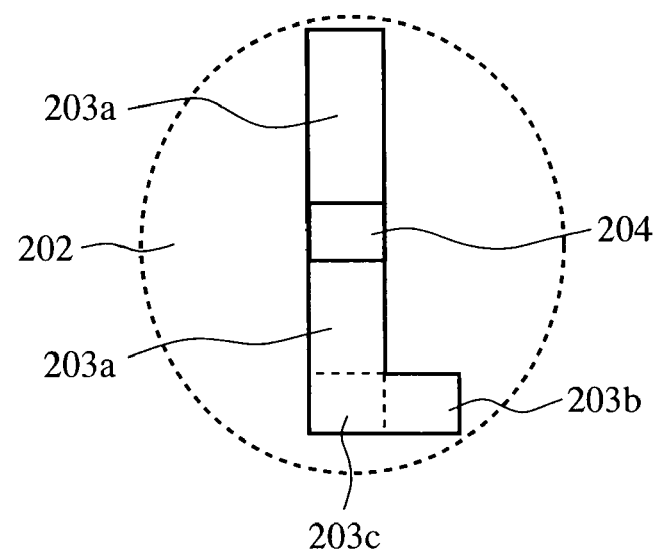
Figure 42:
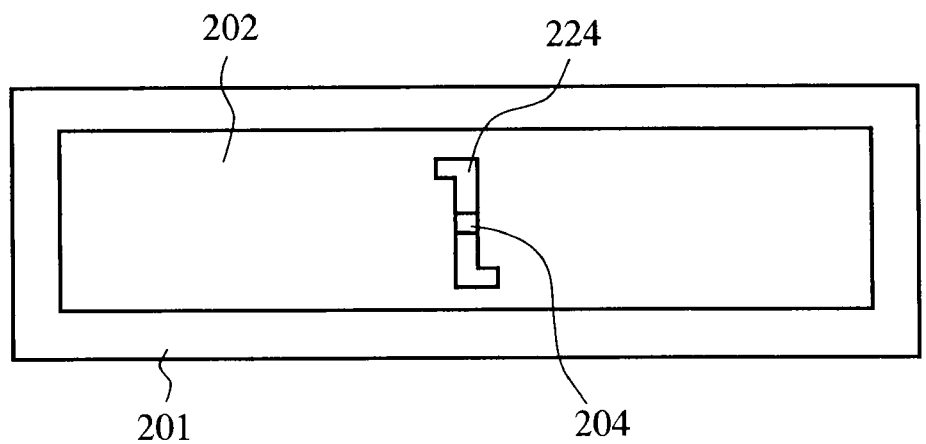
FIG. 42 is a structural diagram of an RFID tag in accordance with Embodiment 7 (variant) of the present invention (the shape of a slot is changed)
Figure 42:
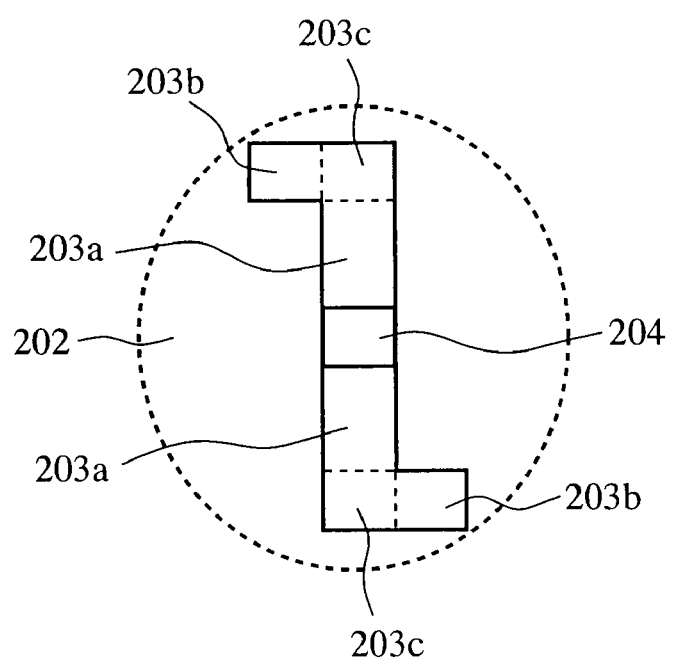
Figure 43:
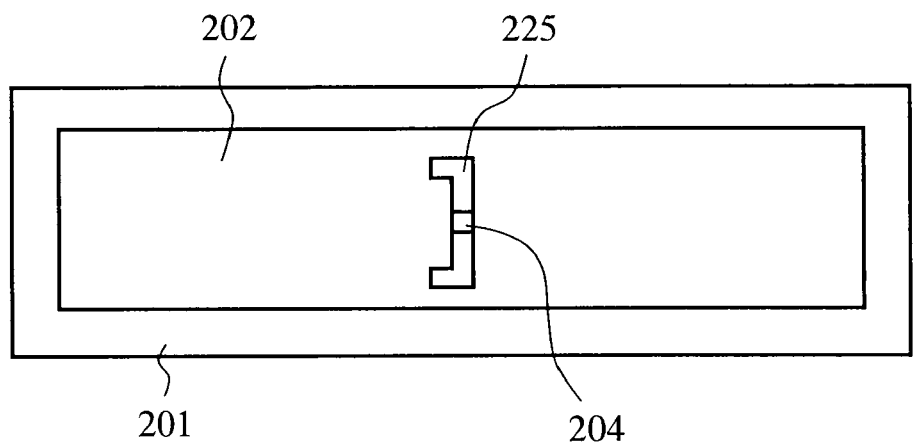
FIG. 43 is a structural diagram of an RFID tag in accordance with Embodiment 7 (variant) of the present invention (the shape of a slot is changed)
Figure 43:
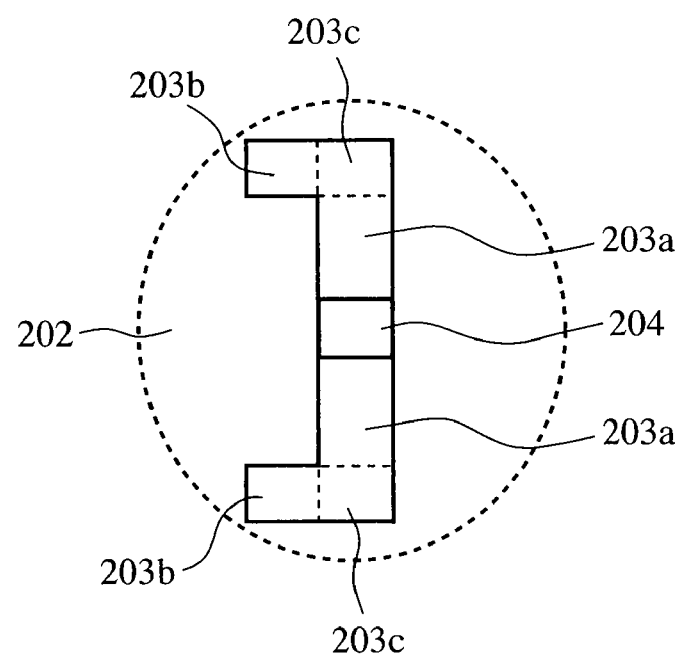

In the RFID tag shown in FIG. 41, the slot 223 is formed in a central part of the conductor pattern 202. This slot 223 is comprised of a long-narrow-shaped slot 203a and a bent-shaped slot 203b. The bent-shaped slot 203b communicates with one end portion 203c of the long-narrow-shaped slot 203a in such a manner as to be bent and extending from the end portion in one direction perpendicular to the long-narrow-shaped slot 203a, so that the bent-shaped slot makes the slot have a shape like a letter L. In the RFID tag shown in FIG. 42, the slot 224 is formed in a central part of the conductor pattern 202. This slot 222 is comprised of a long-narrow-shaped slot 203a and bent-shaped slots 203b. The bent-shaped slots 203b communicate with end portions 203c of the long-narrow-shaped slot 203a in such a manner as to be bent and extending from the end portions in different directions perpendicular to the long-narrow-shaped slot 203a respectively, so that the bent-shaped slots make the slot have a double L shape symmetric with respect to the IC chip 204. In the RFID tag shown in FIG. 43, the slot 224 is formed in a central part of the conductor pattern 202. This slot 222 is comprised of a long-narrow-shaped slot 203a and bent-shaped slots 203b. The bent-shaped slots 203b communicate with end portions 203c of the long-narrow-shaped slot 203a in such a manner as to be bent and extending from the end portions in the same direction perpendicular to the long-narrow-shaped slot 203a respectively, so that the bent-shaped slots make the slot have a shape like a Japanese letter " " コ . "." As mentioned above, because the principle of operation and characteristics of each of the variants of the RFID tag shown in FIGS. 40 to 43 is the same as that of Embodiment 7, except for the shape of the slot, any one of the slots 222 to 225 works even if it is not located in the central part of the conductor pattern 202, but, in case in which it is not located in the central part of the conductor pattern, its performances, such as the communication range, may degrade as compared with the example in which the slot 222, . . . , or 225 is located in the central part of the conductor pattern 202, as in the case of Embodiment 7.

As mentioned above, in the RFID tag in accordance with Embodiment 7, the IC chip is placed at the position where the electric field in the direction of the thickness of the dielectric substrate 201 is 0, and, when the RFID tag carries out radio communications with a reader writer, the bad influence on the symmetric property of the radiation pattern of the conductor pattern 202 is reduced and the IC chip 204 is connected to the power supply point. Therefore, the electric supply loss can be reduced greatly, and the communication available distance of the RFID tag can be lengthened. Furthermore, by disposing either one of the slots 203, and 222 to 225 comprised of a long-narrow-shaped slot 203a and one or two bent-shaped slots 203b, even when the width of the dielectric substrate 201 required of the RFID tag is restricted by the size of the position where the RFID tag is to be mounted, the possibility that the RFID tag can be placed is increased.

Embodiment 8

Figure 44:
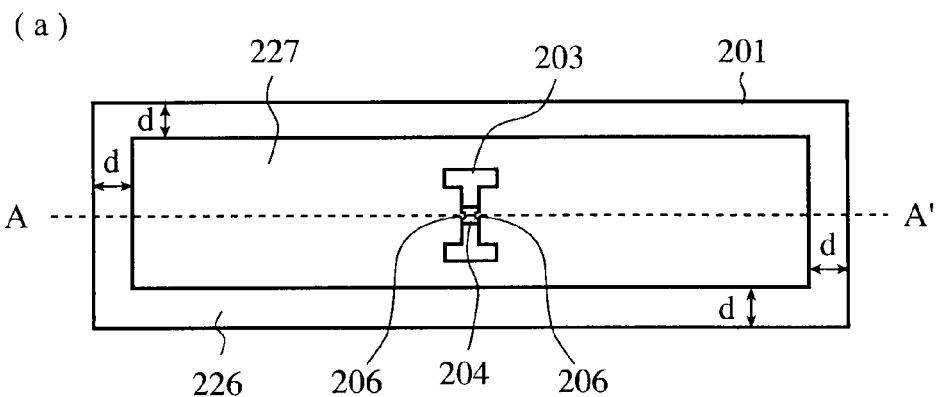
FIG. 44 is a structural diagram of an RFID tag in accordance with Embodiment 8 of the present invention.
Figure 44:
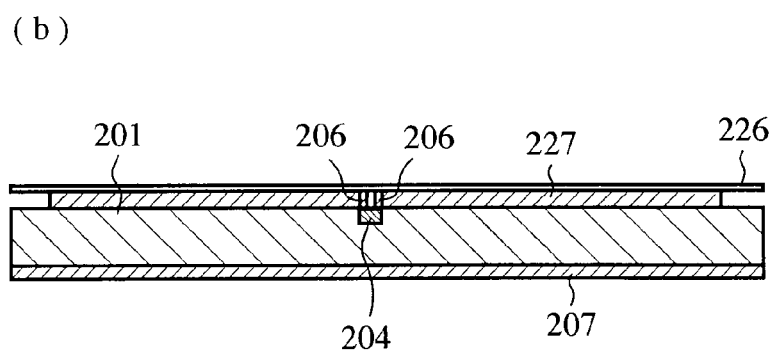
Figure 44:
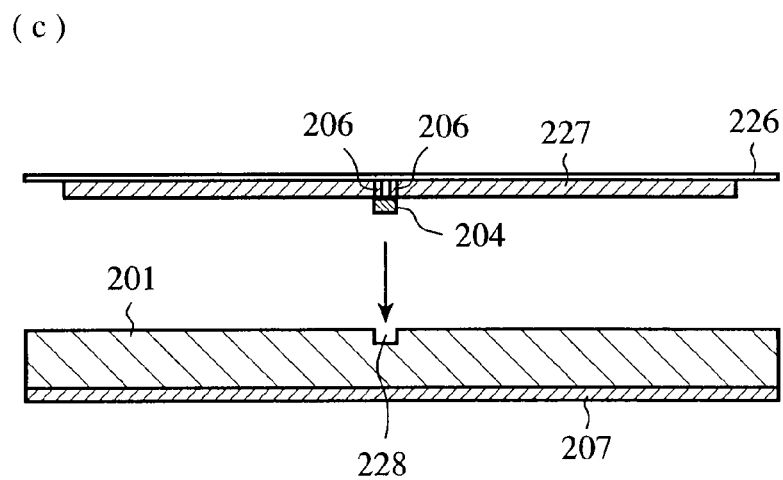

An explanation will be made as to Embodiment 8 of the present invention while the explanation of the same components or like components designated by the same reference numerals as those shown in Embodiment 7 and Embodiment 7 (variant) will be omitted. FIG. 44 is a structural diagram of an RFID tag in accordance with this Embodiment 8. FIG. 44(a) is a plan view of the RFID tag, FIG. 32(b) is a cross-sectional view taken along the A-A' line of FIG. 32(a), and FIG. 32(c) is an exploded cross-sectional view of FIG. 32(b). In these FIG. 44, reference numeral 226 denotes a film base which is disposed on one main surface (a front surface) of the dielectric substrate 201. The film base is bonded onto the one main surface (the front surface) of the dielectric substrate 201 by using an adhesive sheet (this adhesive sheet will be explained in full detail when a below-mentioned manufacturing method of manufacturing the RFID is explained), an adhesive bond, or the like. This film base 226 is the same as that described in Embodiment 7, and, as the film base, film polyethylene t'er'ephthalate, polyimide, polyethylenenaphthalate, polyvinyl chloride, or the like can be used. As an alternative, the film base 226 can be something with flexibility or can be a substrate which does not have such flexibility. Furthermore, the film base can be transparent or can be colored and translucent. In FIG. 44(a), an example in which the film base 226 is transparent and therefore the RFID tag's surface is visible through the film base 226 is shown. In the case of FIG. 44, the film base 226 and the dielectric substrate 201 have the same size in a plane. Reference numeral 227 denotes a conductor pattern which is formed on the film base 226 by using etching or printing, and which functions as a radiant portion of the antenna (the patch antenna) of the RFID tag. As shown in FIG. 44(a), the conductor pattern is formed in an area of a surface of the dielectric substrate 201 in such a manner as to be spaced apart from each of the shorter and longer side edges of the dielectric substrate 201 by a distance d. As a matter of course, the film base 226 can be alternatively placed on the one main surface of the dielectric substrate in such a manner as to be spaced apart from each of the shorter and longer side edges of the dielectric substrate 201 by the distance d, and the conductor pattern 202 can be alternatively formed over the whole surface of the film base 226. Reference numeral 228 denotes a groove portion formed in the front surface of the dielectric substrate 201. Because the groove portion is formed in order to enable an IC chip 204 to be fitted thereinto, the groove portion is formed so as to have a depth and a width corresponding to the size of the IC chip 204. Furthermore, it is needless to say that the position where the groove portion 228 is formed is determined according to at which position of the slot 203 the IC chip 204 is to be placed. The same reference numerals as those shown in the other diagrams denote the same components or like components.

The slot 203 and the electrodes 206 can be formed at the same time when the conductor pattern 227 is formed by using etching, vapor deposition, or the like. The conductor pattern 202 (including the slot 203 and the electrodes 206) can be formed by performing etching on the film base in which a conductor layer is formed over the whole surface of the film base. As an alternative, a film base on which the conductor pattern 202 (including the slot 203 and the electrodes 206) is printed from the beginning can be used. Even in this embodiment, as in the case of Embodiment 7 (variant), in a case in which the number of terminals 205 of the IC chip 204 is larger than 2, it is possible to dispose two dummy pads 221 in the vicinity of the electrodes 206 and within the slot 203, in addition to the electrodes 206. Furthermore, in this embodiment (FIG. 44), the slot has the same shape as that shown in FIG. 32, thought it cannot be overemphasized that the slot can be any one of the slots 222 to 225 (FIGS. 40 to 43) having shapes as explained in Embodiment 7 (variant).

Figure 45:
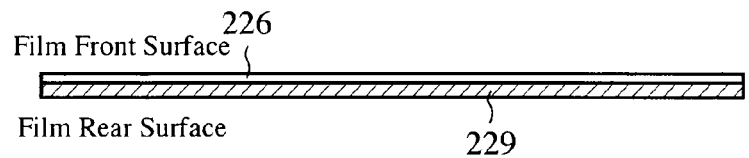
FIG. 45 is a drawing showing a process of manufacturing the RFID tag in accordance with Embodiment 8 of the present invention.
Figure 45:
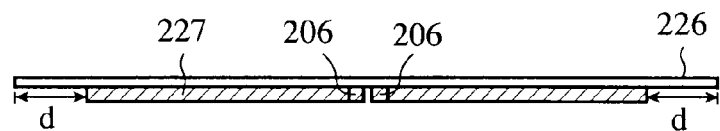
Figure 45:
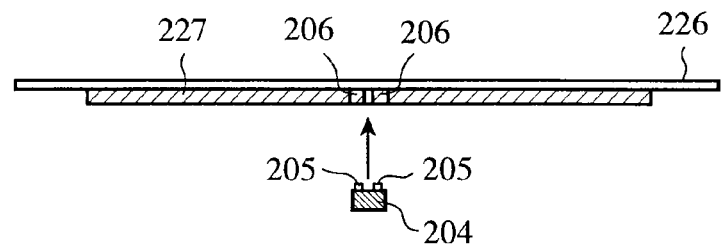
Figure 45:
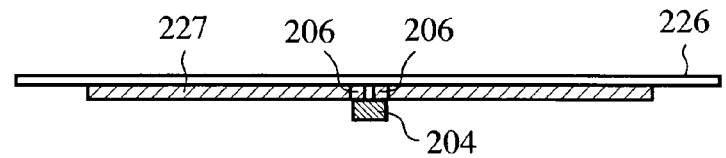
Figure 45:
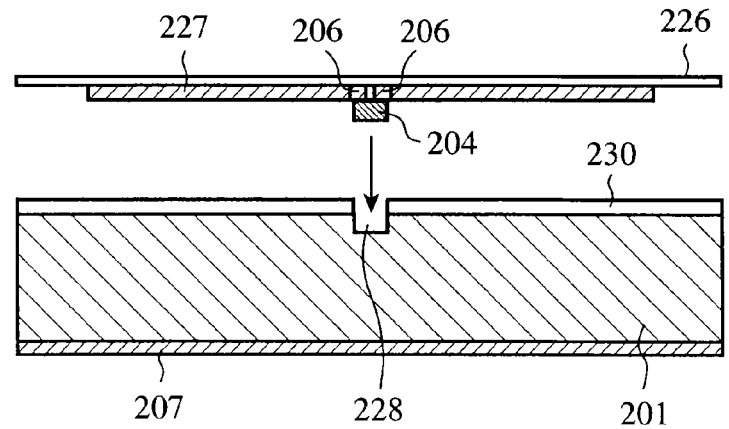

Hereafter, the manufacturing method of manufacturing the RFID tag in accordance with Embodiment 8 will be explained. FIG. 45 is a diagram showing processes of manufacturing the RFID tag in accordance with this Embodiment 8. In FIG. 45, reference numeral 229 denotes a conductor layer formed on a rear face of the film base, and reference numeral 230 denotes an adhesive sheet for bonding the dielectric substrate 201 and the film base 226 to each other. As shown in FIG. 45(e), the adhesive sheet 230 is disposed on a portion of the dielectric substrate 201 excluding the groove portion 228, and can bond and fix the dielectric substrate 201 and the film base 226 to each other. That is, the adhesive sheet 230 is a fixing means of fixing the conductor pattern 202 onto the front surface of the dielectric substrate. An adhesive bond, instead of the adhesive sheet 230, can be used in order to fix the dielectric substrate 201 and the film base 226 to each other. The same reference numerals as those shown in the other diagrams denote the same components or like components.

Next, the manufacturing method of manufacturing the RFID tag in accordance with Embodiment 8 will be explained below. The manufacturing processes of the manufacturing method of manufacturing the RFID tag will be explained with reference to cross-sectional views shown in FIGS. 45(a) to 45(e). In FIG. 45(a), a conductor layer formation process of forming the conductor layer 229 on the film base 226 (i.e., on the rear face of the film base 226) is shown. Then, as shown in FIG. 45(b), a conductor pattern formation process of, in the film base 226 in which the conductor layer 223 is formed over the whole rear surface thereof in the conductor layer formation process, masking both a peripheral portion having the predetermined width d and extending from any side edge portion of the film base and an area in which the electrodes 206 are to be formed in the slot 203 and forming simultaneously the conductor pattern 227 and the electrodes 206 by using etching or the like is shown. The conductor pattern 227 can be alternatively printed onto the film base 226 instead of performing the conductor layer formation process.

Next, as shown in FIGS. 45(c) and 45(d), in an IC chip connecting process, the connecting terminals 205 of the IC chip 204 are electrically connected to the electrodes 206 by using soldering. Although thermo compression bonding using reflow is generally used as a method of electrically connecting them to each other, they can be connected to each other by alternatively using another method. On the other hand, as shown in FIG. 45(e), while the ground conductor pattern 207 is formed on the other main surface (the rear surface) of the dielectric substrate 201, a groove portion 228 into which the IC chip is fitted is formed in the one main surface (the front surface). This groove portion 228 is formed by using, for example, an injection molding method. The groove portion can be formed in a printed circuit board by using cutting, milling, or the like instead of the injection molding method. After that, as shown in FIG. 34(e), in a film supporting process (fixing process), an adhesive sheet 230 excluding a part corresponding to the groove portion 228 is bonded onto the one main surface of the dielectric substrate 201. Onto the dielectric substrate 201 to which the adhesion sheet 230 is thus bonded, the film base 226 onto which the conductor pattern 227 and the IC chip 204 are mounted are placed in such a manner that the IC chip 204 is inserted into the groove portion 228, so that the film base 226 is supported against the dielectric substrate 201 by the adhesive sheet 230. In this way, the RFID tag is constructed. Although not shown in the figures, the film base 226 can be placed on the one main surface of the dielectric substrate in such a manner as to be spaced apart from each of the shorter and longer side edges of the dielectric substrate 201 by the distance d. In this case, the conductor pattern 202 can be formed over the whole surface of the film base 226.

As mentioned above, since the RFID tag in accordance with Embodiment 8 is constructed in such a manner that the IC chip 204 is fitted into the groove portion 228 formed in one main surface of the dielectric substrate 201, bending and swelling are difficult to appear in the film base 226, and therefore, even when a shock or the like is applied to the RFID tag, the frequency of occurrence of a breakage of the IC chip 204, an electric contact failure in connection between the IC chip 204 and the electrodes 206 or disconnection between them, and so on can be reduced greatly. Furthermore, the size of the groove portion 228 of the dielectric substrate 201 can be set in consideration of the yields at the time of fitting the IC chip 204 into the groove portion 228 with respect to the volume of the IC chip 204. In the case of forming the groove portion 228 in the dielectric substrate 201 without using an injection molding method, the groove portion can be formed by using a method of cutting the one main surface of the dielectric substrate 201. As mentioned above, in the RFID tag in accordance with Embodiment 8, the IC chip is placed at the position where the electric field in the direction of the thickness of the dielectric substrate 201 is 0, and, when the RFID tag carries out radio communications with a reader writer, the bad influence on the symmetric property of the radiation pattern of the conductor pattern 202 is reduced and the IC chip 204 is connected to the power supply point, as in the case of the RFID tag in accordance with Embodiment 7. Therefore, the electric supply loss can be reduced greatly, and the communication available distance of the RFID tag can be lengthened. Furthermore, by forming the slot 203 in such a manner that it has a long-narrow-shaped slot 203a and bent-shaped slots 203b, even in a case in which the width of the dielectric substrate 201 required of the RFID tag is restricted by the size of the position where the RFID tag is to be mounted, the RFID tag can be placed at the position.

Figure 46:
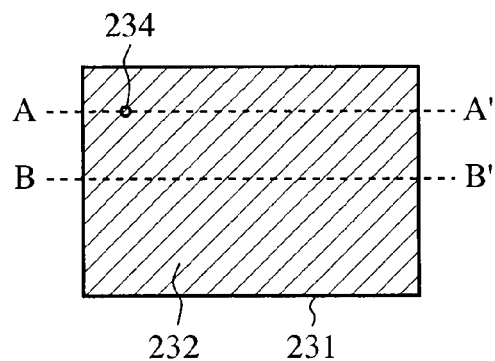
FIG. 46 is a structural diagram of an injection molding mold in accordance with Embodiment 8 of the present invention.
Figure 46:
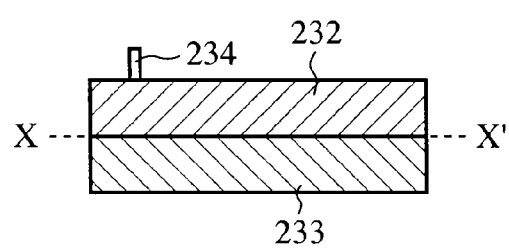
Figure 47:
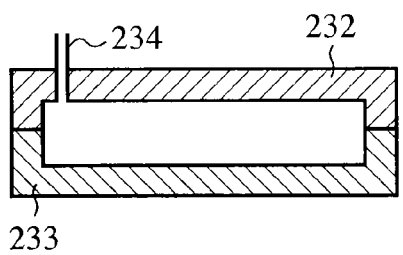
FIG. 47 is a cross-sectional view of the injection molding mold in accordance with Embodiment 8 of the present invention.
Figure 47:
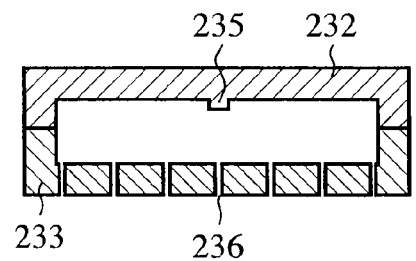
Figure 47:
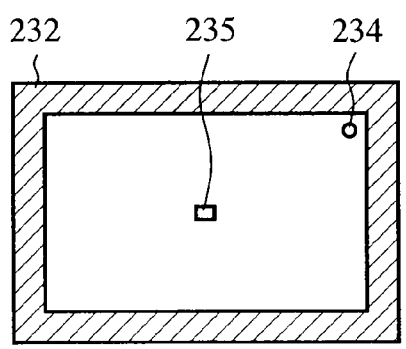
Figure 47:
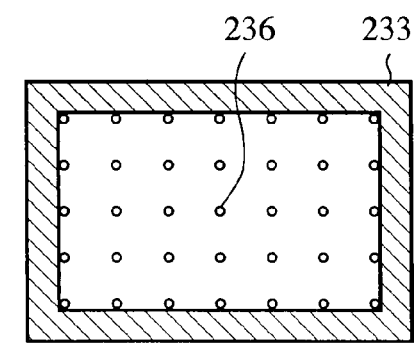

Finally, the structure of the dielectric substrate 1 in which the ground conductor layer 207 is formed on the other main surface (the rear face) thereof using the manufacturing method of manufacturing the RFID tag in accordance with Embodiment 8 (injection molding used for forming the dielectric substrate), and a manufacturing method of manufacturing the dielectric substrate will be explained with reference to the FIGS. 46 to 51. In these figures, the same reference numerals denote the same components or like components. FIG. 46 is a structural diagram for explaining the structure of an injection molding metallic mold, FIG. 46(a) is a plan view of the injection molding metallic mold, and FIG. 46(b) is a side view of the injection molding metallic mold. In FIGS. 46(a) and 46(b), reference numeral 231 denotes the injection molding metallic mold used for manufacturing the dielectric substrate of the RFID tag. Reference numeral 232 denotes an upper metallic mold of the injection molding metallic mold 231, and reference numeral 233 denotes a lower metallic mold of the injection molding metallic mold 231. Reference numeral 234 denotes an inlet formed in the upper metallic mold 232, for pouring a resin. FIG. 47 is a cross-sectional view of the injection molding mold, FIG. 47(a) is a cross-sectional view of the injection molding mold taken along the A-A' line shown in FIG. 46(a), FIG. 47(b) is a cross-sectional view of the injection molding mold taken along the B-B' line shown in FIG. 46(a), FIG. 47(c) is a flat portion showing the upper metallic mold when viewed from a cross section taken along the X-X' line shown in FIG. 46(b), and FIG. 47(d) is a plan view showing the lower metallic mold when viewed from the cross section taken along the X-X' line shown in FIG. 46(b). In FIGS. 47(a) to 47(d), reference numeral 230 denotes a protruding portion formed in a dented portion of the upper metallic mold 232, and having a shape corresponding to the shape of the groove portion 228. As a matter of course, when the upper metallic mold 232 and the lower metallic mold 233 are combined, a space which is formed by their dented portions and the protruding portion 235 has a shape matching with the shape of the combination of the dielectric substrate 201 and the groove portion 228 formed in the one main surface of the dielectric substrate, which is required for the RFID tag. Reference numeral 236 denotes a plurality of vacuum suction ports formed in the lower metallic mold 233, which are used for performing vacuum suction of gas in the injection molding mold 231. As shown in FIG. 47(d), the plurality of vacuum suction ports 236 are disposed.

Figure 48:
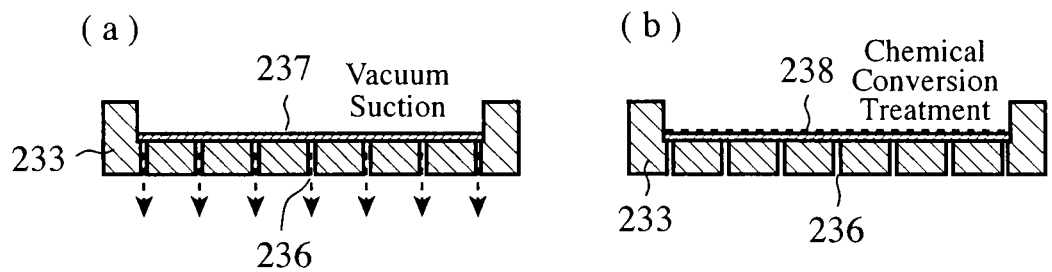
FIG. 48 is a drawing showing that a conductive foil is placed in a lower metallic mold in accordance with Embodiment 8 of the present invention.
Figure 49:
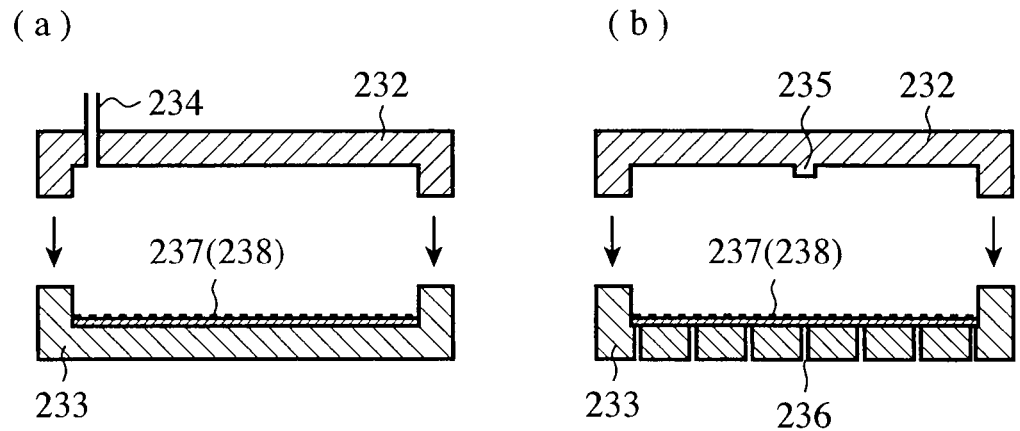
FIG. 49 is a drawing showing that metallic molds of the injection molding mold in accordance with Embodiment 8 of the present invention are combined.

FIG. 48 is the cross-sectional view showing a state in which a conductive foil placed in the lower metallic mold, FIG. 48(a) is a cross-sectional view showing a state in which the conductive foil is fixed to the lower metallic mold, and FIG. 48(b) is a cross-sectional view showing a state in which a chemical conversion treatment is performed on the conductive foil. The conductive foil 237 for ground conductor pattern is placed on the bottom of the dented portion of the lower metallic mold 233. Then, in order to improve the adhesive property with the resin of the dielectric substrate 201, a chemical conversion treatment is performed on a surface (a front surface) of this conductive foil 237 which is opposite to another surface being in contact with the vacuum suction ports 236, so that a chemical conversion-treated layer 238 having fine projections and depressions in a surface thereof is formed. FIG. 49 is a cross-sectional view showing a state at a time before the upper metallic mold is placed onto the lower metallic mold, FIG. 49(a) is a cross-sectional view, taken along the A-A' line shown in FIG. 49(a), showing a state in which the conductive foil 237 is placed in the lower metallic mold, and FIG. 49(b) is a cross-sectional view, taken along the B-B' line shown in FIG. 49(a), showing a state in which the conductive foil 237 is placed in the lower metallic mold. After the conductive foil 237 having a size matching that of the dented portion (bottom) of the lower metallic mold 233 is placed in the lower metallic mold, in order to prevent slack and waviness from occurring in the ground conductor pattern 207 formed on the other main surface (the rear surface) of the dielectric substrate 201 after the dielectric substrate 201 is manufactured by using injection molding, as shown in FIG. 48(a), a vacuum pump or a suction unit is connected to the plurality of vacuum suction ports 236 disposed in the lower metallic mold 233, vacuum suction (suction) from the plurality of vacuum suction ports 236 is carried out with an nearly-uniform force, and the conductive foil 237 is fixed to the dented portion (bottom) of the lower metallic mold 233 in such a manner as to be in close contact with the dented portion. In order to pour a resin into the injection molding mold 231 to fill the interior of the injection molding mold 231 with the resin, a vacuum suction port different from the vacuum suction ports used for making the conductive foil 237 be in close contact with the lower metallic mold 233 and an air vent port are formed in the injection molding mold 231.

As the chemical conversion treatment, a chemical conversion treatment which is generally used for injection-molded boards, such as a method of forming fine lines in the surface of the conductive foil 237 in order to improve its adhesive property with the resin or a method forming a layer on the surface of the conductive foil 237. Furthermore, in a case in which the use of only the chemical conversion treatment results in a low adhesion degree, an adhesive sheet which is the same as the adhesive sheet 230 for bonding the dielectric substrate 201 and the film base 226 to each other is placed on the chemical conversion-treated surface of the chemical conversion-treated layer. If only the placement of an adhesive sheet which is the same as the adhesive sheet 230 on the other surface of the conductive foil 237 which is opposite to the surface facing the vacuum suction ports without performing the chemical conversion treatment provides a sufficient degree of adhesion for contact between the conductive foil 237 and the resin, it is not necessary to perform the chemical conversion treatment. The procedure associated with FIG. 48(*a*) and the procedure associated with FIG. 48(*b*) can be interchanged in sequence (a preparation process for a ground conductor pattern formation process).

Next, after the chemical conversion treatment is performed on the surface of the conductive foil 237, as shown in FIG. 49, the upper metallic mold 232 and the lower metallic mold 233 are combined to be in close contact with each other in such a manner that the inner space of the injection molding mold 231 (except for the openings including the inlet 234 and the vacuum suction ports 236) can form the desired shape of the dielectric substrate 201, and the upper metallic mold 232 and the lower metallic mold 233 are fixed to each other. In this case, although not shown in the figures, in general, a guide pin and a guide hole are formed in the upper metallic mold 232 and in the lower metallic mold 233, respectively, and, after the guide pin is fitted into the guide hole so that the upper metallic mold 232 and the lower metallic mold 233 are positioned, they are fixed to each other with clamping (a clamping process of clamping the injection molding mold).

Figure 50:
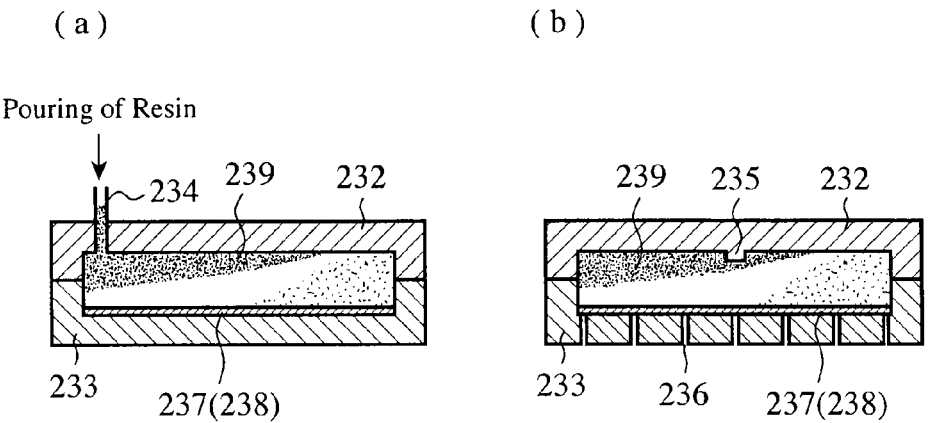
FIG. 50 is a drawing showing that a thermoplastic resin is poured into the injection molding mold for dielectric substrate in accordance with Embodiment 8 of the present invention.

FIG. 50 is a cross-sectional view showing a state in which the upper metallic mold is placed onto the lower metallic mold, and a thermoplastic resin is poured into the modes so that the dielectric substrate is formed, FIG. 50(*a*) is a cross-sectional view taken along the A-A' line shown in FIG. 49(*a*), and FIG. 50(*b*) is a cross-sectional view taken along the B-B' line shown in FIG. 49(*a*). Reference numeral 239 denotes the resin (the thermoplastic resin). After the clamping of the injection molding mold 231 is completed, in a state in which the chemical conversion-treated layer 238 which becomes the ground conductor pattern 207 is placed on the surface of the dented portion of the lower metallic mold 233, and the upper metallic mold 232 is then placed onto the lower metallic mold 233, the thermoplastic resin 239 which is melted is poured from the inlet 234 into the space between the upper metallic mold 232 and the lower metallic mold 233, i.e., the interior of the injection molding mold 231, and the groove portion 228 corresponding to the protruding portion 235 of the upper metallic mold 232 is formed in the one main surface of the dielectric substrate 201, as shown in FIG. 50 (a dielectric substrate formation process). Furthermore, because the conductive foil 237 with the chemical conversion-treated layer 238 is placed in the dented portion of the lower metallic mold 233 before the resin 239 is poured into the injection molding mold, the ground conductor pattern 207 is formed in the other main surface of the dielectric substrate 201 at the same time when the dielectric substrate 201 is formed (a ground conductor pattern formation process).

Figure 51:
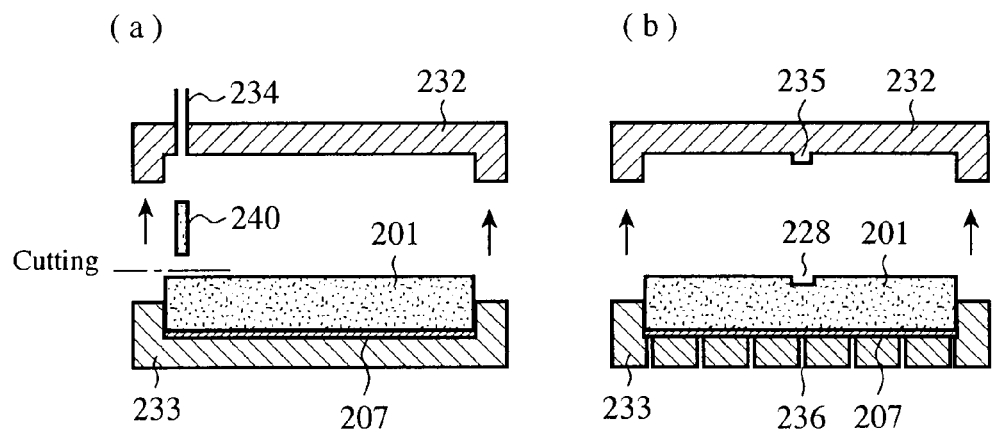
FIG. 51 is a drawing showing that a dielectric substrate in accordance with Embodiment 8 of the present invention which is injection-molded is extracted.

FIG. 51 is a cross-sectional view for explaining removing of the dielectric substrate which has been injection-molded, FIG. 51(*a*) is a cross-sectional view, taken along the A-A' line of FIG. 49(*a*), at the time when the upper metallic mold is separated from the lower metallic mold, and FIG. 51(*b*) is a cross-sectional view taken along the B-B' line of FIG. 49(*b*) at that time. Reference numeral 240 denotes an excess resin which remains in the inlet 234. After the resin 239 is solidified, the clamping of the injection molding mold 231 is released, and, as shown in FIG. 51, the upper metallic mold 232 and the lower metallic mold 233 are separated from each other and the dielectric substrate 201 is removed from the injection shaping mold 231 (a dielectric substrate removing process). In a case in which the resin 239 poured as shown in FIG. 51(*a*) has a larger volume than the interior of the injection molding mold 231, because a part of the resin 239 which remains in the inlet 234 is solidified and therefore an excess resin 240 having the same shape as the inner wall of the inlet 234 is formed on the one main surface of the dielectric substrate 201, the excess resin 240 is cut away from the dielectric substrate 201 and the cut surface is ground so that it has such a degree of surface roughness that does not prevent the adhesion between the dielectric substrate 201 and the film base 226 (a post treatment process). Because in the preparation process for the ground conductor pattern formation process, the conductive foil 237 (the chemical conversion-treated layer 238) is suctioned (in suction) and is then brought in close contact with the lower metallic mold 233, there is provided an advantage of being able to prevent the conductive foil 237 (the chemical conversion-treated layer 238) from elongating during the injection molding of the resin 239, and hence to prevent the ground conductor pattern 207 of the dielectric substrate 201 which is formed after the resin 239 is solidified from becoming thin and being cut.

By using the manufacturing method shown in FIGS. 46 to 51 (the injection molding used for manufacturing the dielectric substrate) the dielectric substrate 201 is manufactured, and the film base 226 which is manufactured by using the manufacturing method (the conductor-layer formation process (which can be omitted), the conductor pattern formation process, and the IC chip connecting process) which is explained with reference to FIG. 45 is bonded to the dielectric substrate 201. The process of boding the film base to the dielectric substrate is the same as the film supporting process and the fixing process of Embodiment 7. Furthermore, by manufacturing the dielectric substrate 201 using thermoplastic elastomer olefin having low hardness (for example, JIS-A55) as the resin 239, the RFID tag with the dielectric substrate having flexibility can be manufactured to have flexibility. Therefore, the RFID tag 210 can be mounted along a curved surface of an object such as a drum. The curved surface on which this RFID tag 210 can be mounted has such a curvature that does not break the electric connection between the IC chip 204 and the conductor pattern 227. Because even if the conductor pattern 227 is bent, the electric length of the conductor pattern does not change, the conductor pattern 227 works without any trouble as the electric wave radiating portion of the RFID tag 210 while the radiation pattern becomes deformed a little.

By designing and manufacturing the dielectric substrate 201 by using injection molding in this way, as compared with a dielectric substrate in which several printed circuit boards are bonded together and are laminated, the dielectric substrate which is injection-molded using the resin (the thermoplastic resin) 239 can be greatly reduced in cost (manufacturing cost). Furthermore, while if a dielectric substance (a material) from which the dielectric substrate used for the RFID tag is made is the one used for manufacturing a general printed circuit board, such as polytetrafluoroethylene (fluororesin system), ceramic, or glass epoxy, it is difficult to manufacture the substrate in such a manner that it has an arbitrary thickness and therefore any change in the requested size of the dielectric substance due to the mounting position of the RFID tag cannot be coped with flexibly, the injection molding of the dielectric substrate makes it possible to easily manufacture a wide variety of RFID tags because the thickness and shape of the dielectric substrate can be easily changed only by changing the metallic mold. Furthermore, by selectively using an olefin polymer resin having a low dielectric dissipation factor from among resins (thermoplastic resins) as the dielectric substrate of the RFID tag, the radiation efficiency can be improved and the RFID tag can be manufactured to have a high gain. In addition, because the specific gravity of the olefin polymer resin is about one-half of that of a general printed circuit board, a weight reduction of the RFID tag can be achieved. Furthermore, in case in which the IC chip 204 is mounted to a dielectric substrate made from a material which is hard and is thick, like a dielectric substrate made from polytetrafluoroethylene (fluororesin system), ceramic, glass epoxy, or the like which is used for manufacturing a general printed circuit board, it must be mounted one by one and therefore it takes much time to mount IC chips to such dielectric substrates one by one because there are no facilities intended for mounting them, and the formation of the groove portion 228 required for the mounting becomes complicated. In contrast, in the case in which the injection-molded board is used, because many facilities intended for mounting the IC chip 204 to the film base 226 have come on the market, it is possible to produce a lot of RFID tags at one time, the production time and the cost including those required for forming the groove portion 228 can be greatly reduced.

INDUSTRIAL APPLICABILITY

As mentioned above, the RFID tag in accordance with the present invention is suitable for use in entrance/exit control of living bodies and articles, physical distribution management, and so on.

The invention claimed is:

1. An RFID tag comprising:
a dielectric substrate;
a ground conductor portion disposed on one main surface of said dielectric substrate;
a patch conductor portion disposed on another main surface of said dielectric substrate and forming a slot, the slot spaced away from an edge of the patch conductor portion such that the patch conductor portion surrounds an entire circumference of the slot, the slot forming an electric field across opposing sides of the slot;
electrical connecting portions extending from opposing sides of said slot, respectively; and
an IC chip placed in said slot and connected to said electrical connecting portions.

2. The RFID tag according to claim 1, wherein the slot is formed in a central part of the patch conductor portion, and is formed in a long narrow shape.

3. The RFID tag according to claim 1, wherein the slot is formed in such a manner as to become wider along both directions of being spaced apart from a position where the IC chip is placed.

4. The RFID tag according to claim 1, wherein a bonding layer which can be bonded to a metal is disposed on the ground conductor portion in such a manner as to be opposite to the dielectric substrate.

5. A method of manufacturing an RFID tag, said method comprising:
a conductor forming step of forming a ground conductor portion and a patch conductor portion on a main surface of and on another main surface of a dielectric substrate, respectively;
a slot forming step of forming a slot in said patch conductor portion, the slot spaced away from an edge of the patch conductor portion such that the patch conductor portion surrounds an entire circumference of the slot, the slot forming an electric field across opposing sides of the slot;
an electrical connecting portion forming step of forming electrical connecting portions extending from opposing sides of said slot at a same time when said slot is formed; and
a connecting step of placing an IC chip in said slot, and connecting said IC chip to said electrical connecting portions.

6. A method of mounting an RFID tag including:
a ground conductor portion disposed on one main surface of a dielectric substrate;
a patch conductor portion disposed on another main surface of said dielectric substrate and forming a slot, the slot spaced away from an edge of the patch conductor portion such that the patch conductor portion surrounds an entire circumference of the slot, the slot forming an electric field across opposing sides of the slot;
electrical connecting portions extending from opposing sides of said slot, respectively; and
an IC chip placed in said slot and connected to said electrical connecting portions,
said method comprising the steps of:
forming a bonding layer which can be bonded to a metal on said ground conductor portion in such a manner as to be opposite to said dielectric substrate; and
mounting said RFID tag to said metal.

7. An RFID tag comprising:
a dielectric substrate having a hole in one main surface thereof, the hole spaced away from an edge of the dielectric substrate such that the dielectric substrate surrounds an entire circumference of the hole, the hole forming an electric field across opposing sides of the hole;
a ground conductor pattern disposed on another main surface of said dielectric substrate;
a film base disposed on the one main surface of said dielectric substrate;
a conductor pattern disposed on said film base and forming a slot therein; and
an IC chip inserted into said hole of said dielectric substrate in a state in which the IC chip is electrically connected to said conductor pattern via said slot.

8. The RFID tag according to claim 7, wherein the dielectric substrate is made from a thermoplastic resin.

9. An RFID tag comprising:
a dielectric substrate having a hole in one main surface thereof, the hole spaced away from an edge of the dielectric substrate such that the dielectric substrate surrounds an entire circumference of the hole, the hole forming an electric field across opposing sides of the hole;
a ground conductor pattern disposed on another main surface of said dielectric substrate;
a film base disposed on the one main surface of said dielectric substrate;
a conductor pattern disposed on said film base and formed in an area of a surface of said film base in such a manner as to be spaced apart from any side edge of said film base by a predetermined distance;
a slot formed in said conductor pattern; and
an IC chip inserted into said hole of said dielectric substrate in a state in which the IC chip is electrically connected to said conductor pattern via said slot.

10. An RFID tag comprising:
a dielectric substrate having a hole in one main surface thereof, the hole spaced away from an edge of the dielectric substrate such that the dielectric substrate surrounds an entire circumference of the hole, the hole forming an electric field across opposing sides of the hole;

a ground conductor pattern disposed on another main surface of said dielectric substrate;

a film base disposed on the one main surface of said dielectric substrate;

a conductor pattern disposed on said film base and formed in an area of a surface of said film base in such a manner as to be spaced apart from any side edge of said film base by a predetermined distance;

a slot formed in said conductor pattern;

electrical connecting portions extending from both sides of said conductor pattern which forms said slot toward an inside of said slot, respectively; and an IC chip inserted into said hole of said dielectric substrate in a state in which the IC chip is electrically connected to the electrical connecting portions.

11. An RFID tag comprising:

a dielectric substrate having a hole in one main surface thereof, the hole spaced away from an edge of the dielectric substrate such that the dielectric substrate surrounds an entire circumference of the hole, the hole forming an electric field across opposing sides of the hole;

a ground conductor pattern disposed on another main surface of said dielectric substrate;

a film base disposed on the one main surface of said dielectric substrate;

a conductor pattern disposed on said film base and forming a slot in said film base;

an IC chip inserted into said hole of said dielectric substrate in a state in which the IC chip is electrically connected to said conductor pattern via said slot; and a fixing means for inserting said IC chip into said hole of said dielectric substrate, and for fixing said conductor pattern of said film base and the one main surface of said dielectric substrate to each other.

12. A method of manufacturing an RFID tag, said method comprising:

a hole forming step of forming a hole in one main surface of a dielectric substrate, the hole spaced away from an edge of the dielectric substrate such that the dielectric substrate surrounds an entire circumference of the hole, the hole forming an electric field across opposing sides of the hole;

a ground pattern forming step of forming a ground conductor pattern on another main surface of said dielectric substrate;

a conductor pattern forming step of forming a conductor pattern having a slot on a film base;

an IC chip connecting step of electrically connecting an IC chip to said conductor pattern via said slot; and a fixing step of inserting said IC chip into said hole and fixing said film base to said dielectric substrate after the IC chip is electrically connected to the conductor pattern in said IC chip connecting step.

13. A method of manufacturing an RFID tag, said method comprising:

a dielectric substrate forming step of combining an upper metallic mold having a dented portion and a projecting portion in said dented portion and a lower metallic mold having a dented portion so as to form a space between said upper metallic mold and said lower metallic mold, pouring a resin made from a dielectric material into said space, and forming a hole in one main surface of a dielectric substrate, the hole corresponding to the projecting portion of said upper metallic mold, the hole spaced away from an edge of the dielectric substrate such that the dielectric substrate surrounds an entire circumference of the hole, the hole forming an electric field across opposing sides of the hole;

a ground conductor pattern forming step for, before said resin is poured into said space, placing a conductive foil in the dented portion of said lower metallic mold so as to form a ground conductor pattern on another main surface of said dielectric substrate at a same time when said dielectric substrate is formed;

a conductor pattern forming step of forming a conductor pattern having a slot on a film base;

an IC chip connecting step of electrically connecting an IC chip to said conductor pattern via said slot; and a fixing step of inserting said IC chip into said hole and fixing said film base to said dielectric substrate.

14. The method of manufacturing the RFID tag according to claim 13, wherein an inlet via which the resin is poured is formed in the upper metallic mold, and a vacuum suction port is formed in the lower metallic mold.

15. The method of manufacturing the RFID tag according to claim 13, wherein an upper surface of the conductive foil is subjected to a chemical conversion treatment before the conductive foil is placed in the dented portion of the lower metallic mold.

16. An RFID tag comprising:

a dielectric substrate in which a groove portion is formed in a front surface thereof, the groove portion spaced away from an edge of the dielectric substrate such that the dielectric substrate surrounds an entire circumference of the groove portion, the groove portion forming an electric field across opposing sides of the groove portion, a ground conductor layer disposed on a rear surface of said dielectric substrate, a conductor pattern disposed on a front surface of said dielectric substrate and having a slot, and an IC chip which transmits and receives electric waves through said slot, said slot including a long-narrow-shaped slot, and a bent-shaped slot communicating with an end portion of said long-narrow-shaped slot in such a manner as to be bent and extending from the end portion in a direction perpendicular to said long-narrow-shaped slot, the IC chip being fitted into said groove portion.

17. The RFID tag according to claim 16, wherein the IC chip is placed in a central part of the long-narrow-shaped slot.

18. The RFID tag according to claim 16, wherein the bent-shaped slot is extending in either one direction or both directions perpendicular to the long-narrow-shaped slot.

19. The RFID tag according to claim 16, wherein the bent-shaped slot is arranged in such a manner as to be symmetric with respect to the IC chip.

20. The RFID tag according to claim 16, wherein the conductor pattern is formed in a part of the front surface of the dielectric substrate excluding a peripheral portion of the front surface.

21. An RFID tag comprising:

a dielectric substrate in which a groove portion is formed in a front surface thereof, the groove portion spaced away from an edge of the dielectric substrate such that the dielectric substrate surrounds an entire circumference of the groove portion, the groove portion forming an electric field across opposing sides of the groove portion;

a ground conductor layer disposed on a rear surface of said dielectric substrate;

a conductor pattern in which a slot including a long-narrow-shaped slot and a bent-shaped slot communicating with an end portion of said long-narrow-shaped slot in such a manner as to be bent and extending from the end portion in a direction perpendicular to said long-narrow-shaped slot is formed in a front surface of said dielectric substrate;

electrodes extending from both inner edges of said conductor pattern toward an inside of said long-narrow-shaped slot and being spaced apart from each other; and an IC chip electrically connected to said electrodes, for transmitting and receiving electric waves through said slot, the IC chip being fitted into said groove portion.

22. An RFID tag comprising:

a film base;

a conductor pattern in which a slot including a long-narrow-shaped slot and a bent-shaped slot communicating with an end portion of said long-narrow-shaped slot in such a manner as to be bent and extending from the end portion in a direction perpendicular to said long-narrow-shaped slot is formed in said film base;

electrodes extending from both inner edges of said conductor pattern toward an inside of said long-narrow-shaped slot and being spaced apart from each other;

an IC chip electrically connected to said electrodes, for transmitting and receiving electric waves through said slot;

a dielectric substrate in which a groove portion is formed in a front surface thereof and said IC chip is fitted into said groove portion, the groove portion spaced away from an edge of the dielectric substrate such that the dielectric substrate surrounds an entire circumference of the groove portion, the groove portion forming an electric field across opposing sides of the groove portion;

a fixing means for fixing said conductor pattern to the front surface of said dielectric substrate; and a ground conductor layer formed on a rear surface of said dielectric substrate.

* * * * *